US010191577B2

(12) United States Patent
Choi et al.

(10) Patent No.: US 10,191,577 B2
(45) Date of Patent: Jan. 29, 2019

(54) ELECTRONIC DEVICE

(71) Applicant: SAMSUNG ELECTRONICS CO., LTD., Suwon-si, Gyeonggi-do (KR)

(72) Inventors: Seung-Min Choi, Seongnam-si (KR); Min-Yong Song, Suwon-si (KR); Silkyu Lim, Suwon-si (KR); Seunghyun Hwang, Yongin-si (KR); Kwang-Tai Kim, Yongin-si (KR); Hyungsup Byeon, Suwon-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 27 days.

(21) Appl. No.: 15/428,402

(22) Filed: Feb. 9, 2017

(65) Prior Publication Data

US 2017/0235398 A1   Aug. 17, 2017

(30) Foreign Application Priority Data

Feb. 16, 2016 (KR) .................. 10-2016-0017880
Sep. 29, 2016 (KR) .................. 10-2016-0125649

(51) Int. Cl.
*G06F 3/041* (2006.01)
*G06F 1/16* (2006.01)
(Continued)

(52) U.S. Cl.
CPC .......... *G06F 3/0412* (2013.01); *G06F 1/1626* (2013.01); *G06F 3/0416* (2013.01);
(Continued)

(58) Field of Classification Search
CPC .. G06F 1/1626; G06F 3/0412; G06F 3/04883; G06F 3/044; G06F 1/1647; G06F 3/0416; G06F 1/1613; G06F 2203/04108; G06F 3/041–3/048; H01L 2251/5323; H04N 7/144; H04N 5/23293; H04N 5/2254; H04N 7/147; H04N 5/23245; H04N 17/004; H04N 7/148; H04N 7/0127; H04N 9/3176; H04N 2007/145
See application file for complete search history.

(56) References Cited

U.S. PATENT DOCUMENTS 9,131,135 B2     9/2015  Jarvis et al.
2009/0315840 A1*  12/2009  Park ................... G02F 1/13338
                                                           345/173
(Continued)

*Primary Examiner* — Sanjiv D. Patel
(74) *Attorney, Agent, or Firm* — Nixon & Vanderhye P.C.

(57) ABSTRACT

An electronic device includes a housing including a 1st surface that faces in a 1st direction, and a 2nd surface that faces in a 2nd direction opposite to the 1st direction, a display disposed between the transparent plate and the 2nd surface of the housing, and including a 1st surface that faces in the 1st direction and a 2nd surface that faces in the 2nd direction, at least one sensor disposed between the 2nd surface of the display and the 2nd surface of the housing, a processor electrically coupled with the display and the at least one sensor, and a memory electrically coupled with the processor. The memory stores instructions and the processor is configured to execute the instructions to enable the display during 1st time periods, and disable at least a part of the display during at least a part of 2nd time periods, and enable the at least one sensor.

20 Claims, 76 Drawing Sheets

(51) Int. Cl.
  *H04N 7/14* (2006.01)
  *H04M 1/02* (2006.01)
  *H04M 1/725* (2006.01)
(52) U.S. Cl.
  CPC ..... *H04M 1/0266* (2013.01); *H04M 1/72569* (2013.01); *H04N 7/144* (2013.01); *G06F 3/041* (2013.01); *G06F 2203/04105* (2013.01); *H04M 1/0264* (2013.01); *H04M 2250/12* (2013.01); *H04M 2250/16* (2013.01); *H04M 2250/52* (2013.01)

(56) References Cited

U.S. PATENT DOCUMENTS

| | | | | |
|---|---|---|---|---|
| 2011/0181587 | A1* | 7/2011 | Nakamura | G06F 3/011 345/419 |
| 2012/0257004 | A1* | 10/2012 | Smith | H04N 7/144 348/14.16 |
| 2013/0082970 | A1* | 4/2013 | Frey | G06F 3/0414 345/173 |
| 2013/0182062 | A1* | 7/2013 | Son | H04N 7/144 348/14.07 |
| 2013/0271394 | A1* | 10/2013 | Chung | G06F 3/147 345/173 |
| 2015/0036074 | A1* | 2/2015 | Park | G02B 5/30 349/58 |
| 2015/0381929 | A1* | 12/2015 | Lee | H04M 1/0202 348/14.03 |
| 2018/0033356 | A1* | 2/2018 | Zhou | G09G 3/007 |

* cited by examiner

ELECTRONIC DEVICE

CROSS-REFERENCE TO RELATED APPLICATIONS

This application is based on and claims priority under 35 U.S.C. § 119 to Korean Patent Application Serial No. 10-2016-0017880, which was filed in the Korean Intellectual Property Office on Feb. 16, 2016, and Korean Patent Application Serial No. 10-2016-0125649, which was filed in the Korean Intellectual Property Office on Sep. 29, 2016, the contents of both of which are incorporated by reference herein in their entireties.

BACKGROUND

1. Field of the Disclosure

The present disclosure relates generally to an electronic device.

2. Description of Related Art

Commonly, electronic devices add various functions and perform a compositive function. For example, the electronic devices can perform a mobile communication function, a data communication function, an image photographing function, a voice recording function, etc. The electronic devices can include displays for displaying data. In recent years, a demand for a display of a form in which at least one surface of the electronic device is substantially extended throughout the entire surface is being increasing.

SUMMARY

Various example embodiments of the present disclosure may implement a display in which at least one surface thereof is substantially extended throughout an entire surface of the electronic device.

According to various example embodiments, an electronic device includes a housing including a 1st surface that faces in a 1st direction, and a 2nd surface that faces in a 2nd direction opposite the 1st direction, the housing including a transparent plate forming at least a part of the 1st surface of the housing, a display disposed between the transparent plate and the 2nd surface of the housing, and including a 1st surface that faces in the 1st direction and a 2nd surface that faces in the 2nd direction, at least one sensor disposed between the 2nd surface of the display and the 2nd surface of the housing, the sensor configured to be exposed to light passing through the display, a processor electrically coupled with the display and the at least one sensor, and a memory electrically coupled with the processor. The memory stores instructions for execution by the processor, the processor configured to execute the instructions to enable the display during 1st time periods, and disable at least a part of the display during at least a part of 2nd time periods that do not overlap with the 1st time periods, the 2nd time periods alternating with the 1st time periods, and enable the at least one sensor.

According to various example embodiments, an electronic device includes a housing including a 1st surface that faces in a 1st direction, and a 2nd surface that faces in a 2nd direction opposite the 1st direction, the housing including a transparent plate forming at least a part of the 1st surface of the housing, a display arranged between the transparent plate and the 2nd surface of the housing, and including a 1st surface that faces in the 1st direction and a 2nd surface that faces in the 2nd direction, a camera disposed between the 2nd surface of the display and the 2nd surface of the housing, the camera device configured to be exposed to light passing through the display, a processor electrically coupled with the display and the at least one sensor, and a memory electrically coupled with the processor. The memory stores instructions for execution by the processor, the processor configured to execute the instructions to enable the display during 1st time periods, to enable the camera device during 2nd time periods immediately following the 1st time periods, and to acquire an image, using information received through the camera device during the 2nd time periods, the 2nd time periods at least partially not overlapping with the 1st time periods.

BRIEF DESCRIPTION OF THE DRAWINGS

These and other aspects, features and attendant advantages of the present disclosure will become more readily appreciated and understood from the following detailed description, taken in conjunction with the accompanying drawings, in which like reference numerals refer to like elements, and wherein.

DETAILED DESCRIPTION

Figure 1:
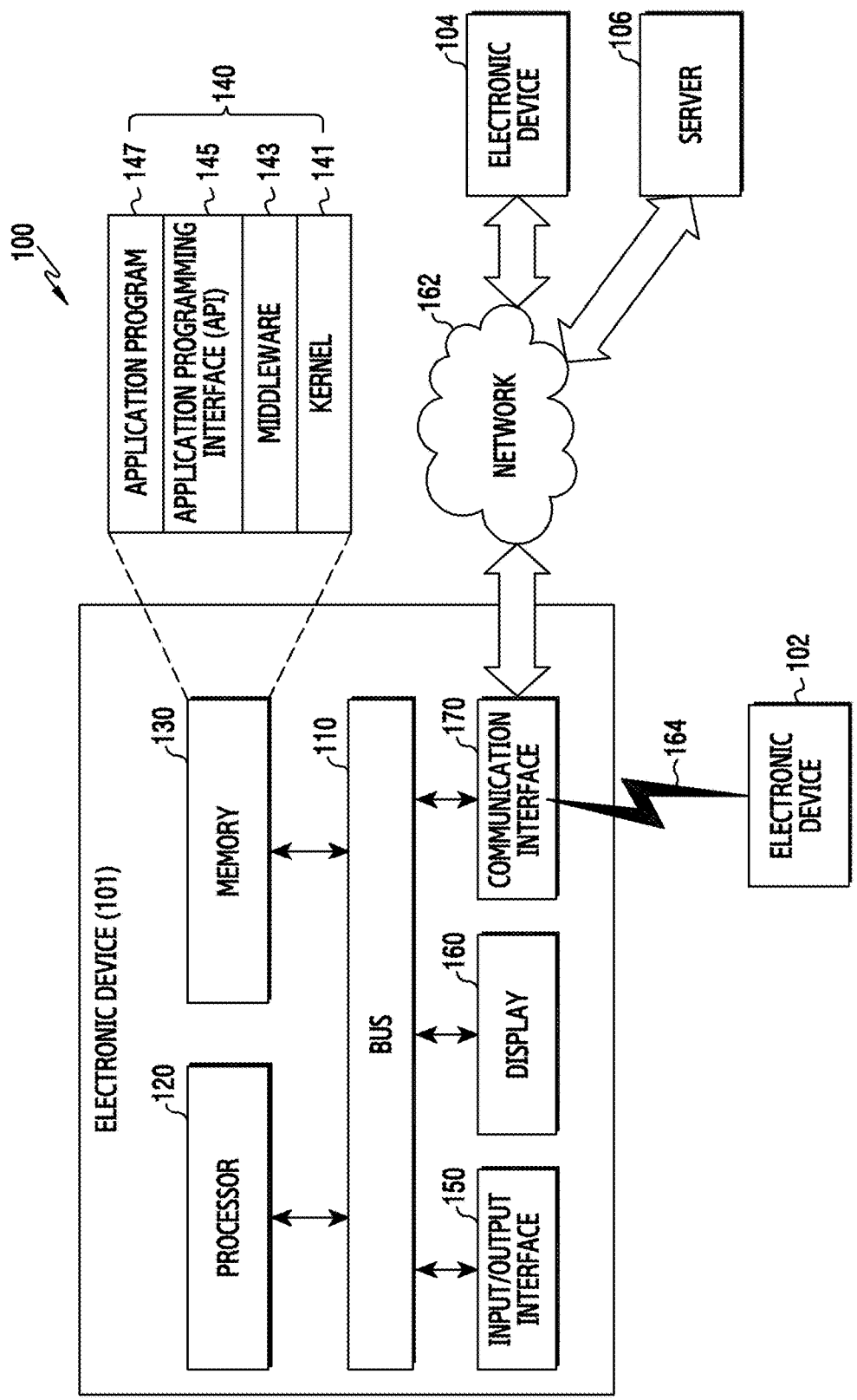
FIG. 1 is a diagram illustrating an example network environment system according to various example embodiments.

Various example embodiments of the present disclosure are described below with reference to the accompanying drawings. However, these do not intend to limit the technology mentioned in the present disclosure to a specific embodiment form, and should be understood to include various modifications, equivalents and/or alternatives of the various example embodiments of the present disclosure. In relation to a description of the drawing, like reference symbols can denote like elements.

In the present disclosure, the expressions "have", "can have", "comprise", "can comprise", etc. indicate the existence of a corresponding feature (e.g., a numeral value, a function, an operation, or a constituent element such as a component, etc.), and do not exclude the existence of an additional feature.

In the present disclosure, the expressions "A or B", "at least one of A or/and B", "one or more of A or/and B", etc. can include all available combinations of items enumerated together. For example, "A or B", "at least one of A and B", or "at least one of A or B" can denote all of the cases of (1) including at least one A, (2) including at least one B, or (3) including all of at least one A and at least one B.

The expressions "1st", "2nd", "first", "second", etc. used in the present disclosure can modify various constituent elements irrespective of order and/or importance, and are just used to distinguish one constituent element from another constituent element and do not limit the corresponding constituent elements. For example, a first user device and a second user device can represent different user devices regardless of order or importance. For example, a first constituent element can be named a second constituent element without departing from the scope of right mentioned in the present disclosure and similarly, even the second constituent element can be interchangeably named the first constituent element.

When it is mentioned that any constituent element (e.g., a first constituent element) is "(operatively or communicatively) coupled with/to" or is "connected to" another constituent element (e.g., a second constituent element), it will have to be understood that the any constituent element can be directly coupled to the another constituent element, or be coupled to the another constituent element through a further constituent element (e.g., a third constituent element). On the other hand, when it is mentioned that any constituent element (e.g., a first constituent element) is "directly coupled" or is "directly connected" to another constituent element (e.g., a second constituent element), it can be understood that a further constituent element (e.g., a third constituent element) does not exist between the any constituent element and the another constituent element.

The expression "configured (or set) to~" used in the present disclosure can be used interchangeably with, for example, "suitable for~", "having the capacity to~", "designed to~", "adapted to~", "made to~", or "capable of~" in accordance to a situation. The term "configured (or set) to~" may not necessarily mean only "specifically designed to" in hardware. Instead, in any situation, the expression "device configured to~" can represent that the device is "capable of ~" together with other devices or components. For example, the phrase "processor configured (or set) to perform A, B, and C" can represent an exclusive processor (e.g., embedded processor) for performing a corresponding operation, or a generic-purpose processor (e.g., a Central Processing Unit (CPU) or an Application Processor (AP)) capable of performing corresponding operations by executing one or more software programs stored in a memory device.

The terms used in the present disclosure are used to just describe specific example embodiments, and may not have an intention to limit the scope of various other embodiments. For example, the expression of a singular form can include the expression of a plural form unless the disclosure or corresponding description clearly dictates otherwise. The terms used herein inclusive of technological or scientific terms can have the same meaning as those commonly understood by a person having ordinary knowledge in the art mentioned in the present disclosure. Among the terms used in the present disclosure, the terms defined in a general dictionary can be interpreted as the same or similar meanings as the contextual meanings of a related technology, and are not interpreted as ideal or excessively formal meanings unless defined clearly in the present disclosure. According to cases, even if the term is defined in the present disclosure, it should not be interpreted to exclude example embodiments of the present disclosure.

An electronic device according to various example embodiments of the present disclosure can include at least one of a smart phone, a tablet Personal Computer (PC), a mobile phone, a video phone, an electronic book (e-book) reader, a desktop Personal Computer (PC), a laptop PC, a netbook computer, a workstation, a server, a Personal Digital Assistant (PDA), a Portable Multimedia Player (PMP), a Moving Picture Experts Group (MPEG-1 or MPEG-2) Audio Layer 3 (MP3) player, a mobile medical instrument, a camera, or a wearable device, or the like, but is not limited thereto. According to various example embodiments, the wearable device can include at least one of an accessory type (e.g., a watch, a ring, a wristlet, an anklet, a necklace, glasses, a contact lens, or a Head-Mounted-Device (HMD)), a fabric or clothing integrated type (e.g., electronic clothes), a body mount type (e.g., a skin pad or tattoo), or a bio implantation type (e.g., an implantable circuit), or the like, but is not limited thereto.

In some example embodiments, the electronic device can be a home appliance. The home appliance can, for example, include at least one of a television (TV), a Digital Video Disk (DVD) player, an audio system, a refrigerator, an air conditioner, a cleaner, an oven, a microwave, a washing machine, an air cleaner, a set-top box, a home automation control panel, a security control panel, a TV box (for example, Samsung HomeSync®, Apple TV®, or Google TV®), a game console (e.g., Xbox®, PlayStation®), an electronic dictionary, an electronic locking system, a camcorder, or an electronic frame, or the like, but is not limited thereto.

In another example embodiment, the electronic device can include at least one of various medical instruments (e.g., various portable medical measurement instruments (i.e., a blood sugar measuring instrument, a heartbeat measuring instrument, a blood pressure measurement instrument, a body temperature measurement instrument, etc.), Magnetic Resonance Angiography (MRA), Magnetic Resonance Imaging (MRI), Computerized Tomography (CT), a photographing machine, an ultrasonic machine, etc.), a navigation device, a Global Navigation Satellite System (GNSS), an Event Data Recorder (EDR), a Flight Data Recorder (FDR), a car infotainment device, an electronic equipment for ship (e.g., a navigation device for ship, a gyrocompass, etc.), avionics, a security instrument, a head unit for car, an industrial or home robot, an Automatic Teller's Machine (ATM) of a financial institution, a Point Of Sales (POS) of a shop, or an Internet of Things (IoT) device (e.g., an electric bulb, various sensors, an electricity or gas meter, a sprinkler device, a fire alarm, a thermostat, a streetlight, a toaster, an exerciser, a hot water tank, a heater, a boiler, etc.), or the like, but is not limited thereto.

According to various example embodiments of the present disclosure, the electronic device can include at least one of a part of furniture or building/structure, an electronic board, an electronic signature receiving device, a projector, or various metering instruments (e.g., tap water, electricity, gas, a radio wave metering instrument, etc.), or the like, but is not limited thereto. In various embodiments of the present disclosure, the electronic device can be a combination of one or more of the aforementioned devices. The electronic device according to various embodiment can be a flexible electronic device. Also, the electronic device according to various embodiments of the present disclosure is not limited to the aforementioned instruments, and can include a new electronic device according to the development of a technology and as would be understood to be covered by the person of ordinary skill in the art.

An electronic device according to various example embodiments is described below with reference to the accompanying drawings. In the present disclosure, the term 'user' can denote a person who uses the electronic device or a device (e.g., an artificial-intelligent electronic device) which uses the electronic device.

Referring to FIG. 1, an electronic device 101 within a network environment 100 in various example embodiments is mentioned. The electronic device 101 can include a bus 110, a processor (e.g., including processing circuitry) 120, a memory 130, an input/output interface (e.g., including input/output circuitry) 150, a display 160, and a communication interface (e.g., including communication circuitry) 170. In some example embodiment, the electronic device 101 can omit at least one of the constituent elements or additionally have another constituent element.

The bus 110 can, for example, include a circuit coupling the constituent elements 110 to 170 with one another and forwarding communication (e.g., a control message and/or data) between the constituent elements.

The processor 120 may include various processing circuitry, such as, for example, and without limitation, one or more of a dedicated processor, a Central Processing Unit (CPU), an Application Processor (AP), or a Communication Processor (CP). The processor 120 can, for example, execute operation or data processing for control and/or communication of at least one another constituent element of the electronic device 101.

The memory 130 can include a volatile and/or non-volatile memory. The memory 130 can, for example, store a command or data related to at least one another constituent element of the electronic device 101. According to one example embodiment, the memory 130 can store a software and/or program 140. The program 140 can, for example, include a kernel 141, a middleware 143, an Application Programming Interface (API) 145, an application program (or "application") 147, etc. At least a part of the kernel 141, the middleware 143, or the API 145 can be called an Operating System (OS).

The kernel 141 can, for example, control or manage system resources (e.g., bus 110, processor 120, memory 130, etc.) that are used for executing operations or functions implemented in the other programs (e.g., middleware 143, API 145, or application program 147). Also, the kernel 141 can provide an interface through which the middleware 143, the API 145, or the application program 147 can access the individual constituent element of the electronic device 101 and control or manage the system resources of the electronic device 101.

The middleware 143 can, for example, perform a relay role of enabling the API 145 or the application program 147 to communicate and exchange data with the kernel 141.

Also, the middleware 143 can process one or more work requests received from the application program 147 in accordance with the order of priority. For example, the middleware 143 can grant at least one of the application programs 147 the order of priority for using the system resources (e.g., bus 110, processor 120, memory 130, etc.) of the electronic device 101. For instance, the middleware 143 can perform scheduling, load balancing, etc. for the one or more work requests, by processing the one or more work requests in accordance with the priority order granted to the at least one of the application programs 147.

The API 145 is, for example, an interface for enabling the application 147 to control a function of the kernel 141 or the middleware 143. And, the API 145 can, for example, include at least one interface or function (e.g., an instruction) for file control, window control, image processing, character control, etc.

The input/output interface 150 can, for example, include various input/output circuitry configured to play a role of an interface capable of forwarding a command or data inputted from a user or another external device, to the other constituent element(s) of the electronic device 101. Also, the input output interface 150 can output a command or data received from the other constituent element(s) of the electronic device 101, to the user or another external device.

The display 160 can, for example, include a Liquid Crystal Display (LCD), a Light Emitting Diode (LED) display, an Organic Light Emitting Diode (OLED) display, or a MicroElectroMechanical Systems (MEMS) display, or an electronic paper display, or the like, but is not limited thereto. The display 160 can, for example, display various contents (e.g., a text, an image, a video, an icon, a symbol, etc.) to a user. The display 160 can include a touch screen. And, for example, the display 160 can receive a touch, gesture, proximity, or hovering input that uses an electronic pen or a part of the user's body.

The communication interface 170 may include various communication circuitry and can, for example, establish communication between the electronic device 101 and an external device (e.g., 1st external electronic device 102, 2nd external electronic device 104, or server 106). For example, through wireless communication or wired communication, the communication interface 170 can be coupled to a network 162 and communicate with the external device (e.g., 2nd external electronic device 104 or server 106).

The wireless communication, for example, a cellular communication protocol, can use at least one of Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), etc., for example. Also, the wireless communication can, for example, include a short-range communication 164. The short-range communication 164 can, for example, include at least one of Wireless Fidelity (WiFi), Bluetooth (BT), Near Field Communication (NFC), Global Navigation Satellite System (GNSS), etc. In accordance with a use area, a bandwidth, etc., the GNSS can, for example, include at least one of a Global Positioning System (GPS), a Global navigation satellite system (Glonass), a Beidou navigation satellite system (hereinafter, "Beidou"), Galileo, or the European global satellite-based navigation system. Below, in the present disclosure, the "GPS" can be used interchangeably with the "GNSS". The wired communication can, for example, include at least one of a Universal Serial Bus (USB), a High Definition Multimedia Interface (HDMI), a Recommended Standard-232 (RS-232), a Plain Old Telephone Service (POTS), etc. The network 162 can include at least one of a telecommunications network, for example, a computer network (e.g., Local Area Network (LAN) or Wide Area Network (WAN)), the Internet, or a telephone network.

Each of the 1st and 2nd electronic devices 102 and 104 can be a device that is the same as or different in type from the electronic device 101. According to one example embodiment, the server 106 can include a group of one or more servers. According to various example embodiments, all or some of operations executed in the electronic device 101 can be executed in another or a plurality of electronic devices (e.g., electronic devices 102 and 104 or server 106). According to one example embodiment, in case where the electronic device 101 performs some function or service automatically or in response to a request, instead of or additionally to executing the function or service in itself, the electronic device 101 can send a request for at least a partial function associated with this to another electronic device (e.g., electronic device 102, 104 or server 106). The another electronic device (e.g., electronic device 102, 104 or server 106) can execute the requested function or additional function, and forward the execution result to the electronic device 101. The electronic device 101 can process the received result as it is or additionally and provide the requested function or service. For this, a cloud computing, distributed computing, or client-server computing technology can be used, for example.

Figure 2:
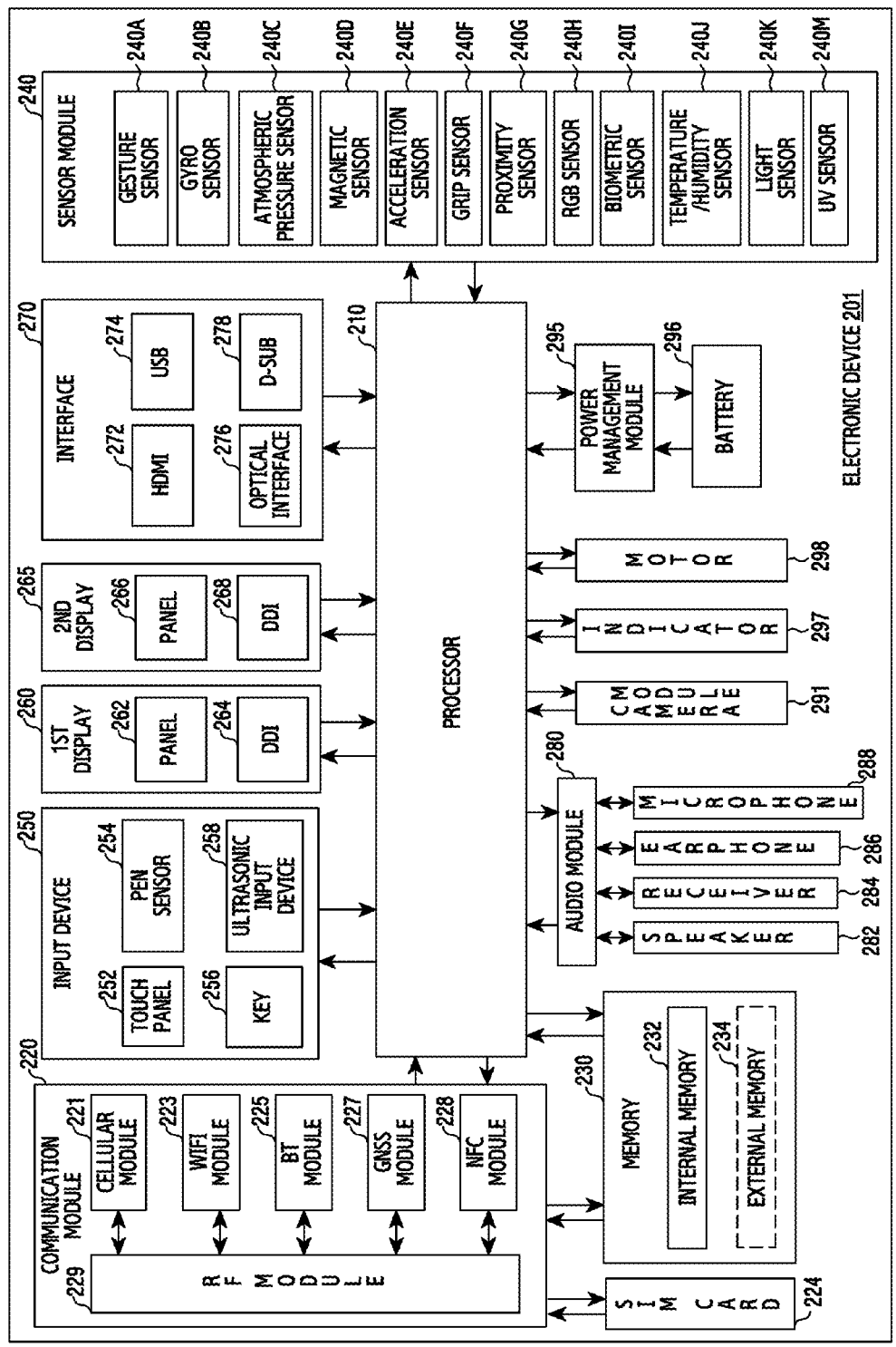
FIG. 2 is a block diagram illustrating an example electronic device according to various example embodiments.

FIG. 2 is a block diagram illustrating an example electronic device 201 according to various example embodiments.

The electronic device 201 can, for example, include the entire or part of the electronic device 101 illustrated in FIG. 1. The electronic device 201 can include one or more processors (e.g., AP) (e.g., including processing circuitry) 210, a communication module (e.g., including communication circuitry) 220, a Subscriber Identification Module (SIM) 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

For example, by driving an operating system or an application program, the processor 210 can control a plurality of hardware or software constituent elements coupled to the processor 210, and can perform various data processing and operations. The processor 210 can be, for example, implemented as a System On Chip (SoC). According to one example embodiment, the processor 210 can further include a Graphic Processing Unit (GPU) and/or an Image Signal Processor (ISP). The processor 210 can include at least some (e.g., cellular module 221) of the constituent elements illustrated in FIG. 2 as well. The processor 210 can load a command or data received from at least one of the other constituent elements (e.g., non-volatile memory), into a volatile memory, and process the loaded command or data, and store the result data in the non-volatile memory.

The communication module 220 can have the same or similar construction with the communication interface 170. The communication module 220 may include various communication circuitry, such as, for example, and without limitation, a cellular module 221, a WiFi module 223, a Bluetooth module 225, a GNSS module 227, an NFC module 228, and a Radio Frequency (RF) module 229. The cellular module 221 can, for example, provide voice telephony, video telephony, a text service, an Internet service, etc., through a telecommunication network. According to one example embodiment, the cellular module 221 can perform the distinction and authentication of the electronic device 201 within the telecommunication network, by using the subscriber identification module (e.g., SIM card) 224. According to one example embodiment, the cellular module 221 can perform at least some functions among functions that the processor 210 can provide. According to one example embodiment, the cellular module 221 can include a Communication Processor (CP). According to some example embodiment, at least some (e.g., two or more) of the cellular module 221, the WiFi module 223, the Bluetooth module 225, the GNSS module 227 or the NFC module 228 can be included within one Integrated Chip (IC) or IC package. The RF module 229 can, for example, transceive a communication signal (e.g., RF signal). The RF module 229 can, for example, include a transceiver, a Power Amplifier Module (PAM), a frequency filter, a Low Noise Amplifier (LNA), an antenna, etc. According to another example embodiment, at least one of the cellular module 221, the WiFi module 223, the Bluetooth module 225, the GNSS module 227 or the NFC module 228 can transceive an RF signal through a separate RF module. The subscriber identification module 224 can, for example, include a card including a subscriber identification module and/or an embedded SIM. And, the subscriber identification module 224 can include unique identification information (e.g., Integrated Circuit Card Identifier (ICCID)) or subscriber information (e.g., International Mobile Subscriber Identity (IMSI)).

The memory 230 (e.g., memory 130) can, for example, include an internal memory 232 and/or an external memory 234. The internal memory 232 can, for example, include at least one of a volatile memory (e.g., a Dynamic Random Access Memory (DRAM), a Static RAM (SRAM), a Synchronous Dynamic RAM (SDRAM), etc.), and/or a non-volatile memory (e.g., One Time Programmable Read Only Memory (OTPROM), a Programmable ROM (PROM), an Erasable PROM (EPROM), an Electrically EPROM (EEPROM), a mask ROM, a flash ROM, a flash memory, a hard drive, or a Solid State Drive (SSD)). The external memory 234 can include a flash drive, for example, a Compact Flash (CF), a Secure Digital (SD), a micro-SD, a mini-SD, an extreme Digital (xD), a Multi Media Card (MMC), a memory stick, etc. The external memory 234 can be operatively or physically coupled with the electronic device 201 through various interfaces.

The sensor module 240 can, for example, measure a physical quantity or detect an activation state of the electronic device 201. And, the sensor module 240 can convert measured or detected information into an electrical signal. The sensor module 240 can, for example, include at least one of a gesture sensor 240A, a gyro sensor 240B, a barometer (e.g., atmospheric pressure sensor) 240C, a magnetic sensor 240D, an acceleration sensor 240E, a grip sensor 240F, a proximity sensor 240G, a color sensor 240H (e.g., a Red, Green, Blue (RGB) sensor), a biometric sensor 240I, a temperature/humidity sensor 240J, an illuminance (e.g., light) sensor 240K, or an Ultra Violet (UV) sensor 240M. Additionally or alternatively, the sensor module 240 can, for example, include an E-nose sensor, an Electromyography (EMG) sensor, an Electroencephalogram (EEG) sensor, an Electrocardiogram (ECG) sensor, an InfraRed (IR) sensor, an iris scan sensor, and/or a finger scan sensor. The sensor module 240 can further include a control circuit for controlling at least one or more sensors belonging therein. In some example embodiment, the electronic device 201 can further include a processor configured to control the sensor module 240, as a part of the processor 210 or separately from the processor 210. And, the processor can control the sensor module 240 while the processor 210 is in a sleep state.

The input device 250 may include various input circuitry, such as, for example, and without limitation, a touch panel 252, a (digital) pen sensor 254, a key 256, or an ultrasonic input device 258. The touch panel 252 can, for example, use at least one scheme among a capacitive overlay scheme, a pressure sensitive scheme, an infrared beam scheme, or an ultrasonic scheme.

The touch panel 252 can include at least one electrode layer. The at least one electrode layer can be directly formed on a 2nd-direction (D2) surface of a transparent plate (e.g., transparent plate 1301 of FIG. 13) or a 1st-direction (D1) surface of a display (e.g., display 1303 of FIG. 13). Or, the at least one electrode layer can be formed on a separate film (not shown) and be attached to the transparent plate 1301 or the display 1303. For example, at least one electrode of the touch panel 252 can be arranged within the display 1303. In this case, the at least one electrode can be arranged between an upper plate of the display 1303 and a lower plate thereof, and can be arranged between electrodes configured to drive the display 1303. Or, the at least one electrode of the touch panel 252 can be formed integrally with a polarization plate (e.g., polarization plate 1407 of FIG. 14). Also, the touch panel 252 can further include a control circuit as well. The touch panel 252 can further include a tactile layer, and provide a tactile response to a user. The (digital) pen sensor 254 can, for example, be a part of the touch panel 252, or include a separate sheet for recognition. The key 256 can, for example, include a physical button, an optical key, or a keypad. The ultrasonic input device 258 can detect an ultrasonic wave generated in an input tool, through a microphone (e.g., microphone 288), and check data equivalent to the detected ultrasonic wave.

In one example embodiment, the display (e.g., display 160) can include a 1st display 260 or a 2nd display 265. The 1st display 260 can include a 1st panel 262, and a 1st display driving circuit (e.g., Display Driver IC (DDI)) 264 configured to control the 1st panel 262. The 1st panel 262 has a plurality of picture cells (pixels). Each pixel can include sub pixels (or lower pixels) displaying Red, Green and Blue that are three primary colors of light. These sub pixels can each include at least one transistor. And, these sub pixels can adjust the pixel in accordance with a magnitude of a voltage (or flowing electric current) applied to the transistor and express color. The 1st display driving circuit 264 can include a gate driver 940 circuit part and a source driver 950 circuit part. The gate driver 940 circuit part can have an On/Off function and control a gate of the sub pixel (RGB). The source driver 950 circuit part can adjust an image signal of the sub pixel (RGB) and make a difference of color. And, the 1st display driving circuit 264 can adjust the transistor of the sub pixel of the 1st panel 262 and provide the entire screen. The 1st display driving circuit 264 can operate to receive 1st image data from the processor 210 and display an image or picture on the 1st panel 262.

The 2nd display 265 can include a 2nd panel 266, and a 2nd display driving circuit (e.g., DDI) 268 that is configured to control the 2nd panel 266. The 2nd panel 266 can have several pixels. Each pixel can include sub pixels (or lower pixels) displaying Red, Green and Blue that are three primary colors of light. Each sub pixel can include at least one transistor. And, each sub pixel can adjust the pixel in accordance with a magnitude of a voltage (or flowing electric current) applied to the transistor and express color. The 2nd display driving circuit 268 can include a gate driver 940 circuit part and a source driver 950 circuit part. The gate driver 940 circuit part can have an On/Off function and control a gate of the sub pixel (RGB). The source driver 950 circuit part can adjust an image signal of the sub pixel (RGB) and make a difference of color. By doing so, the 2nd display driving circuit 268 can adjust the transistor of the sub pixel of the 2nd panel 266 and configure the entire screen. The 2nd display driving circuit 268 can operate to receive 2nd image data that is the same as or different from the 1st image data, from the processor 210, and display an image or picture on the 2nd panel 266.

In various example embodiments, at least one of the 1st panel 262 or 2nd panel 266 can be implemented to be flat, flexible, or bent, for example. At least one of the 1st panel 262 or 2nd panel 266 can include one or more modules including the touch panel 252 and/or the pen sensor 254.

The 1st and 2nd displays 260 and 265 (e.g., display 160) can include another image output means (e.g., a hologram device, a projector, etc. (not shown)) and/or a control circuit for controlling them.

In example embodiments implementing a device including a majority of displays, at least a part of contents (for example, image data, an image data stream, etc.) varying in several modules and devices of the device can be processed in the processor 210. The processor 210 can determine to output the varying contents to at least one display among the 1st display 260 or the 2nd display 265. For example, the processor 210 can enable the 1st display 260 to output a command received from the communication module 220. And, the processor 210 can enable the 2nd display 265 to output a command received from the sensor module 240. In another example embodiment, the processor 210 can display, through switching and extension, the contents outputted from the 1st display 260 on a screen of the 2nd display 265. Or, the processor 210 can display, through switching and extension, the contents outputted from the 2nd display 265 on a screen of the 1st display 260 as well.

The interface 270 may include various interface circuitry, such as, for example, and without limitation, an HDMI 272, a USB 274, an optical interface 276, or a D-subminiature (D-sub) 278. The interface 270 can, for example, be included in the communication interface 170 illustrated in FIG. 1. Additionally or alternatively, the interface 270 can, for example, include a Mobile High-definition Link (MHL) interface, an SD card/Multi Media Card (MMC) interface, or an Infrared Data Association (IrDA) standard interface.

The audio module 280 can, for example, convert a sound and an electric signal interactively. At least some constituent elements of the audio module 280 can, for example, be included in the input output interface 145 illustrated in FIG. 1. The audio module 280 can, for example, process sound information that is inputted or outputted through a speaker 282, a receiver 284, an earphone 286, the microphone 288, etc. The camera module 291 is, for example, a device able to photograph a still image and a video.

According to one example embodiment, the camera module 291 can include one or more image sensors (e.g., front sensor or rear sensor), a lens, an Image Signal Processor (ISP), or a flash (e.g., LED, xenon lamp, etc.). The power management module 295 can, for example, manage the electric power of the electronic device 201.

According to one example embodiment, the power management module 295 can include a Power Management Integrated Circuit (PMIC), a charger IC, or a battery or fuel gauge. The PMIC can, for example, employ a wired and/or wireless charging scheme. The wireless charging scheme can, for example, include a magnetic resonance scheme, a magnetic induction scheme, an electromagnetic wave scheme, etc. And, the wireless charging scheme can further include a supplementary circuit for wireless charging, for example, a coil loop, a resonance circuit, a rectifier, etc. The battery gauge can, for example, measure a level of the battery 296, a voltage being in charge, an electric current or a temperature. The battery 296 can, for example, include a rechargeable battery and/or a solar battery.

The indicator 297 can display a specific state of the electronic device 201 or a part (e.g., processor 210) of the electronic device 201, for example, a booting state, a message state, a charging state, etc. The motor 298 can convert an electric signal into a mechanical vibration, and can generate a vibration, a haptic effect, etc. The electronic device 201 can, for example, include a mobile TV support device (e.g., GPU) capable of processing media data according to the standards of Digital Multimedia Broadcasting (DMB), Digital Video Broadcasting (DVB), mediaFlo™, etc. The constituent elements described in the present disclosure can each include one or more components, and a name of the corresponding constituent element can vary according to the kind of the electronic device. In various example embodiments, the electronic device (e.g., electronic device 201) can omit some constituent elements, or further include additional constituent elements, or combine and construct some of the constituent elements as one entity and identically perform before-combination functions of the corresponding constituent elements.

The constituent elements described in the present disclosure can each include of one or more components, and a name of the corresponding constituent element can vary according to the kind of the electronic device. In various example embodiments, the electronic device can include at least one of the constituent elements described in the present disclosure, and can omit some constituent elements or further include additional another constituent element. Also, the electronic device according to various example embodiments can combine and construct some of the constituent elements as one entity and identically perform before-combination functions of the corresponding constituent elements.

Figure 3:
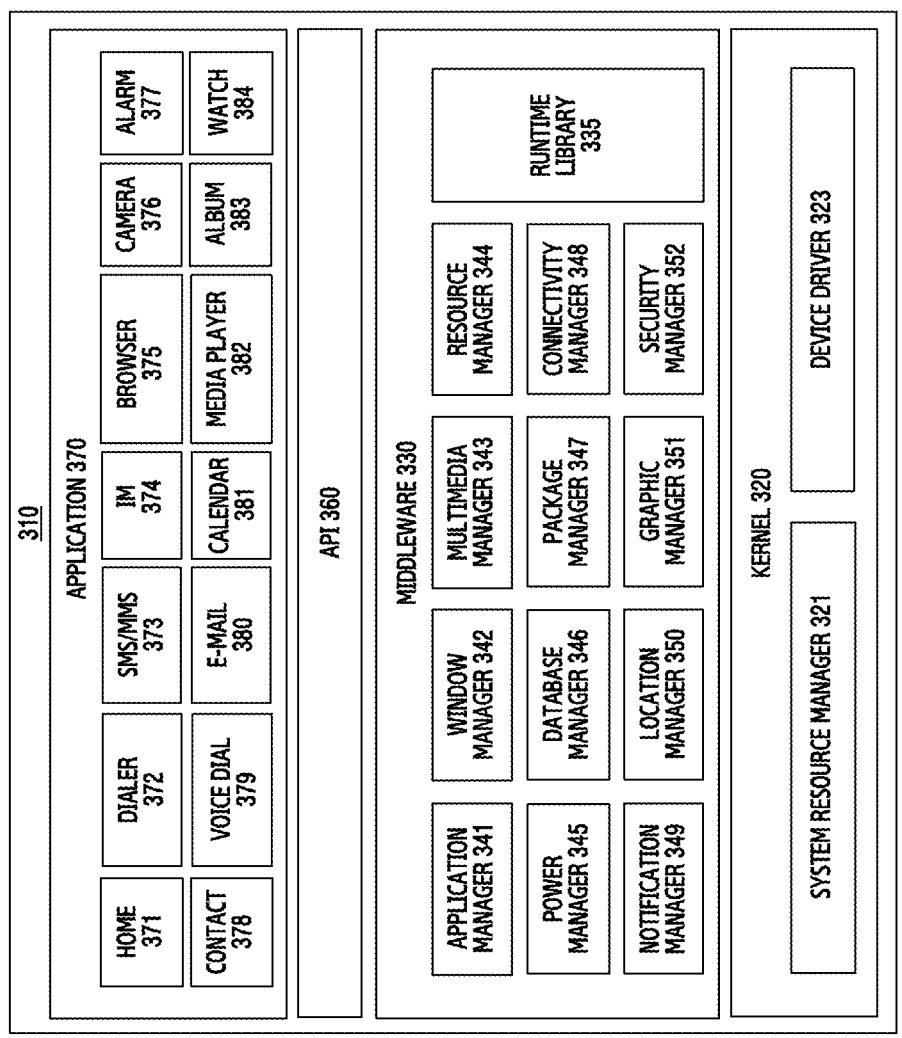
FIG. 3 is a block diagram illustrating an example program module according to various example embodiments.

FIG. 3 is a block diagram illustrating an example program module according to various example embodiments. According to an example embodiment, the program module 310 (e.g., program 140) can include an Operating System (OS) controlling resources related to an electronic device (e.g., electronic device 101) and/or various applications (e.g., application program 147) run on the operating system. The operating system can, for example, be Android, iPhone OS (iOS), Windows, Symbian, Tizen, Bada, etc.

The program module 310 can include a kernel 320, a middleware 330, an Application Programming Interface (API) 360, and/or an application 370. At least some of the program module 310 can be preloaded onto the electronic device, or can be downloaded from an external electronic device (e.g., electronic device 102, 104, server 106, etc.).

The kernel 320 (e.g., kernel 141) can include a system resource manager 321 and/or a device driver 323. The system resource manager 321 can perform the control, allocation, recovery, etc. of system resources. According to one example embodiment, the system resource manager 321 can include a process management unit, a memory management unit, a file system management unit, etc. The device driver 323 can, for example, include a display driver, a camera driver, a Bluetooth driver, a shared memory driver, a USB driver, a keypad driver, a WiFi driver, an audio driver, or an Inter-Process Communication (IPC) driver.

In one example embodiment, the display driver can control one or more display driving circuits (e.g., Display Driver IC (DDI)). The display driving circuit can include functions for controlling a screen in response to a request of the application 370.

The middleware 330 can, for example, provide functions that the application 370 commonly needs, or provide various functions to the application 370 through the API 360. So, the application 370 can make efficient use of restricted system resources within the electronic device. According to an example embodiment, the middleware 330 (e.g., middleware 143) can include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 can, for example, include a library module that a compiler uses to add a new function through a programming language while the application 370 is executed. The runtime library 335 can perform functions of input output management, memory management, arithmetic function, etc.

The application manager 341 can, for example, manage a life cycle of at least one application among the applications 370. The window manager 342 can manage GUI resources that are used in a screen. For example, in case where at least two or more displays 260 are coupled, the window manager 342 can configure or manage the screen differently in accordance with an aspect ratio or an operation of the application 370. The multimedia manager 343 can figure out a format necessary for playing various media files, and perform the encoding or decoding of the media file by a codec adapted to the corresponding format. The resource manager 344 can manage resources such as a source code of at least any one application among the applications 370, a memory, a storage space, etc.

The power manager 345 can, for example, work together with a Basic Input/Output System (BIOS), etc. and manage a battery or power source, and provide electric power information, etc. necessary for an operation of the electronic device. The database manager 346 can generate, search or change a database that will be used in at least one application among the applications 370. The package manager 347 can manage the installation or updating of an application that is distributed in the form of a package file.

The connectivity manager 348 can, for example, manage wireless connectivity such as WiFi, Bluetooth, etc. The notification manager 349 can display or notify an event such as an arrived message, an appointment, a proximity notification, etc., the way a user is not disturbed. The location manager 350 can manage location information of the electronic device. The graphic manager 351 can manage a graphic effect that will be provided to a user, or a user interface related with this. The security manager 352 can provide a general security function that is necessary for system security, user authentication, etc. According to one example embodiment, in case where the electronic device (e.g., electronic device 101) includes a phone function, the middleware 330 can further include a telephony manager for managing a voice or video telephony function of the electronic device.

The middleware 330 can include a middleware module forming a combination of various functions of the aforementioned constituent elements. The middleware 330 can provide a module that is specialized on a per-operating-system-type basis in order to provide a distinctive function. Also, the middleware 330 can dynamically delete some of the existing constituent elements or add new constituent elements.

The API 360 (e.g., API 145), for example, a set of API programming functions, can be provided to have another construction in accordance with an operating system. For example, Android or iOS can provide one API set on a per-platform basis, and Tizen can provide two or more API sets on a per-platform basis.

The application 370 (e.g., application program 147) can, for example, include at least one or more applications capable of performing functions of a home 371, a dialer 372, a Short Message Service (SMS)/Multimedia Message Service (MMS) 373, an Instant Message (IM) 374, a browser 375, a camera 376, an alarm 377, a contact 378, a voice dial 379, an electronic mail (e-mail) 380, a calendar 381, a media player 382, an album 383, a watch 384, health care (e.g., measuring a quantity of motion, a blood sugar, etc.), environment information provision (e.g., providing air pressure, humidity, temperature information, etc.), etc.

According to an example embodiment, the application 370 can include an application (hereinafter, referred to as "information exchange application" for description convenience) supporting information exchange between the electronic device (e.g., electronic device 101) and an external electronic device (e.g., electronic device 102, 104). The information exchange application can, for example, include a notification relay application for relaying specific information to the external electronic device, or a device management application for managing the external electronic device.

For example, the notification relay application can include a function of relaying notification information generated in another application (e.g., SMS/MMS application, e-mail application, health care application, environment information application, etc.) of the electronic device, to the external electronic device (e.g., electronic device 102 or 104). Also, the notification relay application can, for example, receive notification information from the external electronic device and provide the received notification information to a user.

The device management application can, for example, manage (e.g., install, delete or update) at least one function of the external electronic device (e.g., electronic device 102 or 104) communicating with the electronic device (e.g., function of turning On/turning Off the external electronic device itself or some constituent components, or adjusting a display brightness or resolution), an application operating in the external electronic device, or a service (e.g., telephony service, message service, etc.) provided in the external electronic device.

According to one example embodiment, the application 370 can include an application (e.g., health care application, etc. of a mobile medical instrument) that is designated according to an attribute of the external electronic device (e.g., electronic device 102 or 104). According to one example embodiment, the application 370 can include an application that is received from the external electronic device (e.g., server 106 or electronic device 102 or 104). According to one example embodiment, the application 370 can include a preloaded application, or a third party application downloadable from a server. Names of the illustrated constituent elements of the program module 310 according to the example embodiment can be varied according to the type of the operating system.

According to various example embodiments, at least a part of the program module 310 can be implemented by software, firmware, hardware, or combination of at least two or more of them. At least a part of the program module 310 can, for example, be implemented (i.e., executed) by a processor (e.g., processor 210). The at least part of the program module 310 can include, for example, a module, a program, a routine, sets of instructions, a process, etc. for performing one or more functions.

The term "module" used in the present disclosure may, for example, refer to a unit including one of hardware, software, or firmware, or a combination of two or more of them. The "module" can, for example, be used interchangeably with the terms "unit", "logic", "logical block", "component", "circuit", etc. The "module" can be the minimum unit of an integrally constructed component or a part thereof. The "module" can be the minimum unit performing one or more functions or a part thereof as well. The "module" can be implemented mechanically or electronically. For example, the "module" can include at least one of a dedicated processor, a CPU, an Application-Specific Integrated Circuit (ASIC) chip performing some operations, a Field-Programmable Gate Array (FPGA), or a programmable-logic device, which is well known to the art or will be developed in the future.

At least a part of a device (e.g., modules or functions thereof) or method (e.g., operations) according to various example embodiments can, for example, be implemented by an instruction that is stored in a computer-readable storage media in the form of the program module. In case where the instruction is executed by a processor (e.g., processor 120), the processor can perform a function equivalent to the instruction. The computer-readable storage media can be the memory 130, for example.

The computer-readable recording media can include a hard disk, a floppy disk, a magnetic media (e.g., magnetic tape), an optical media (e.g., Compact Disc-ROM (CD-ROM), Digital Versatile Disk (DVD), Magneto-Optical Media (e.g., floptical disk)), a hardware device (e.g., ROM, RAM, flash memory, etc.), etc. Also, a program command can include not merely a mechanical language code such as a code made by a compiler, but also a high-level language code that is executable by a computer by using an interpreter, etc. The aforementioned hardware device can be configured to work as one or more software modules in order to perform operations of various example embodiments, and vice versa.

The module or program module according to various example embodiments can include at least one or more of the aforementioned constituent elements, or omit some of them, or further include additional another constituent element. Operations carried out by the module, program module or another constituent element according to various example embodiments can be executed in a sequential, parallel, repeated or heuristic method. Also, some operations can be executed in another order or can be omitted, or another operation can be added. And, the example embodiment disclosed in the present disclosure is suggested for the explaining and understanding of the technology content disclosed, and does not limit the scope of the technology mentioned in the present disclosure. Accordingly, the scope of the present disclosure should be construed as including all modifications or various other example embodiments based on the technological spirit of the present disclosure.

Figure 4:
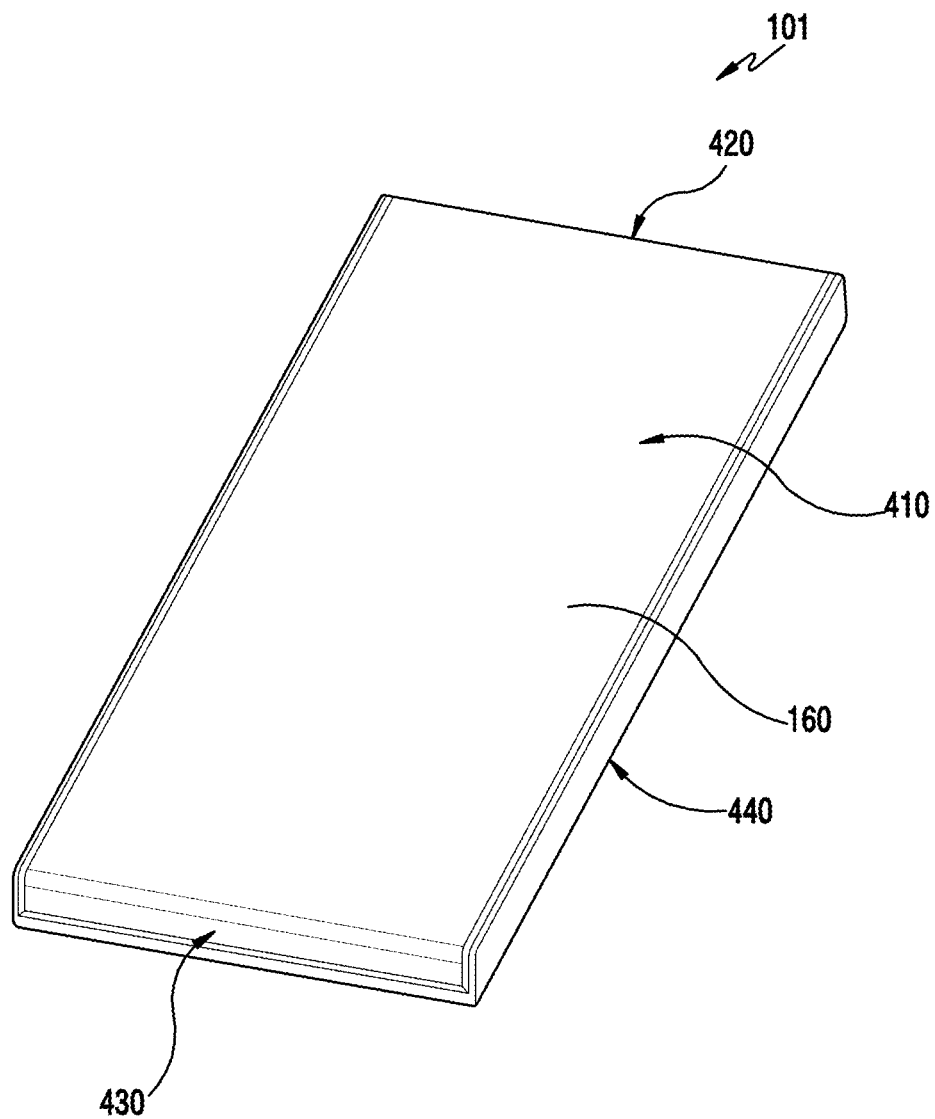
FIG. 4 is a perspective view of an example electronic device according to various example embodiments.

FIG. 4 is a perspective view of an example electronic device according to various example embodiments.

As illustrated in FIG. 4, the electronic device 101 can include a 1st surface 410, a 2nd surface 420, a 3rd surface 430, and a 4th surface 440. The 1st surface 410 can be a front surface of the electronic device 101. The 2nd surface 420 and the 3rd surface 430 can be one-lateral surfaces of the electronic device 101. The 2nd surface 420 and the 3rd surface 430 each can be any one surface formed between the 1st surface 410 and the 4th surface 440. In FIG. 4, it is illustrated that the 2nd surface 420 and the 3rd surface 430 are the lateral surfaces having shorter lengths in the electronic device 101. But, an example embodiment is not limited to this, and the 2nd surface 420 and the 3rd surface 430 can be lateral surfaces having longer lengths in the electronic device 101. The 4th surface 440 can be a rear surface of the electronic device 101. The display 160 can be arranged on at least one surface among the 1st surface 410, the 2nd surface 420, the 3rd surface 430, and the 4th surface 440 in the electronic device 101. According to one example embodiment, the display 160 can be arranged on the 1st surface 410, the 2nd surface 420 and the 3rd surface 430 in the electronic device 101. The one display 160 can be entirely arranged on the 1st surface 410. The display 160 can be arranged on the front surface by omitting a hole for a structure or a physical button from the 1st surface 410. The display 160 can be arranged to extend from the 1st surface 410 to the 2nd surface 420 and the 3rd surface 430. According to one example embodiment, the one flexible display 160 can be bent at the 2nd surface 420 and the 3rd surface 430. According to an example embodiment, the electronic device 101 can include the display 160 that is configured in such a form that a screen non-display region is not entirely eliminated. That is, the electronic device 101 can include the screen non-display region where the screen is not displayed. For example, the electronic device 101 can include a Black Matrix (BM) region in which a width of a part of the screen non-display region is about 0.1 millimeters (mm) to 1 mm, and a width of at least another part is about 1 mm to 5 mm.

Figure 5:
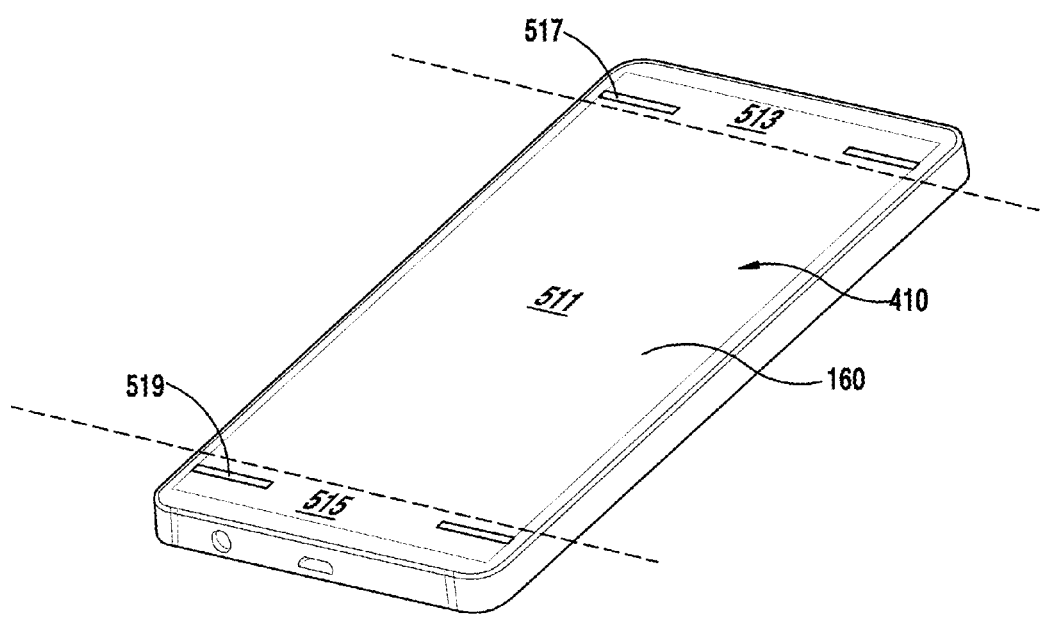
FIG. 5 is a perspective view of an example electronic device according to various example embodiments.

FIG. 5 is a perspective view illustrating an example electronic device according to various example embodiments.

As illustrated in FIG. 5, the 1st surface 410 of the electronic device 101 can include a main region 511, a 1st sub region 513 and a 2nd sub region 515. The main region 511 can be a main region in the 1st surface 410. The 1st sub region 513 and the 2nd sub region 515 can be regions arranged at one-side surfaces of the main region 511. The 1st sub region 513 and the 2nd sub region 515 can be regions that are arranged at an upper part and lower part of the electronic device 101 with a criterion of the main region 511, respectively. The display 160 can be arranged in the main region 511, the 1st sub region 513 and the 2nd sub region 515. The display 160 can include a 1st break region 517 in which at least one portion of the display 160 is cut out between the main region 511 and the 1st sub region 513. The display 160 can include a 2nd break region 519 in which at least one portion of the display 160 is cut out between the main region 511 and the 2nd sub region 515. The 1st break region 517 and the 2nd break region 519 can be regions formed by adding non-conductive members to the display 160. Or, the 1st break region 517 and the 2nd break region 519 can be regions that are formed by cutting out one part of the display 160. Through the 1st break region 517 and the 2nd break region 519, the electronic device 101 can secure the performance of an antenna, various sensors, etc. For example, the electronic device 101 can construct a feeding unit in each of the 1st break region 517 and the 2nd break region 519, and utilize 1st break region 517 and the 2nd break region 519 as each individual antenna radiator.

Figure 6:
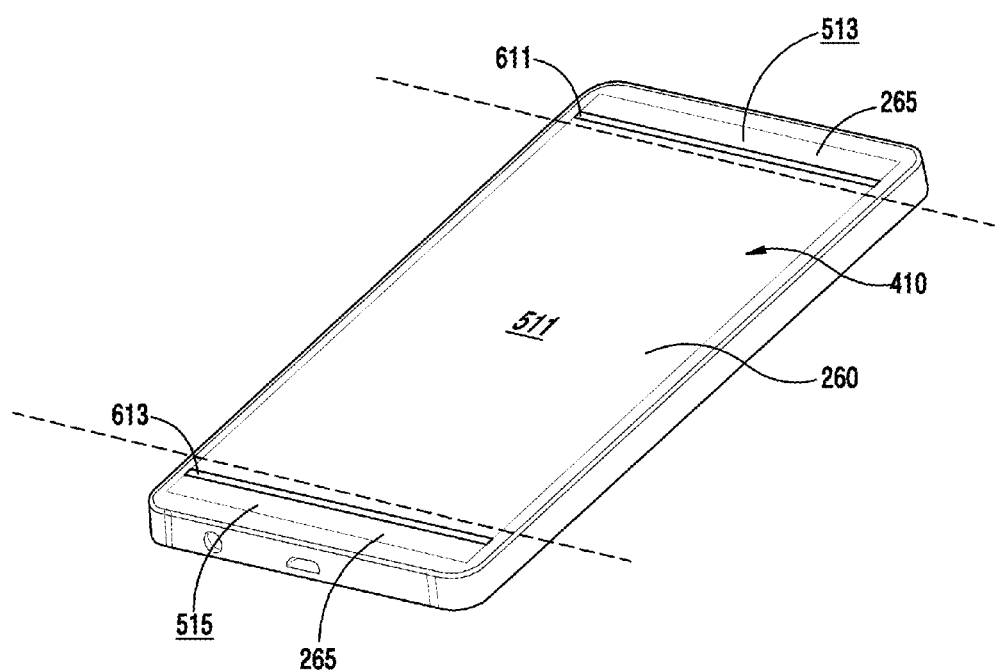
FIG. 6 is a perspective view of an example electronic device according to various example embodiments.

FIG. 6 is a perspective view illustrating an example electronic device according to various example embodiments.

As illustrated in FIG. 6, the electronic device 101 can include a 1st display 260 and a 2nd display 265. The 1st surface 410 of the electronic device 101 can include a main region 511, a 1st sub region 513, a 2nd sub region 515, a 3rd sub region 611 and a 4th sub region 613. The 1st sub region 513 and the 2nd sub region 515 can be regions that are arranged at one-lateral surfaces of the main region 511. The 1st sub region 513 and the 2nd sub region 515 can be regions that are arranged at an upper part and lower part of the electronic device 101 with a criterion of the main region 511. The 1st display 260 can be arranged in the main region 511. The 2nd display 265 can be arranged in each of the 1st sub region 513 and the 2nd sub region 515. The electronic device 101 can include the 3rd sub region 611 and the 4th sub region 613 between the 1st display 260 and the 2nd displays 265. Through the 3rd sub region 611 and the 4th sub region 613, the 1st display 260 and the 2nd display 265 can be distinguished. According to one example embodiment, the electronic device 101 can utilize a conductive member of the 2nd display 265 as an antenna radiator. For example, by adding non-conductive members to the 3rd sub region 611 and the 4th sub region 613 and adding feeding units to the 2nd displays 265, the electronic device 101 can utilize the conductive members of the 2nd displays 265 as antenna radiators.

Figure 7A:
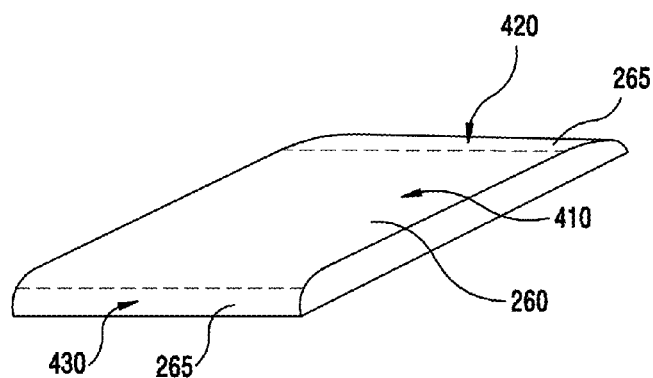
FIG. 7A and FIG. 7B are perspective views of an example electronic device according to various example embodiments.
Figure 7B:
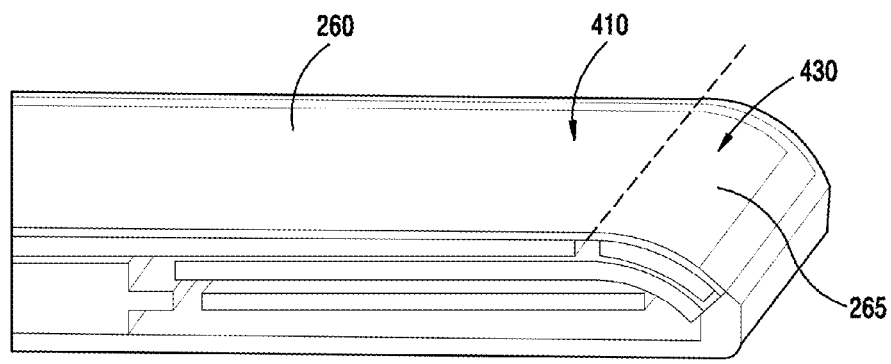

FIGS. 7A and 7B are perspective views of an electronic device according to various example embodiments.

As illustrated in FIGS. 7A and 7B, the electronic device 101 can include the 1st display 260 and the 2nd display 265. The 1st display 260 can be arranged on the 1st surface 410. The 2nd display 265 can be arranged on at least any one surface among the 2nd surface 420 and the 3rd surface 430. According to various example embodiments, at least any one surface among the 2nd surface 420 and the 3rd surface 430 can be a curved surface. Accordingly, the 1st display 260 and the 2nd display 265 can be arranged naturally along the curved surfaces. According to various example embodiments, the electronic device 101 can utilize a conductive member of the 2nd display 265 as an antenna. Or, the electronic device 101 can construct an additional conductive member on the 2nd display 265 and utilize the additional conductive member as an antenna as well. For example, the electronic device 101 can arrange various conductive films such as an Indium Tin Oxide (TIN) film, etc. on the 2nd display 265, and utilize the conductive films as an antenna.

Figure 8:
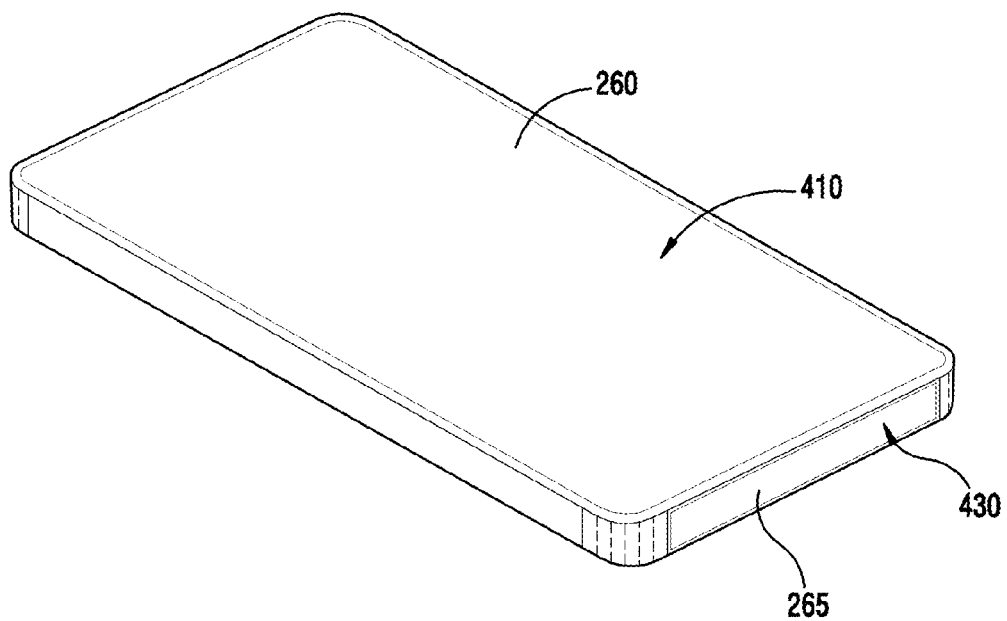
FIG. 8 is a perspective view an example electronic device according to various example embodiments.

FIG. 8 is a perspective view of an electronic device according to various example embodiments.

As illustrated in FIG. 8, the electronic device 101 can include the 1st display 260 and the 2nd display 265. The 1st display 260 can be arranged on the 1st surface 410. The 2nd display 265 can be arranged on at least any one surface among the 2nd surface 420 and the 3rd surface 430. According to various example embodiments, the 2nd display 265 is separately provided on any one surface among the 2nd surface 420 and the 3rd surface 430, whereby the 1st display 260 and the 2nd display 265 can be clearly distinguished.

Figure 9:
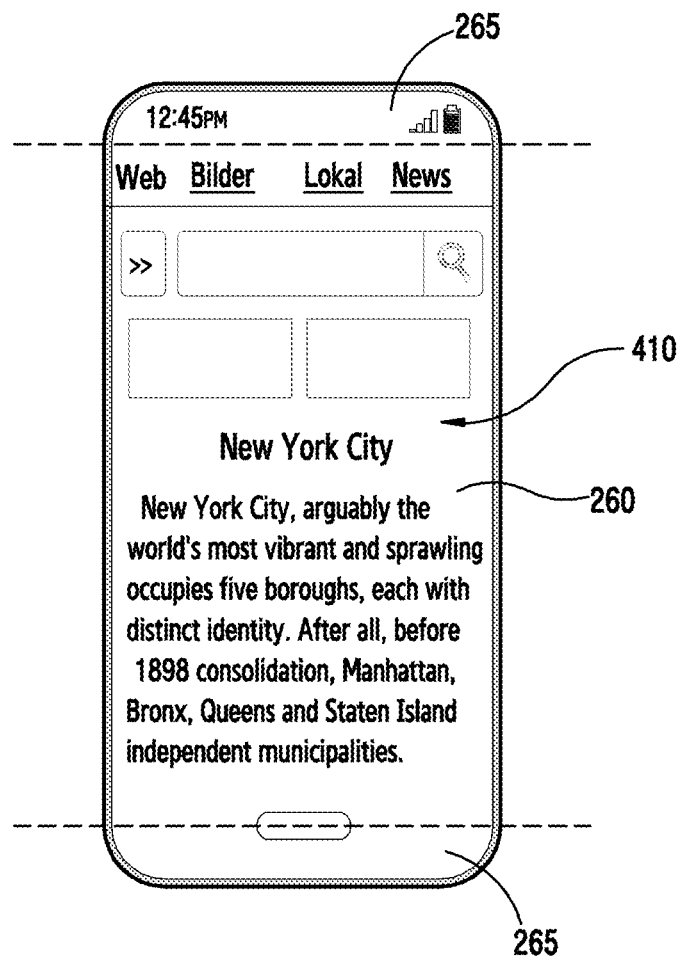
FIG. 9 is a diagram illustrating an example screen of an example electronic device according to various example embodiments.

FIG. 9 is a diagram of a screen of an electronic device according to various example embodiments.

As illustrated in FIG. 9, according to various example embodiments, the 1st display 260 and at least one or more 2nd displays 265 can be arranged on the 1st surface 410. A screen can be displayed on the 1st display 260 and the 2nd display 265. For example, one screen can be divided and displayed on the 1st display 260 and the 2nd display 265. That is, a screen displayed on the 1st display 260 and a screen displayed on the 2nd display 265 can construct one screen. Or, the screen displayed on the 1st display 260 and the 2nd display 265 can be separate screens. The 1st display 260 and the 2nd display 265 can display a home key. That is, the 1st display 260 and the 2nd display 265 can display a home key screen that replaces a physical button and is acknowledged like the physical button. In FIG. 9, it is illustrated that the 1st display 260 and the 2nd display 265 are arranged on the 1st surface 410, but an example embodiment is not limited to this. Accordingly, as described earlier in FIG. 4, one display 160 can be arranged throughout the 1st surface 410 as well.

Figures 10A, 10B:
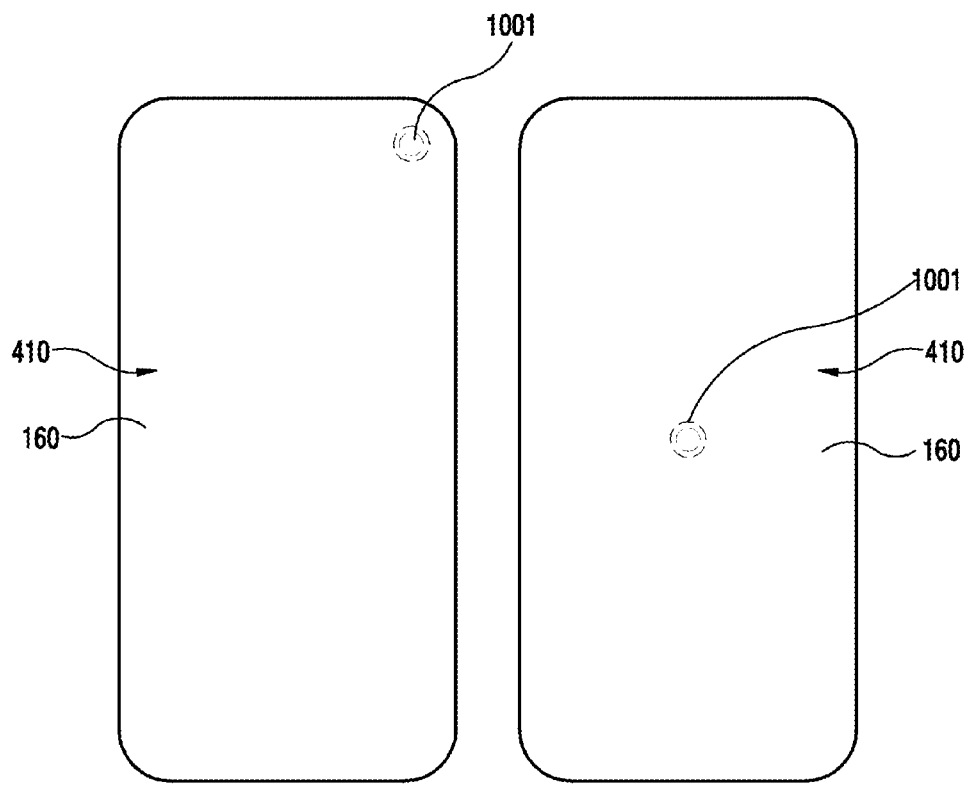
FIG. 10A and FIG. 10B are front views an example electronic device according to various example embodiments.

FIGS. 10A and 10B are front views of an electronic device according to various example embodiments.

As illustrated in FIGS. 10A and 10B, a hole for a structure or a physical button can be omitted in the 1st surface 410 of the electronic device 101. Accordingly, the display 160 can be arranged on the entire surface of the 1st surface 410. Meantime, various sensors can be arranged on a rear surface of the display 160. The sensor can include at least any one of a camera device, a proximity sensor, an illuminance sensor, a finger scan sensor, or a medical sensor. For example, a camera device 1001 can be arranged on the rear surface of the display 160. As illustrated in FIG. 10A, the camera device 1001 can be arranged at an upper side of the rear surface of the display 160. Or, as illustrated in FIG. 10B, the camera device 1001 can be arranged at the center of the rear surface of the display 160. According to various example embodiments, the sensor such as the camera device 1001 may not be exposed to the 1st surface 410 of the electronic device 101.

Figures 11A, 11B:
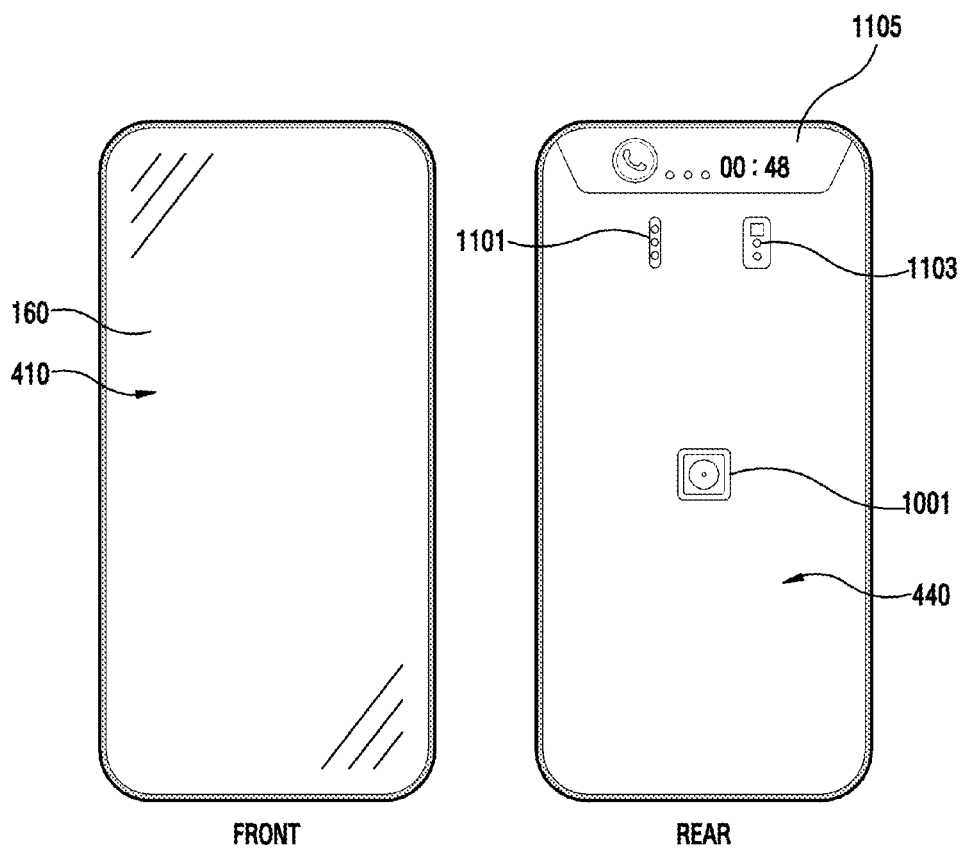
FIG. 11A is a front view an example electronic device according to various example embodiments.
FIG. 11B is a rear view illustrating an example electronic device according to various example embodiments.

FIG. 11A is a front view of an electronic device according to various example embodiments. FIG. 11B is a rear view of the electronic device according to various example embodiments.

As illustrated in FIG. 11A, a hole for a structure or a physical button can be omitted from the 1st surface 410 of the electronic device 101. Accordingly, the display 160 can be arranged on the entire surface of the 1st surface 410. As illustrated in FIG. 11B, various structures, sensors, etc. can be arranged in the 4th surface 440 of the electronic device 101. For example, the camera device 1001, a receiver 1101, a heart rate sensor (e.g., Heart Rate Monitor (HRM) sensor), a flash 1103, etc. can be arranged in the 4th surface 440 of the electronic device 101. Meantime, the receiver 1101 is arranged in the 4th surface 440 of the electronic device 101, thereby being capable of providing a new user experience performing a phone call through the rear surface of the electronic device 101. Also, a sub display 105 can be additionally arranged in a part of the 4th surface 440, such that a user can check a phone call state.

Figure 12A:
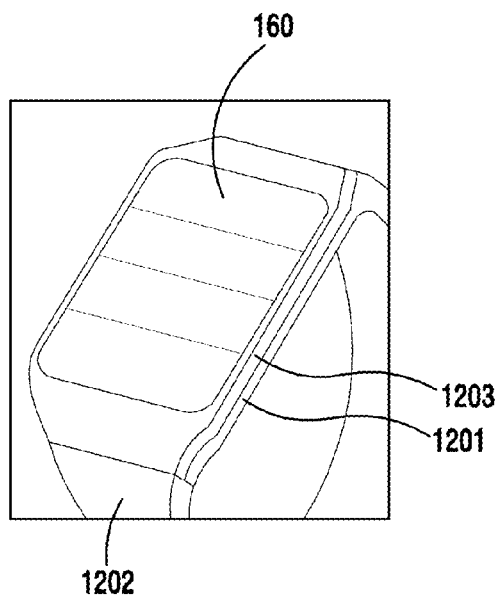
FIG. 12A, 12B and FIG. 12C are perspective views of an example electronic device according to various example embodiments.
Figure 12B:
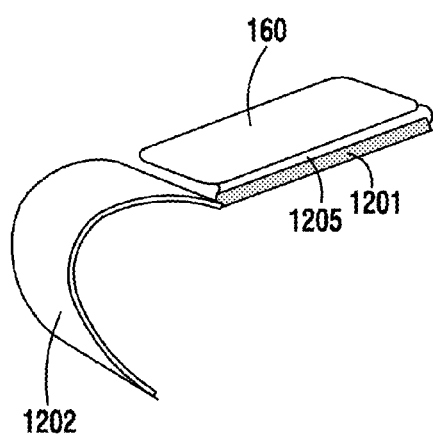
Figure 12C:
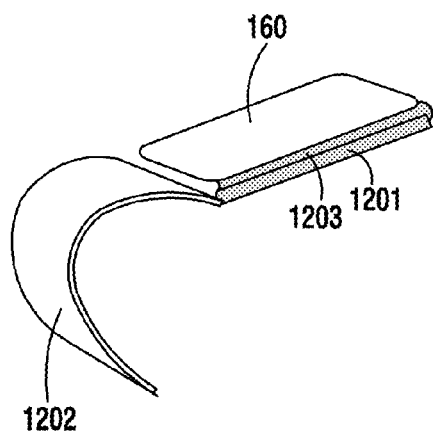

FIGS. 12A, 12B and 12C are perspective views of an electronic device according to various example embodiments.

As illustrated in FIG. 12A, the electronic device according to various example embodiments can be a wearable device. The electronic device according to various example embodiments can include the display 160, an antenna 1201, an injection molding part 1203, and a wearing part 1202. The display 160 can be arranged on a front surface of the wearable device, and a physical button key can be omitted. The display 160 can replace the physical button key. The injection molding part 1203 can space the display 160 and the antenna 1201 apart. The injection molding part 1203 can prevent an electrical contact between the display 160 and the antenna 1201. For this, the injection molding part 1203 can include non-conductive materials.

As illustrated in FIG. 12B, according to various example embodiments, a glass 1205 can be arranged between the display 160 and the antenna 1201. The glass 1205 can space the display 160 and the antenna 1201 apart. The glass 1205 can prevent an electrical contact between the display 160 and the antenna 1201.

As illustrated in FIG. 12C, according to various example embodiments, an injection molding part 1203 can be arranged between the display 160 and the antenna 1201. The injection molding part 1203 can space the display 160 and the antenna 1201 apart. The injection molding part 1203 can prevent an electrical contact between the display 160 and the antenna 1201. For this, the injection molding part 1203 can include non-conductive materials.

Figure 13:
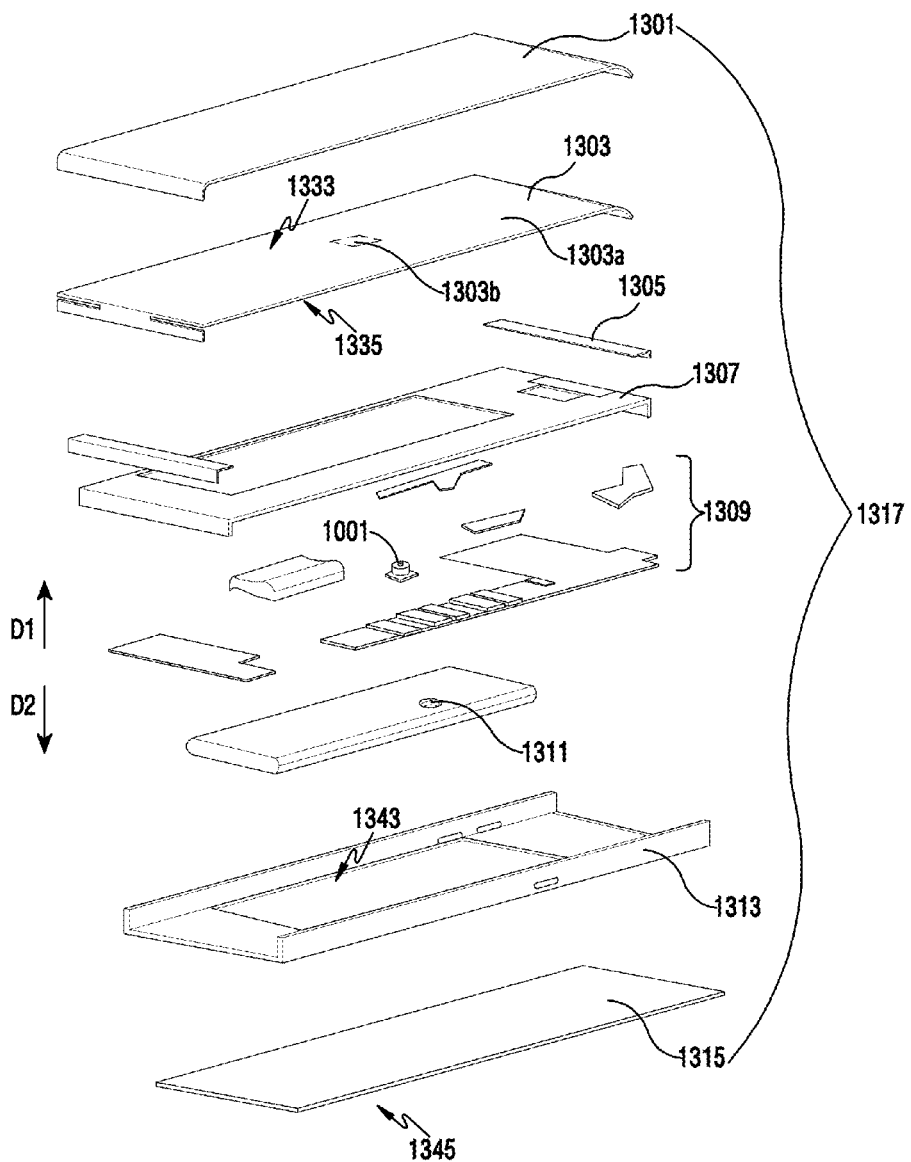
FIG. 13 is an exploded perspective view of an example electronic device according to various example embodiments.

FIG. 13 is an exploded perspective view of an electronic device according to various example embodiments.

As illustrated in FIG. 13, the electronic device according to various example embodiments can include a transparent plate 1301, a display 1303, a Flexible Printed Circuit Board (FPCB) 1305, a bracket 1307, a Panel Board Assembly (PBA) 1309, a battery 1311, a camera device 1001, and a housing 1317.

The transparent plate 1301 can be arranged on an upper part of the electronic device 101. The transparent plate 1301 can protect various constructions arranged under the transparent plate 1301. The transparent plate 1301 can transmit internal light generated within the electronic device 101, to the external. Also, the transparent plate 1301 can transmit external light traveling from the inside of the electronic device 101, to the inside of the electronic device 101. The transparent plate 1301 can be formed of materials having excellent light transmission, heat resistance, chemical resistance, mechanical strength, etc. Here, the transparent plate 1301 can be, for example, a transparent film or glass substrate formed of polyethyleneterephthalate, etc. And, the transparent plate 1301 can be a plastic substrate formed of polymethylmethacrylate, polyamide, polyimide, polypropylene, polyurethane, etc. as well.

According to various example embodiments, the transparent plate 1301 can further have a touch panel 252 capable of sensing a touch occurring on a surface of the touch panel 252. The touch panel 252 can be equivalent to the touch panel 252 described in FIG. 2. The touch panel 252 can, for example, sense a touch by using at least one of a capacitive overlay scheme, a pressure sensitive scheme, an infrared beam scheme, or an ultrasonic scheme.

Meantime, the transparent plate 1301 can be constructed at an upper part of the electronic device 101 and protect internal constructions, thereby constructing a part of the housing 1317.

The housing 1317 can include a 1st surface 1343 and a 2nd surface 1345. The 1st surface 1343 can be a surface going in a 1st direction (D1). The 2nd surface 1345 can be a surface going in a 2nd direction (D2) that is the opposite direction of the 1st direction (D1). The transparent plate 1301 can form at least a part of the 1st surface 1343 of the housing 1317. That is, the transparent plate 1301 can construct a part of the housing 1317.

The display 1303 can a construction equivalent to the display 160 described earlier in FIG. 1. The display 1303 can be arranged between the transparent plate 1301 and the 2nd surface 1345 of the housing 1317. The display 1303 can include a 1st surface 1333 going in the 1st direction (D1) and a 2nd surface 1335 going in the 2nd direction (D2). The display 1303, an internal construction of the electronic device 101, can perform a substantial operation of the electronic device 101. The display 1303 can perform a function of displaying an image.

The display 1303 can include a 1st region 1303a and a 2nd region 1303b. The 1st region 1303a can be a region at least partially not overlapping with at least one sensor, when viewed from the top of the transparent plate 1301. The 2nd region 1303b can be a region at least partially overlapping with at least one sensor, when viewed from the top of the transparent plate 1301. In various example embodiments, the 2nd region 1303b can be a central region of the display 1303. That is, the camera device 1001 can be arranged at the center of the electronic device 101. This camera device 1001 can have a plurality of image sensors. Meantime, in FIG. 13, it is illustrated that the sensor is the camera device 1001, but an example embodiment is not limited to this. Accordingly, besides the camera device 1001, various sensors such as a proximity sensor, an illuminance sensor, a finger scan sensor, a medical sensor, etc. can be arranged. For example, the finger scan sensor can be arranged only in a partial region of the display 1303 or can be arranged in the entire region of the display 1303 as well.

According to various example embodiments, the display 1303 can include an antenna. For example, as an antenna, a ground member (not shown) included in the display 1303 can be electrically coupled with a communication circuit (e.g., communication module 220 of FIG. 2) and radiate a radio frequency signal to the external. Or, the ground member (not shown) included in the display 1303 can work as an antenna by a coupling effect. For example, the ground member can be arranged to be spaced a certain distance apart from a conductive member (not shown) within the housing 1317 electrically coupled with the communication circuit. For example, the ground member can radiate a radio frequency signal that is induced by a coupling effect from the conductive member (not shown), to the external.

The flexible printed circuit board 1305 can be electrically coupled with various constructions including the display 1303. The flexible printed circuit board 1305 can apply a signal to the display 1303, or receive a signal from the display 1303. The bracket 1307 can fix the panel board assembly 1309 and the battery 1311. The panel board assembly 1309 can include a Printed Circuit Board (PCB) and a connector. The panel board assembly 1309 can be electrically coupled with various constructions including the display 1303. The battery 1311 can manage an electric power of the electronic device 101. The battery 1311 can be a construction equivalent to the battery 296 described in FIG. 2.

The housing 1317 can include the transparent plate 1301, a frame mold 1313 and a back cover 1315. The frame mold 1313 can fix the internal construction of the electronic device 101. The frame mold 1313 can house and fix the display 1303, the flexible printed circuit board 1305, the bracket 1307, the panel board assembly 1309 and the battery 1311. The frame mold 1313 can be implemented in the form for protecting an internal construction of the display 1303. The frame mold 1313 can be formed of synthetic resins, and can be, for instance, formed of metal materials such as stainless steel, titanium (Ti), etc. The back cover 1315 can be arranged on the rear surface of the electronic device 101, such that the internal constructions of the electronic device 101 are not acknowledged from the external. The back cover 1315 can be various films.

Figure 14:
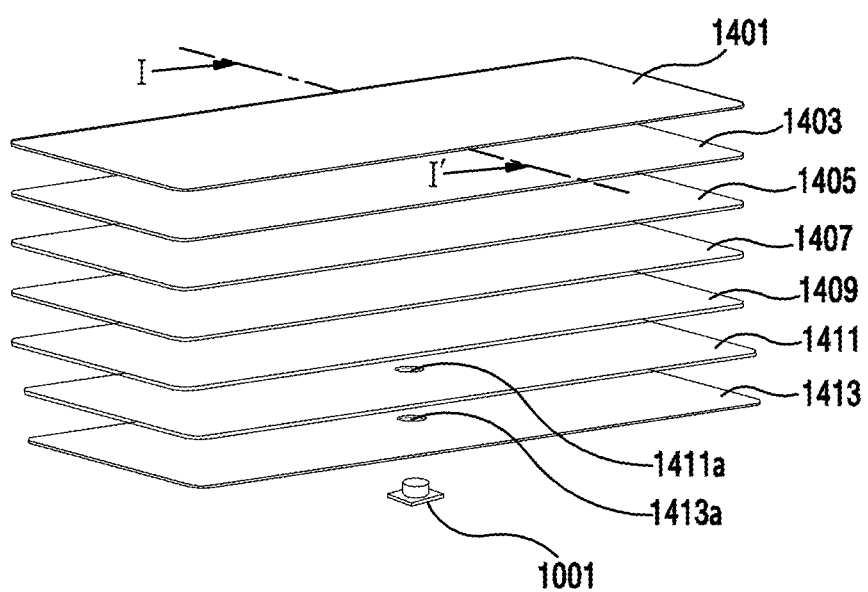
FIG. 14 is an exploded perspective view of an example electronic device according to various example embodiments.

FIG. 14 is an exploded perspective view of an electronic device according to various example embodiments.

As illustrated in FIG. 14, the electronic device 101 according to various example embodiments can include a transparent plate 1401, a 1st film 1403, a 2nd film 1405, a polarization plate 1407, a display 1409, a 1st protection part 1411, a 2nd protection part 1413 and the camera device 1001. The 1st film 1403, the 2nd film 1405, the polarization plate 1407, the 1st protection part 1411 and the 2nd protection part 1413 can be added to the construction illustrated in FIG. 13.

The transparent plate 1401 can a construction equivalent to the transparent plate 1301 described earlier in FIG. 13.

The 1st film 1403 can attach the transparent plate 1401 and various constructions arranged beneath the transparent plate 1401. Or, by performing light blocking, the 1st film 1403 can prevent light emitted from the inside of the electronic device 101 from being leaked outside the display 1409.

The 2nd film 1405 can be arranged between the transparent plate 1401 and the display 1409. The 2nd film 1405 can be, for example, optical elasticity resin (e.g., Super View Resin (SVR)). The 2nd film 1405 can improve the acknowledgement quality of the display 1409. Or, the 2nd film 1405 can alleviate an impact applied to the display 1409. Or, the 2nd film 1405 can reduce light scattering by adjusting a refractive index of light that is incident on the electronic device 101. Accordingly, the 2nd film 1405 can reduce a loss of light that is incident on the display 1409.

The polarization plate 1407 can be arranged on the display 1409. The polarization plate 1407 can polarize incident light vibrating in several directions, into light (i.e., polarized light) vibrating only in one direction.

The display 1409 can a construction equivalent to the display 1303 described earlier in FIG. 13.

The 1st protection part 1411 and/or the 2nd protection part 1413 can be arranged beneath the display 1409. The 1st protection part 1411 and/or the 2nd protection part 1413 can protect the display 1409. The 1st protection part 1411 and/or the 2nd protection part 1413 can have color such that the constructions such as the display 1409, etc. are not acknowledged. For example, the 1st protection part 1411 and/or the 2nd protection part 1413 can have black color. The 1st protection part 1411 and/or the 2nd protection part 1413 can block light that is incident from the external of the electronic device 101.

The 1st protection part 1414 can include a 1st opening part 1411a. The 2nd protection part 1413 can include a 2nd opening part 1413a. The 1st opening part 1411a and 2nd opening part 1413a can be greater in size than the camera device 1001. The camera device 1001 can be inserted into the 1st opening part 1411a and 2nd opening part 1413a. As described above, the drawings illustrate the camera device 1001, but various sensors such as a proximity sensor, an illuminance sensor, a finger scan sensor, a medical sensor, etc. can be arranged as well.

The 1st protection part 1411 and the 2nd protection part 1413 include the 1st opening part 1411a and the 2nd opening part 1413a, respectively, thereby being capable of preventing interruption to light that is incident to the camera device 1001. Since the 1st protection part 1411 and the 2nd protection part 1413 have light blocking properties, light can be incident on the camera device 1001 through the 1st opening part 1411a and the 2nd opening part 1413a.

Figure 15A:
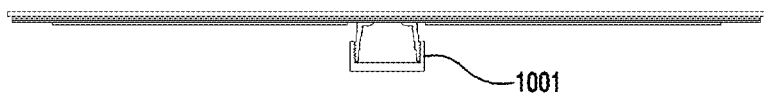
FIGS. 15A, 15B and 15C are diagrams illustrating sections taken along line I-I' of FIG. 14.
Figure 15B:
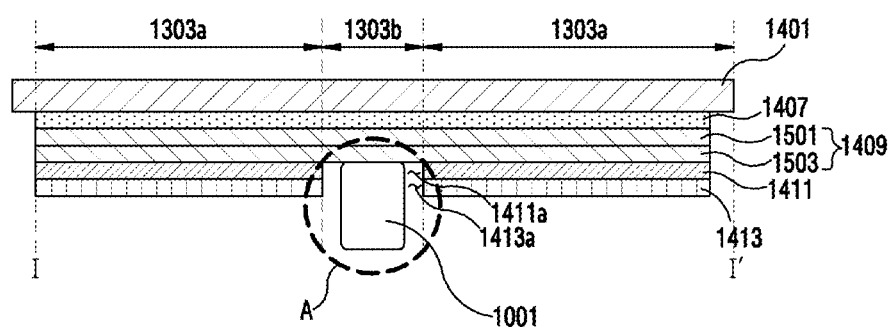
Figure 15C:
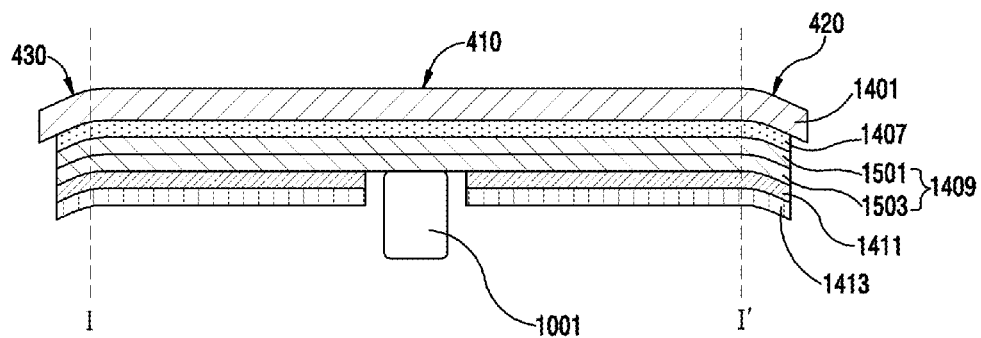

FIGS. 15A, 15B and 15C are sections taken along line I-I' of FIG. 14. FIG. 15(a) simply illustrate the section taken along line I-I' of FIG. 14.

As illustrated in FIG. 15A, the camera device 1001 can be arranged in a rear surface of the display 101. FIG. 15B illustrate in more detail the section taken along line I-I' of FIG. 14. As illustrated in FIG. 15B, when viewed from the top of the transparent plate 1401, the 1st regions 1303a of the display 1409 can be regions not overlapping with the camera device 1001. Also, when viewed from the top of the transparent plate 1401, the 2nd region 1303b of the display 1409 can be a region overlapping with the camera device 1001. At this time, the 1st opening part 1411a and 2nd opening part 1413a of the 1st protection part 1411 and 2nd protection part 1413 can be equivalent to the 2nd region 1303b. That is, the 1st opening part 1411a and the 2nd opening part 1413a can be arranged in a region equivalent to the 2nd region 1303b.

Meantime, the display 1409 can include a 1st substrate 1501 and a 2nd substrate 1503. The 1st substrate 1501 can be arranged on the 2nd substrate 1503. The 1st substrate 1501 can, for example, be a color filter substrate (or color filter glass). The 1st substrate 1501 can include a black matrix, a color filter, etc. The 1st substrate 1501 can provide internal light traveling through a liquid crystal, in a constant color. This 1st substrate 1501 can include a majority of Red, Green, Blue (RGB) pixels for exhibiting internal light in a constant color. In case where the display 1409 includes an active light-emitting element (e.g., organic light emitting diode, quantum dot, etc.), the 1st substrate 1501 may not include a black matrix or a color filter.

The 2nd substrate 1503 can, for example, be a Thin Film Transistor (TFT) substrate (or TFT glass). A thin film transistor, and a pixel electrode, a common electrode, etc. coupled to the thin film transistor can be formed in the 2nd substrate 1503. A liquid crystal can be interposed between the 1st substrate 1501 and the 2nd substrate 1503. The type of the display 1409 can be determined depending on the type of the liquid crystal. To change a light transmittance of internal light transmitted in a light guide plate, the 2nd substrate 1503 can vary an array of the liquid crystal. The 2nd substrate 1503 can deliver internal light in a desired shape through the liquid crystal. Or, the display 1409 can include the active light-emitting element (e.g., organic light emitting diode, quantum dot, etc.) between the 1st substrate 1501 and the 2nd substrate 1503. For example, a quantity of emitted light can be adjusted according to a quantity of electric current applied to the active light emitting element through the thin film transistor.

A driving chip (e.g., Display Driver IC (DDI)) (not shown) capable of driving the display 1409 can be arranged on the 2nd substrate 1503. The driving chip can be bonded onto the 2nd substrate 1503 through an anisotropic conductive film, etc. This driving chip can be electrically coupled with the flexible printed circuit board (1305 of FIG. 13).

FIG. 15C is a section of an electronic device according to various example embodiments.

As illustrated in FIG. 15C, according to various example embodiments, the 2nd surface 420 and 3rd surface 430 of the electronic device 101 can be bent from the 1st surface 410. That is, both side surfaces of the electronic device 101 can be bent from a front surface of the electronic device 101. For example, the 2nd surface 420 and the 3rd surface 430 can include curved surfaces, respectively. As the 2nd surface 420 and the 3rd surface 430 are bent, even internal constructions arranged on the 2nd surface 420 and the 3rd surface 430 can be bent. For example, the transparent plate 1401, the polarization plate 1407, the display 1409, the 1st protection part 1411, the 2nd protection part 1413, etc. can be constructed to be bent at the 2nd surface 420 and the 3rd surface 430.

Figure 16:
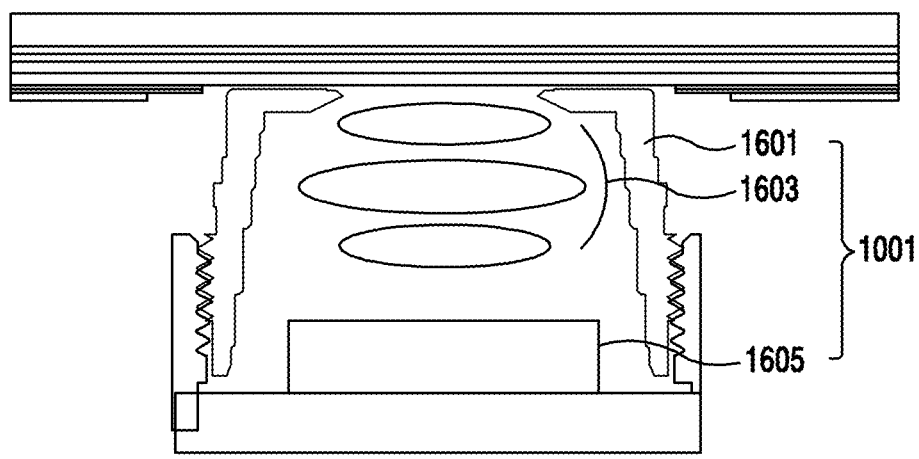
FIG. 16 is an extended view of a portion 'A' of FIG. 15B.

FIG. 16 is an extended view of a portion 'A' of FIG. 15B.

As illustrated in FIG. 16, the camera device 1001 can include a cover member 1601, a lens 1603, an image sensor 1605, etc. The cover member 1601 can form an exterior of the camera device 1001. The cover member 1601 can protect various constructions arranged in an internal space thereof. At this time, the cover member 1601 can include materials capable of scattering and reflecting external light. Or, the cover member 1601 can be coated with materials capable of scattering and reflecting external light. Or, the cover member 1601 can be processed by matt finishing. This can prevent the camera device 1001 from being acknowledged from the external of the electronic device 101. The lens 1603 can include a majority of lenses. An image coming from the lens 1603 can be forwarded to the image sensor 1605. The image sensor 1605 can include a pixel array in which color pixels and white pixels are arrayed in a set pattern. The pixel array can convert an optical image signal of an external object incident through the lens 1603, into an electrical image signal FIG. 17 is a section of an electronic device according to various example embodiments.

Figure 17:
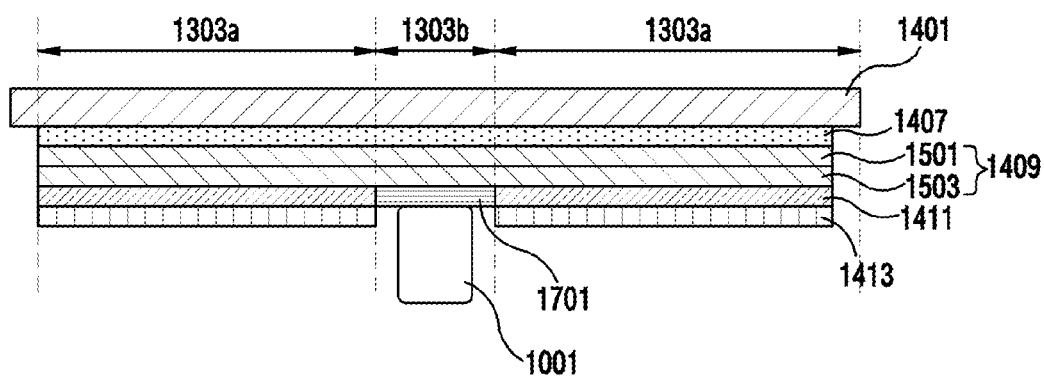
FIG. 17 is a diagram illustrating a section of an example electronic device according to various example embodiments.

As illustrated in FIG. 17, according to various example embodiments, a structure 1701 can be further arranged between the display 1409 and the camera device 1001. The structure 1701 can be arranged in a region that is equivalent to the 2nd region 1303b of the display 1409. That is, the structure 1701 can be arranged in the 1st opening part 1411a or 2nd opening part 1413a of the 1st protection part 1411 or 2nd protection part 1413. The structure 1701 can be configured to selectively block or pass light external to the transparent plate 1401. The structure 1701 can open or shut the camera device 1001 in accordance with an operation of the camera device 1001. For example, in case where the camera device 1001 does not perform a camera photographing operation, the structure 1701 can be deployed in the 2nd region 1303b and shut the camera device 1001. In case where the camera device 1001 performs the camera photographing operation, the structure 1701 can be withdrawn from the 2nd region 1303b and open the camera device 1001.

Figure 18A:
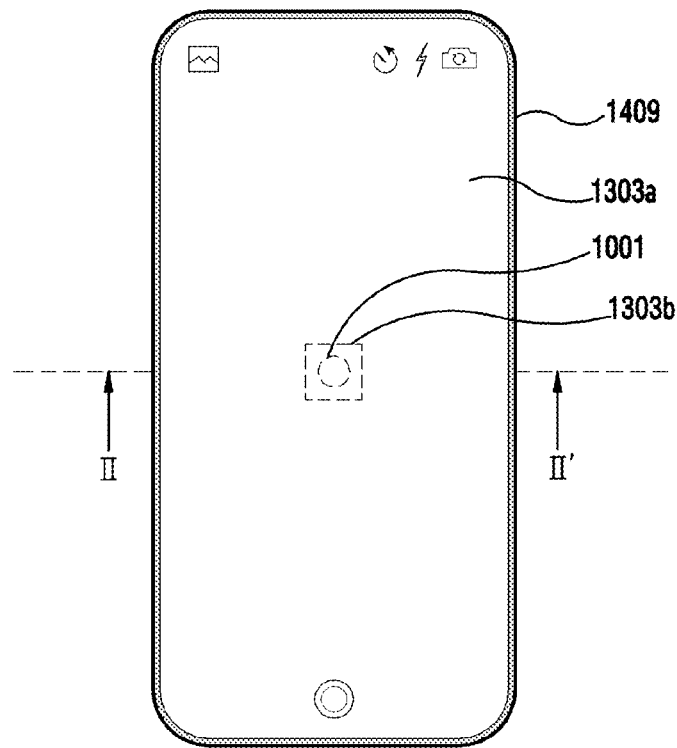
FIG. 18A is a diagram illustrating an example of a screen of an example electronic device according to various example embodiments.
Figure 18B:
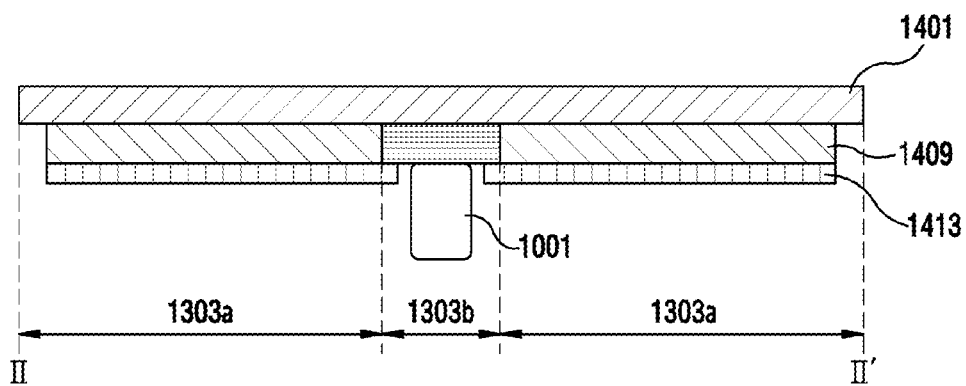
FIG. 18B is a section taken along line II-II' of FIG. 18A.

FIG. 18A is a diagram of a screen of an electronic device according to various example embodiments. FIG. 18B is a section taken along line II-II' of FIG. 18A.

FIG. 18A illustrates an example diagram of a screen that the electronic device 101 displays at camera photographing. As illustrated in FIG. 18(a) and FIG. 18B, the display 1409 can display mutually different screens in the 1st region 1303a and the 2nd region 1303b. That is, a color and/or pattern displayed in the 2nd region 1303b that is a region overlapping with the camera device 1001 can be different from a color and/or pattern displayed in the 1st region 1303a that is a region not overlapping with the camera device 1001. That is, an image displayed in a region equivalent to a light receiving region of the camera device 1001 can be different from an image displayed in a region equivalent to a region excluding the light receiving region. The display 1409 can display in the 2nd region 1303b an image of a specific color and/or pattern facilitating the photographing of the camera device 1001.

In various example embodiments, the electronic device 101 can determine the influence of light introduced into the camera device 1001, and correct an image by the determined value and then display the corrected image on the display 1409. That is, the electronic device 101 can determine the influence of light introduced into the camera device 1001 by using a pixel (RGB) value of the display 1409, a voltage value or an electric current value, and correct an image by the determined value, and then display the image on the display 1409.

In various example embodiments, by reflecting a transmittance of light transmitted to the display 1409 among the entire external light, the electronic device 101 can measure a quantity of received light of the camera device 1001. That is, by reflecting a ratio of light received by the camera device 1001 after passing through the display 1409, the electronic device 101 can measure the quantity of received light of the camera device 1001. In accordance with the quantity of received light, the electronic device 101 can correct an image acquired by the camera device 1001, or change a setting value of the camera device 1001.

Figures 19A, 19B:
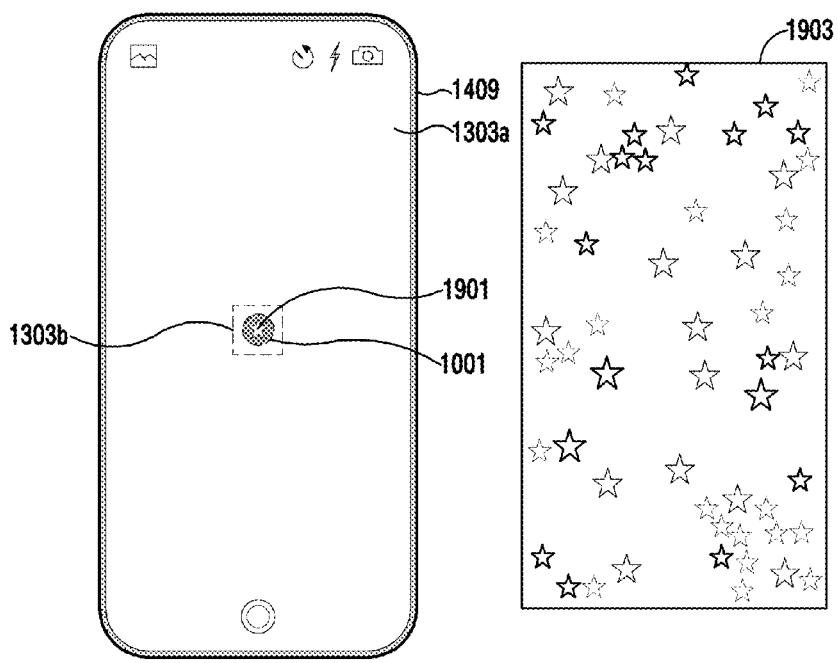
FIG. 19A is a diagram of an example screen of an example electronic device according to various example embodiments.
FIG. 19B is a diagram illustrating an example image acquired through a camera device of FIG. 19A.

FIG. 19A is diagram illustrating an example screen of an electronic device according to various example embodiments. FIG. 19B illustrates an image acquired through a camera device of FIG. 19A.

As illustrated in FIG. 19A, the display 1409 can display a star-like pattern 1901 in the 2nd region 1303b when the camera device 1001 works for photographing. When the camera device 1001 performs a photographing operation in a state where the star-like pattern 1901 is displayed in the 2nd region 1303b, as illustrated in FIG. 19B, the camera device 1001 can acquire a star-like image 1903. Besides this, by displaying various patterns in the 2nd region 1303b, the display 1409 can acquire an image applying the displayed pattern.

Figures 20A, 20B:
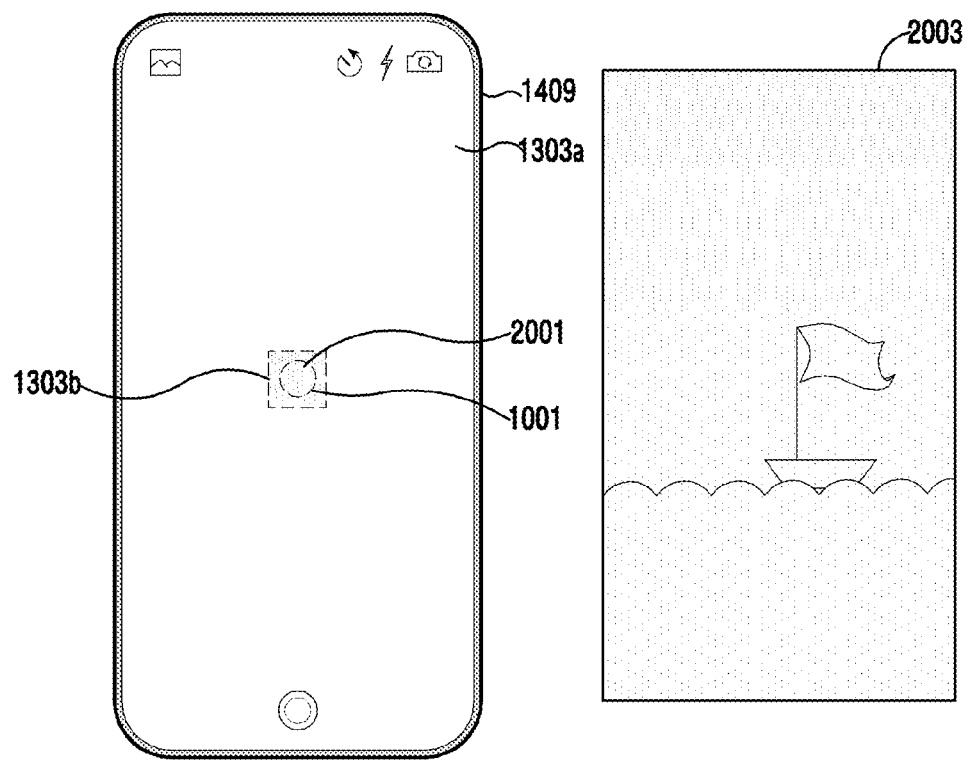
FIG. 20A is a diagram illustrating an example screen of an electronic device according to various example embodiments.
FIG. 20B is a diagram illustrating an example image acquired through a camera device of FIG. 20A.

FIG. 20A is a diagram illustrating an example screen of an electronic device according to various example embodiments. FIG. 20B is an image acquired through a camera device of FIG. 20B.

As illustrated in FIG. 20A, the display 1409 can display a gradation color 2001 in the 2nd region 1303b when the camera device 1001 works for photographing. When the camera device 1001 performs a photographing operation in a state where the gradation color 2001 is displayed in the 2nd region 1303b, as illustrated in FIG. 20B, the camera device 1001 can acquire an image 2003 shown in the gradation color. Besides this, by displaying various colors in the 2nd region 1303b, the display 1409 can acquire images to which the displayed colors are applied. In various example embodiments, the display 1409 can acquire an image to which a gradation or color filter effect is applied even without a separate filter.

FIGS. 21A, 21B, 21C and 21D are diagrams illustrating an example polarizing filter application effect in an electronic device according to various example embodiments.

Figure 21A:
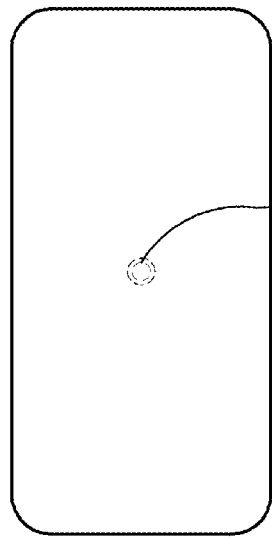
FIGS. 21A, 21B, 21C and 21D are diagrams illustrating an example polarizing filter application effect in an electronic device according to various example embodiments.
Figure 21C:
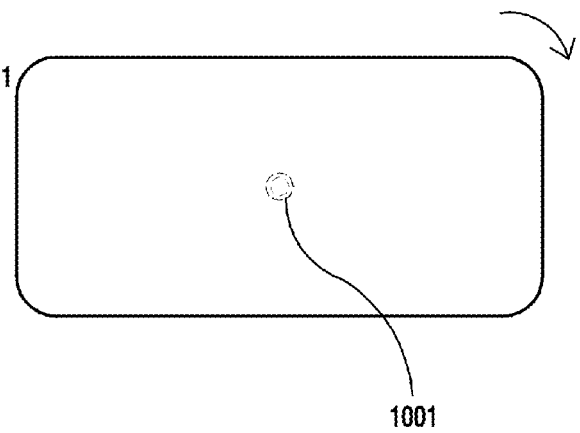
Figure 21B:
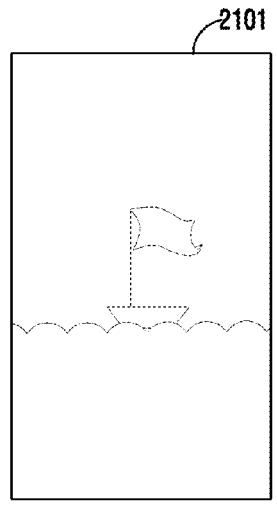
Figure 21D:
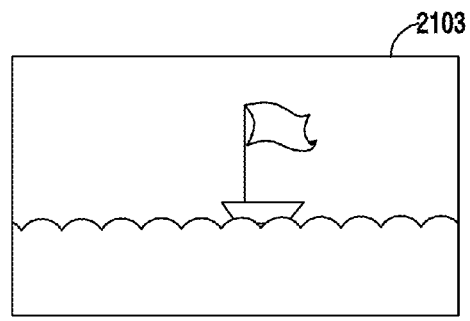

As illustrated in FIG. 21A and FIG. 21B, in case where the camera device 1001 photographs when the electronic device 101 is in the portrait orientation, the camera device 1001 can acquire a 1st image 2101. And, as illustrated in FIG. 21C and FIG. 21D, in case where the camera device 1001 photographs when the electronic device 101 is in the landscape orientation, the camera device 1001 can acquire a 2nd image 2103 more clear than the 1st image 2101. In various example embodiments, because the camera device 1001 is arranged beneath the polarization plate (1407 of FIG. 14), at photographing, a polarization degree can be differently applied in accordance with the direction of the polarization plate 1407. That is, when the camera device 1001 receives incident light, the camera device 1001 receives incident light passing through the polarization plate 1407. Therefore, the polarization degree can be differently applied in accordance with an angle between the polarization plate 1407 and the incident light. Accordingly, in various example embodiments, at camera photographing, the electronic device 101 can apply a polarization filter effect, using the polarization plate (1407 of FIG. 14) of the electronic device 101.

Figures 22A, 22B:
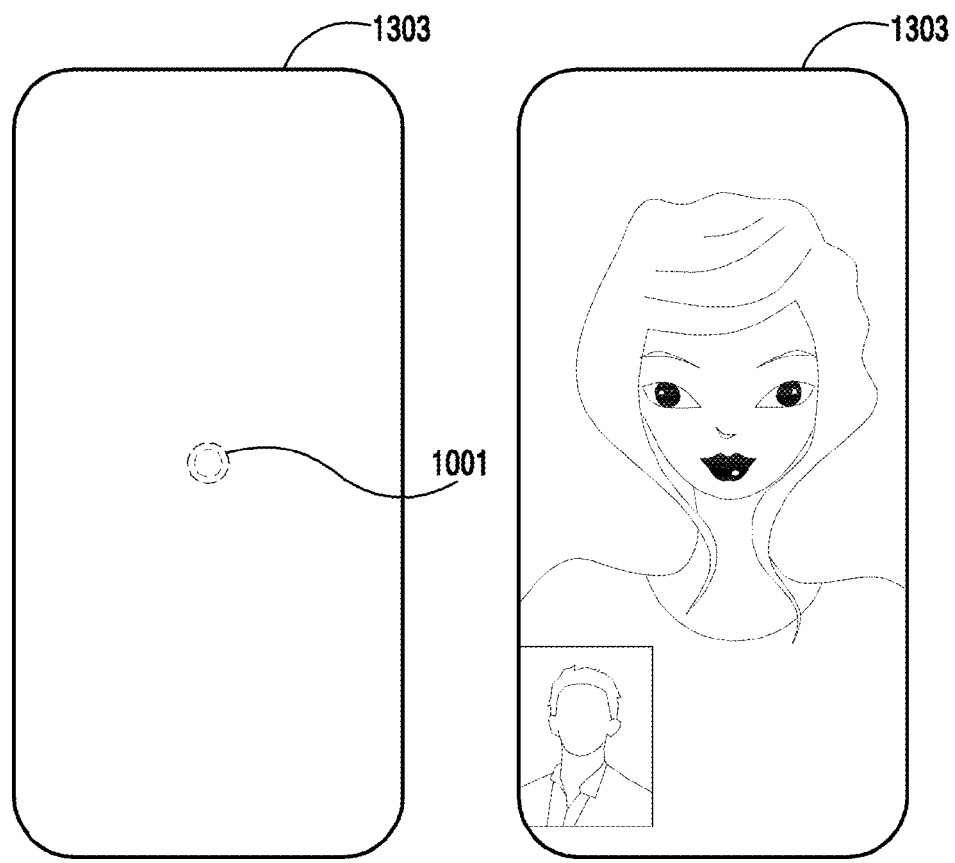
FIG. 22A is a diagram illustrating an example front surface of an electronic device according to various example embodiments.
FIG. 22B is a diagram illustrating an example screen of the electronic device according to various example embodiments.

FIG. 22A is a front surface of an electronic device according to various example embodiments. FIG. 22B illustrates an example diagram of a screen of the electronic device according to various example embodiments.

As illustrated in FIG. 22A and FIG. 22B, in various example embodiments, the camera device 1001 can be arranged at the center of a display 1303. And, at selfie or video telephony, user's eyes viewing the camera device 1001 can be guided to the center of the display 1303. That is, a user can check a photographed image through the display 1303 while performing the selfie or video telephony. Also, in various example embodiments, at video telephony, the electronic device 101 can provide an effect of making eye contact with a counterpart.

FIGS. 23, 24, 25, 26 and FIG. 27 are diagrams illustrating an operation of an electronic device according to various example embodiments.

Figure 23:
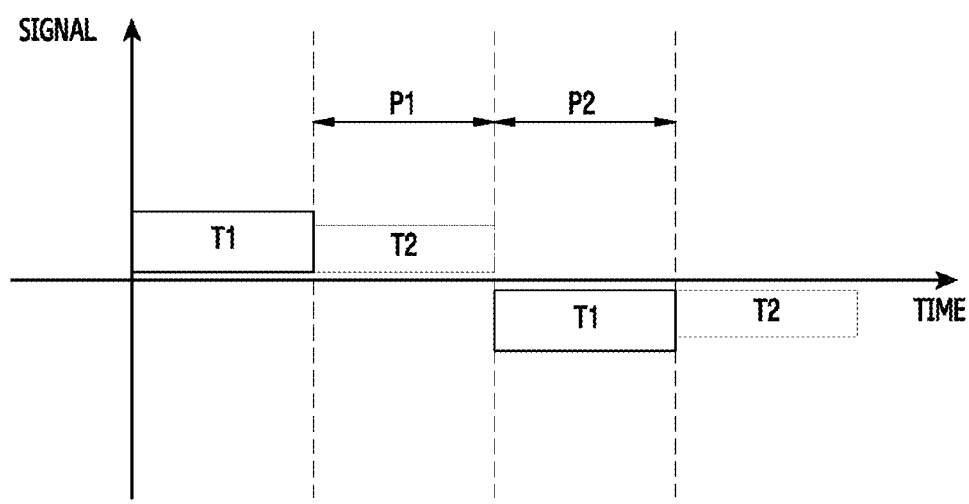
FIGS. 23, 24, 25, 26 and 27 are diagrams illustrating an example operation of an electronic device according to various example embodiments.

As illustrated in FIG. 23, the processor 120 can enable the display 1303 during 1st time periods (T1). The processor 120 can disable at least a part of at least one sensor during the 1st time periods (T1). The processor 120 can disable at least a part of the display 1303 during at least a part of 2nd time periods (T2) at least partially not overlapping with the 1st time periods (T1). The 2nd time periods, which are periods at least partially not overlapping with the 1st time periods (T1), can alternate with the 1st time periods (T1).

The processor 120 can enable at least one sensor during the 2nd time periods (T2). For example, the processor 120 can enable the camera device 1001 during the 2nd time periods (T2). That is, the processor 120 can alternately enable the display 1303 and the camera device 1001. Accordingly, the display 1303 and the camera device 1001 can work in a state of not being mutually interfered.

The 1st time periods (T1) and the 2nd time periods (T2) can be the same as each other. That is, the time for enabling the display 1303 and the time for enabling the camera device 1001 can be the same as each other. In detail, the screen display time of the display 1303 and the light receiving time of the camera device 1001 can be the same as each other.

According to various example embodiments, the 1st time periods (T1) can have a 1st period (P1), and the 2nd time periods (T2) can have a 2nd period (P2). The 1st time periods (T1) can be repeated according to the 1st period (P1). The 2nd time periods (T2) can be repeated according to the 2nd period (P2). As illustrated in FIG. 23, the 1st period (P1) and the 2nd period (P2) can be the same as each other. That is, the 1st period (P1) for enabling the display 1303 and the 2nd period (P2) for enabling the camera device 1001 can be the same as each other.

Figure 24:
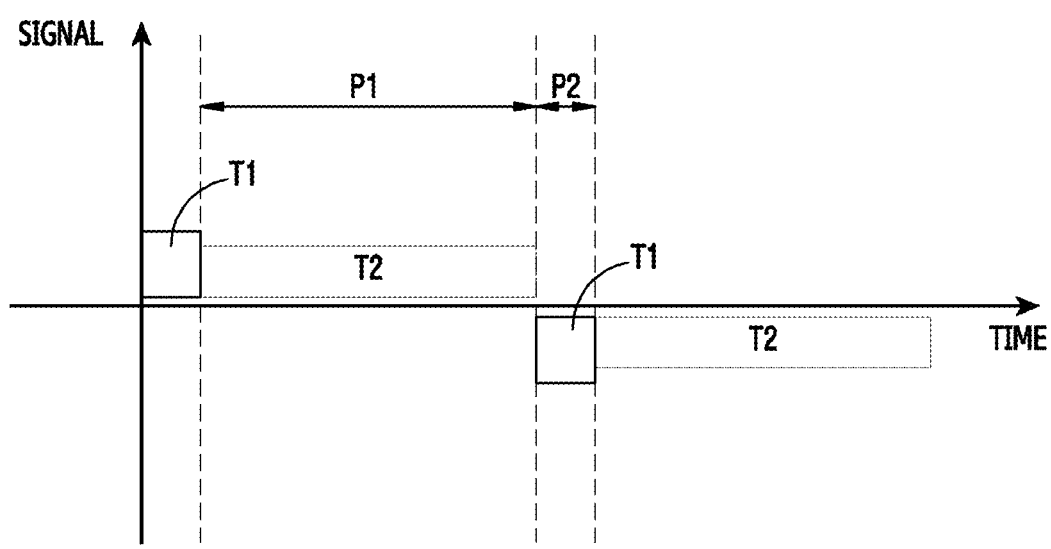

As illustrated in FIG. 24, according to various example embodiments, 1st time periods (T1) can be less than 2nd time periods (T2). That is, the time for enabling the display 1303 can be less than the time for enabling at least one sensor. For example, the time for enabling the display 1303 can be less than the time for enabling the camera device 1001. In detail, the screen display time of the display 1303 can be less than the light receiving time of the camera device 1001. According to various example embodiments, the time for enabling the display 1303 can be the minimum time for which a flicker of the display 1303 is not substantially recognized by user's eyes. For example, the minimum time for which the flicker of the display 1303 is not substantially recognized by the user's eyes can be within a range of about 5 milliseconds (ms) to 16.7 ms. Accordingly, during the remaining time excluding the minimum time for which the flicker of the display 1303 is substantially not recognized by the user's eyes, the camera device 1001 can be enabled.

At this time, the 1st period (P1) can be greater than the 2nd period (P2). That is, the period for enabling the display 1303 can be greater than the period for enabling the camera device 1001. That is, the processor 120 can more frequently enable the camera device 1001 than the display 1303.

According to various example embodiments, the 1st time periods (T1) can be about ⅛ to ⅔ times less than the 2nd time periods (T2). In case where the 1st time periods (T1) is about ⅛ to ⅔ times less than the 2nd time periods (T2), the flicker of the display 1303 may not be recognized. In case where the 1st time periods (T1) is about ⅛ times less than the 2nd time periods (T2), because a driving time of the display 1303 is too less, normal screen displaying may not be achieved on the display 1303. In case where the 1st time periods (T1) is about ⅔ times greater than the 2nd time periods (T2), the flicker of the display 1303 can be recognized. In this case, the 1st period (P1) can be about 1.5 times to 8 times greater than the 2nd period (P2). That is, the period for enabling the display 1303 can be about 1.5 times to 8 times greater than the period for enabling the camera device 1001.

Figure 25:
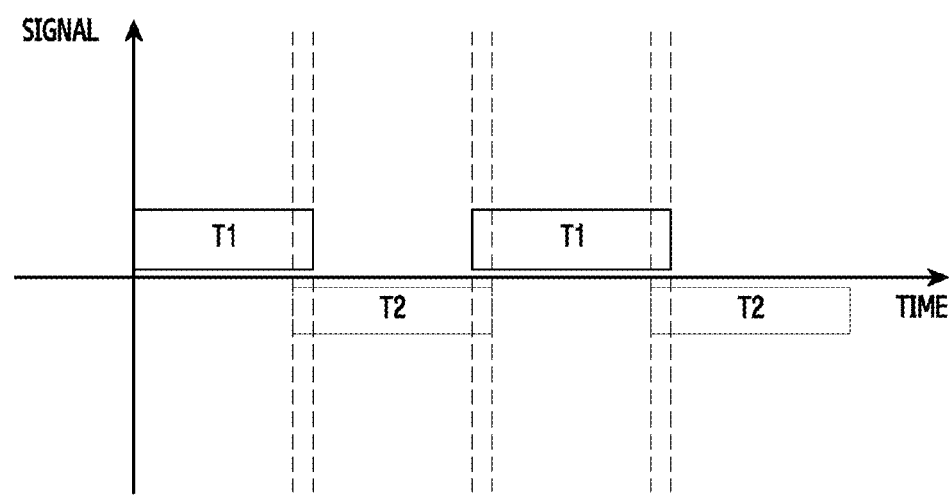

According to various example embodiments, as illustrated in FIG. 25, 1st time periods (T1) and 2nd time periods (T2) can be at least partially overlapped with each other. That is, the time for enabling the display 1303 and the time for enabling at least one sensor can be partially overlapped with each other. In detail, the time for enabling the display 1303 and the time for enabling the camera device 1001 can be partially overlapped with each other. That is, the screen display time of the display 1303 and the light receiving time of the camera device 1001 can be partially overlapped with each other. The overlapping time can be the time taking into consideration an operation delay of the display 1303 and the camera device 1001.

Figure 26:
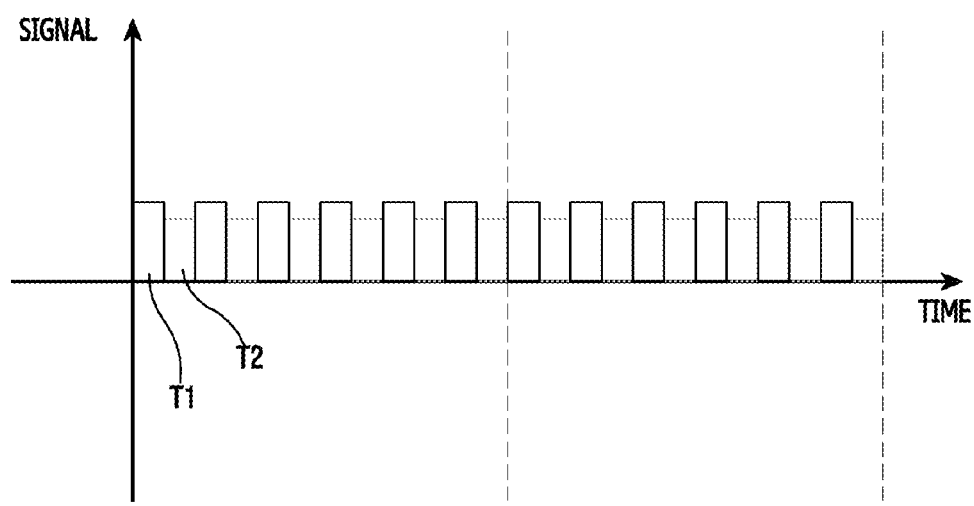

According to various example embodiments, as illustrated in FIG. 26, 1st time periods (T1) and 2nd time periods (T2) can be the same as each other. That is, the time for enabling the display 1303 and the time for enabling the camera device 1001 can be the same as each other. In detail, the screen display time of the display 1303 and the light receiving time of the camera device 1001 can be the same as each other. The 1st time periods (T1) and the 2nd time periods (T2) can be the minimum time for which a flicker of the display 1303 is not substantially acknowledged by user's eyes. For example, the minimum time for which the flicker of the display 1303 is not substantially recognized by the user's eyes can be within a range of about 5 ms to 16.7 ms. At this time, the 1st period (P1) and the 2nd period (P2) can be the same as each other. That is, the period for enabling the display 1303 and the period for enabling the camera device 1001 can be the same as each other.

Figure 27:
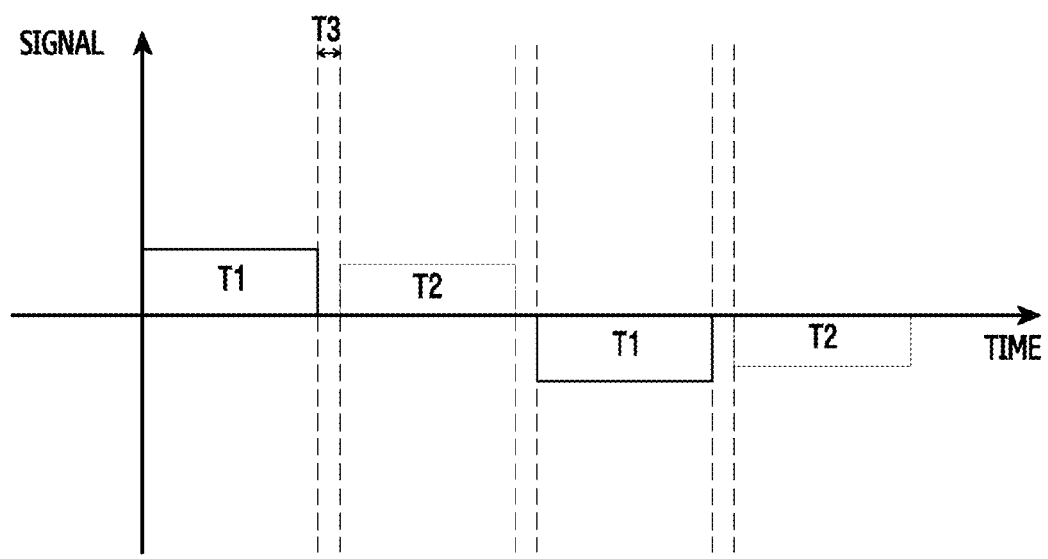

According to various example embodiments, as illustrated in FIG. 27, one of 1st time periods (T1) and one of 2nd time periods (T2) can be spaced 3rd time periods (T3) apart from each other. In detail, the one of the 1st time periods (T1) and the one of the 2nd time periods (T2) immediately following the one of the 1st time periods (T1) can be spaced the 3rd time periods (T3) apart from each other. That is, the 3rd time periods (T3) can be allocated between the 1st time periods (T1) and the 2nd time periods (T2). During the 3rd time periods (T3), the processor 120 may not enable all of the display 1303 and at least one sensor. For example, during the 3rd time periods (T3), the processor 120 may not enable all of the display 1303 and the camera device 1001. That is, by allocating the 3rd time periods (T3), the processor 120 can prevent interference between the display 1303 and the at least one sensor.

According to various example embodiments, the processor 120 can receive a user input to the display 1303, and disable at least one sensor in response to the user input. In detail, the processor 120 can receive a user input to the display 1303, and disable the camera device 1001 in response to the user input. In this case, during the 3rd time periods (T3) greater than the 1st time periods (T1), the processor 120 can enable the display 1303. Or, the processor 120 can receive a user input enabling the camera device 1001, and disable the display 1303 in response to the user input. That is, the processor 120 can enable the display 1303 or the at least one sensor in accordance with the user input.

According to various example embodiments, the processor 120 can enable the display 1303 during the 1st time periods (T1), and enable the camera device 1001 during the 2nd time periods immediately following the 1st time periods (T1). That is, the processor 120 can enable all of the display 1303 and the camera device 1001 during the 1st time periods (T1). Meantime, the processor 120 can acquire an image, using information that is received through the camera device 1001 during the 2nd time periods (T2) at least partially not overlapping with the 1st time periods (T1). That is, although the processor 120 enables the camera device 1001 during all of the 1st time periods (T1) and the 2nd time periods (T2), the processor 120 can use only information that is received through the camera device 1001 enabled during the 2nd time periods (T2), without using information that is received through the camera device 1001 enabled during the 1st time periods (T1). According to various example embodiments, although the camera device 1001 continuously works, the processor 120 can discard a part of data received from the camera device 1001 and use only the remnant data.

Figure 28:
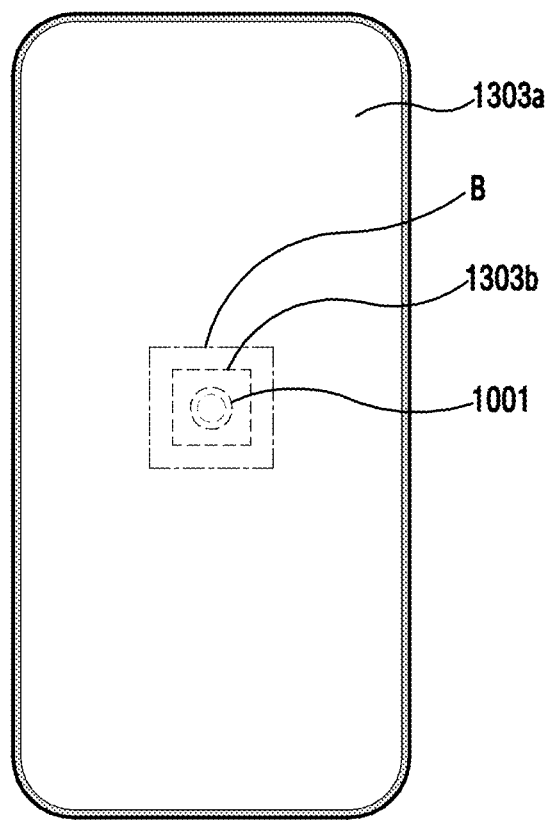
FIG. 28 is a diagram illustrating a front view of an electronic device according to various example embodiments.
Figure 29A:
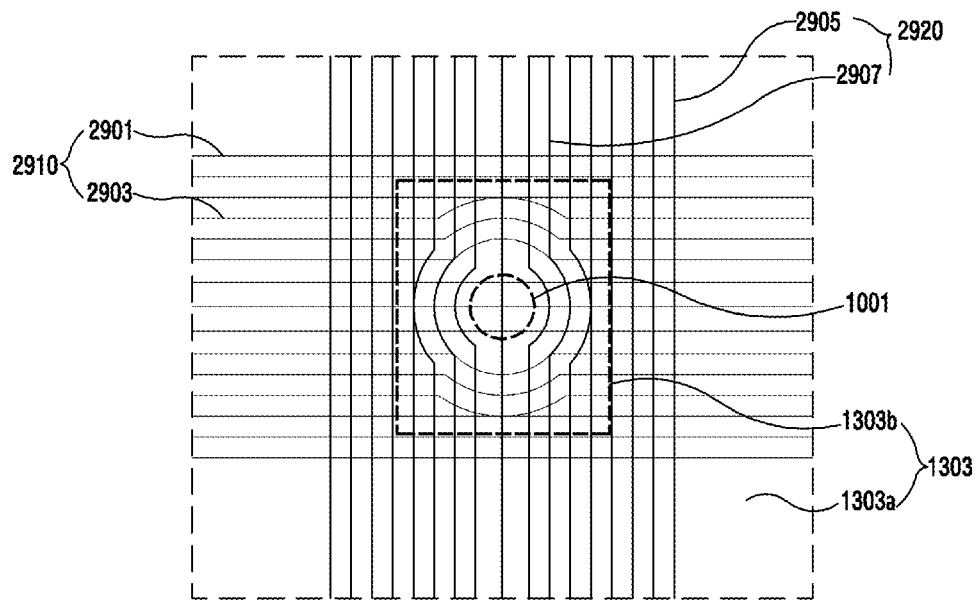
FIGS. 29A, 29B and 29C are diagrams illustrating an extended view of a portion 'B' of FIG. 28.
Figure 29B:
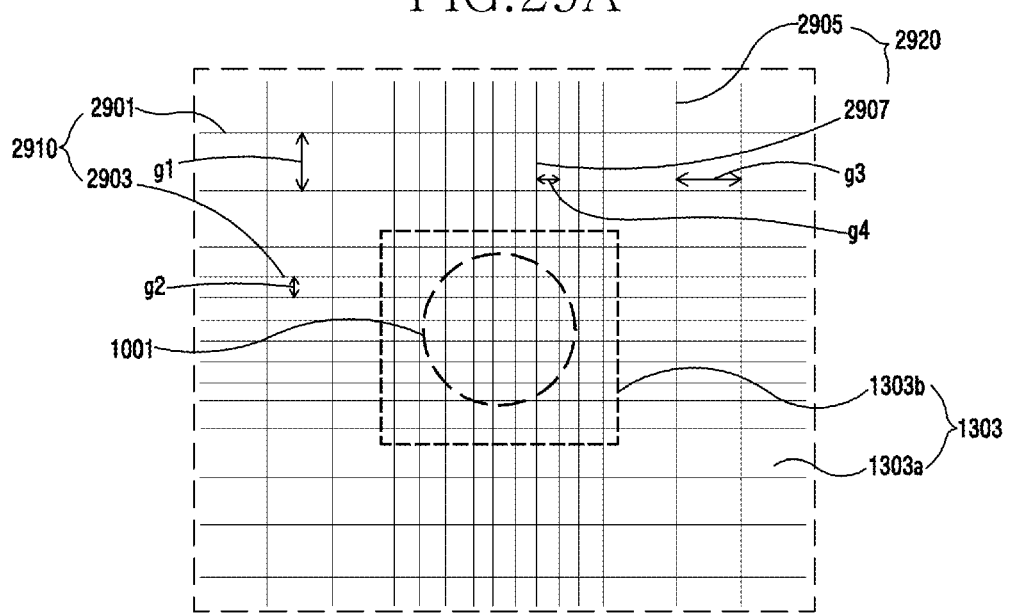
Figure 29C:
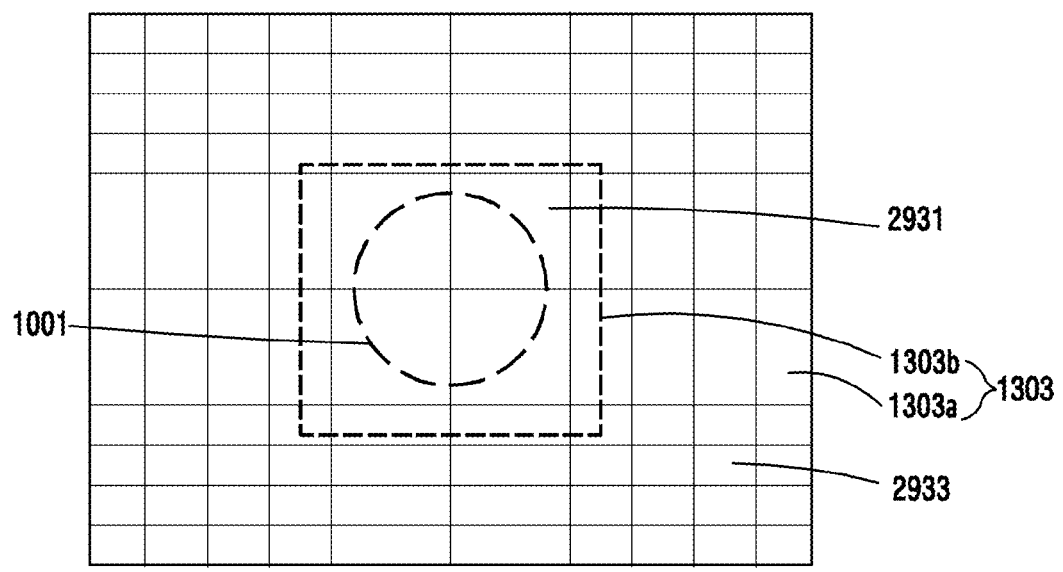

FIG. 28 is a front view of an electronic device according to various example embodiments. FIGS. 29A, 29B and 29C are an extended view of a portion 'B' of FIG. 28. FIG. 29 extends and illustrates a structure in which the display 1303 and the camera device 1001 are overlapped with each other in the portion 'B' of FIG. 28, when viewed from the top surface of the electronic device 101.

As illustrated in FIG. 28 and FIGS. 29A-29C, the display 1303 can include the 1st region 1303*a* not overlapping with the camera device 1001, and the 2nd region 1303*b* overlapping with the camera device 1001. The display 1303 can include a gate wiring 2910 and a data wiring 2920. The gate wiring 2910 can forward a 1st signal to a pixel (RGB) and control a gate of the pixel. The gate wiring 2910 can include a 1st gate wiring 2901 arranged in the 1st region 1303*a* and a 2nd gate wiring 2903 crossing the 2nd region 1303*b*. The data wiring 2920 can forward a 2nd signal to a pixel and control to display an image or picture on the display 1303. The data wiring 2920 can include a 1st data wiring 2905 arranged in the 1st region 1303*a* and a 2nd data wiring 2907 crossing the 2nd region 1303*b*.

As illustrated in FIG. 29A, according to various example embodiments, at least any one of the form of the 1st gate wiring 2901 or the form of the 1st data wiring 2905 can be different from at least any one of the form of the 2nd gate wiring 2903 or the form of the 2nd data wiring 2907. For example, the form of the 1st gate wiring 2901 or the form of the 1st data wiring 2905 can be of a straight line shape. Unlike this, at least a part of the 2nd gate wiring 2903 or the 2nd data wiring 2907 can include a curved shape. In detail, a portion arranged in the 2nd region 1303*b* among the 2nd gate wiring 2903 or the 2nd data wiring 2907 can include a curved shape. At least a part of the 2nd gate wiring 2903 or the 2nd data wiring 2907 can include a shape not overlapping with the camera device 1001. At least a part of the 2nd gate wiring 2903 or the 2nd data wiring 2907 can be arranged to detour around the camera device 1001. Accordingly, this wiring form can prevent a quantity of light received by the camera device 1001 from being reduced due to the gate wiring 2910 or the data wiring 2920 arranged in the display 1303. That is, this wiring form can reduce the influence of the gate wiring 2910 or data wiring 2920 on the quantity of light received by the camera device 1001.

As illustrated in FIG. 29B, according to various example embodiments, a gap (g1) between the 1st gate wirings 2901 or a gap (g3) between the 1st data wirings 2905 can be different from a gap (g2) between the 2nd gate wirings 2903 or a gap (g4) between the 2nd data wirings 2907. In detail, the gap (g1) between the 1st gate wirings 2901 or the gap (g3) between the 1st data wirings 2905 can be greater than the gap (g2) between the 2nd gate wirings 2903 or the gap (g4) between the 2nd data wirings 2907. Accordingly, the number of the 2nd gate wirings 2903 or 2nd data wirings 2907 arranged in the 2nd region 1303*b* can be greater than the number of the 1st gate wirings 2901 or 1st data wirings 2905 arranged in the 1st region 1303*a*. A density per unit area of the 2nd gate wirings 2903 or 2nd data wirings 2907 arranged in the 2nd region 1303*b* can be greater than a density per unit area of the 1st gate wirings 2901 or 1st data wirings 2905 arranged in the 1st region 1303*a*. According to various example embodiments, when viewed from the front of the electronic device 101, the camera device 1001 may not be acknowledged by the 2nd gate wiring 2903 or the 2nd data wiring 2907. Meantime, a capability of light receiving of the camera device 1001 illustrated in FIG. 29B may be better than that of the camera device 1001 illustrated in FIG. 29A. Accordingly, as illustrated in FIG. 29B, although the gate wirings 2910 or data wirings 2920 overlapping with the camera device 1001 are many in number, it may not have influence on the quantity of light received by the camera device 1001.

According to various example embodiments, as illustrated in FIG. 29C, the display 1303 can include a pixel. The pixel can include a 1st pixel 2933 arranged in the 1st region 1303a of the display 1303, and a 2nd pixel 2931 arranged in the 2nd region 1303b. The 1st pixel 2933 can have a 1st structure. The 2nd pixel 2931 can have a 2nd structure different from the 1st structure. That is, the 1st pixel 2933 and the 2nd pixel 2931 can include mutually different structures, respectively.

According to various example embodiments, pixels per inch (ppi) of the 2nd region 1303b can be less than pixels per inch of the 1st region 1303a. That is, the number of the 2nd pixels 2931 per inch arranged in the 2nd region 1303b can be less than the number of the 1st pixels 2933 per inch arranged in the 1st region 1303a. Accordingly, a resolution of the 2nd region 1303b of the display 1303 can be less than a resolution of the 1st region 1303a. Or, only a part of the 2nd pixel 2931 arranged in the 2nd region 1303b is used, and the remnant part not used can be used as a light receiving part of the camera device 1001. For example, only 50% of the 2nd pixel 2931 arranged in the 2nd region 1303b is used, and the remnant 50% of the 2nd pixel 2931 is not used, whereby this remnant portion can be used as the light receiving part of the camera device 1001. Various example embodiments can prevent a quantity of light received by the camera device 1001 from being decreased due to the 2nd pixel 2931 arranged in the display 1303. That is, the various example embodiments can reduce the influence of the 2nd pixel 2931 on the quantity of light received by the camera device 1001.

Meantime, though not illustrated in the drawings, according to various example embodiments, the pixels per inch of the 2nd region 1303b can be greater than the pixels per inch of the 1st region 1303a. That is, the number of the 2nd pixels 2931 per inch arranged in the 2nd region 1303b can be greater than the number of the 1st pixels 2933 per inch arranged in the 1st region 1303a. Accordingly, a resolution of the 2nd region 1303b of the display 1303 can be greater than a resolution of the 1st region 1303a. In various example embodiments, when viewed from the front of the electronic device 101, the electronic device 101 can be configured such that the camera device 1001 is not acknowledged by the 1st pixel 2933. Meantime, the camera device 1001 of the corresponding example embodiment can show a better light receiving capability than the camera device 1001 illustrated in FIG. 29C. Accordingly, as illustrated in FIG. 29C, although the 1st pixels 2933 overlapping with the camera device 1001 are many in number, it may not have influence on the quantity of light received by the camera device 1001.

Figure 30A:
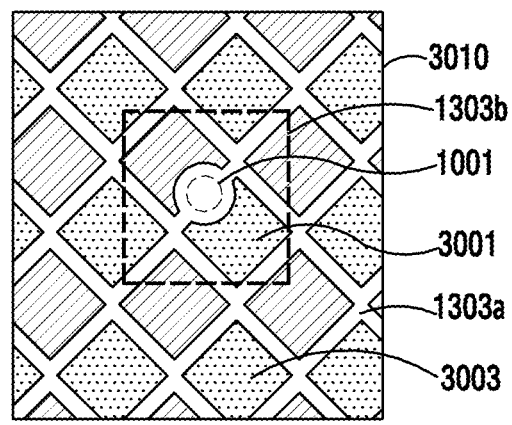
FIGS. 30A, 30B and 30C are diagrams illustrating an extended view of a portion 'B' of FIG. 28.
Figure 30B:
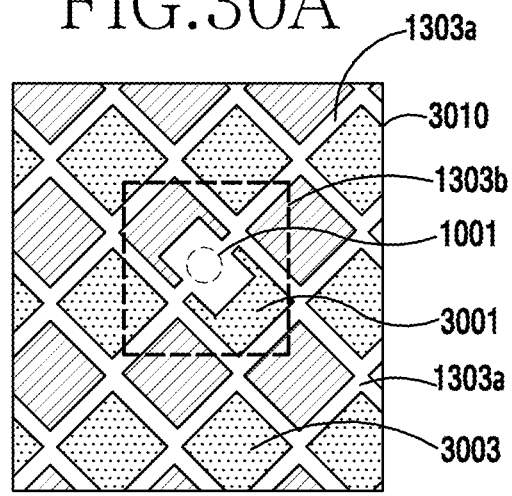
Figure 30C:
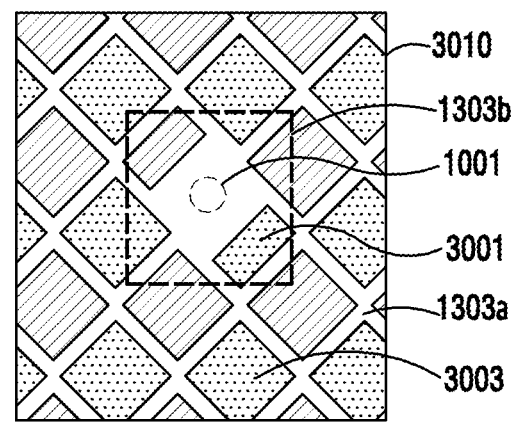

FIGS. 30A, 30B and 30C are an extended view of a portion 'B' of FIG. 28. FIGS. 30A-30C extend and illustrate a structure in which a touch screen 3010 and the camera device 1001 are overlapped with each other in the portion 'B' of FIG. 28, when viewed from the top surface of the electronic device 101.

As illustrated in FIG. 28 and FIGS. 30A-30C, the touch screen 3010 can include a region 1303a equivalent to the 1st region 1303a of the display 1409 and a region 1303b equivalent to the 2nd region 1303b. The touch screen 3010 can include the 1st region 1303a not overlapping with the camera device 1001, and the 2nd region 1303b overlapping with the camera device 1001. Meantime, the touch screen 3010 can be arranged between the transparent plate 1401 and the display 1409, or be arranged within the display 1409. The touch screen 3010 can include touch electrode patterns 3001 and 3003 for sensing a touch. The touch electrode patterns 3001 and 3003 can include a 1st touch electrode pattern 3003 and a 2nd touch electrode pattern 3001. The 1st touch electrode pattern 3003 can be arranged in the 1st region 1303a of the touch screen 3010. The 2nd touch electrode pattern 3001 can be arranged in the 2nd region 1303b of the touch screen 3010.

The 2nd touch electrode pattern 3001 can include a pattern different from the 1st touch electrode pattern 3003. The 2nd touch electrode pattern 3001 can be different in shape from the 1st touch electrode pattern 3003. The 2nd touch electrode pattern 3001 can have a shape not overlapping with the camera device 1001. The 2nd touch electrode pattern 3001 can be of a shape in which a part of the 2nd touch electrode pattern 3001 is cut out not to be overlapped with the camera device 1001. An area of the 2nd touch electrode pattern 3001 can be less than an area of the 1st touch electrode pattern 3003. For example, as illustrated in FIG. 30A, the 2nd touch electrode pattern 3001 adjacent with the camera device 1001 can include a bowed surface. Or, as illustrated in FIG. 30B, the 2nd touch electrode pattern 3001 adjacent with the camera device 1001 can include a recess. Or, as illustrated in FIG. 30C, the 2nd touch electrode pattern 3001 adjacent with the camera device 1001 can be cut out partially.

Figure 31A:
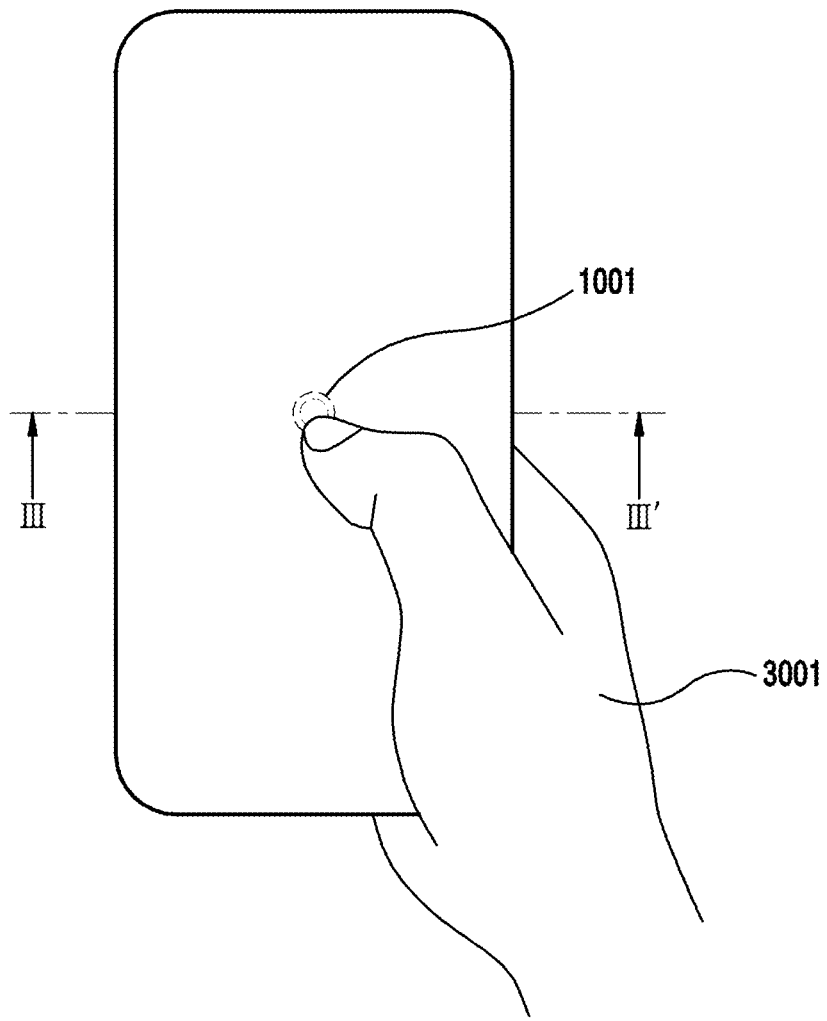
FIG. 31A is a diagram illustrating an example front view of an electronic device according to various example embodiments.

FIG. 31A is a front view of an electronic device according to various example embodiments. FIG. 31B to FIG. 31F illustrate sections taken along line III-III' of FIG. 31A.

As illustrated in FIG. 31A, according to various example embodiments, a region where the camera device 1001 is arranged can sense a pressure. That is, a central region of the electronic device 101 where the camera device 1001 is arranged can sense a pressure applied by an input means 3001.

Figure 31B:
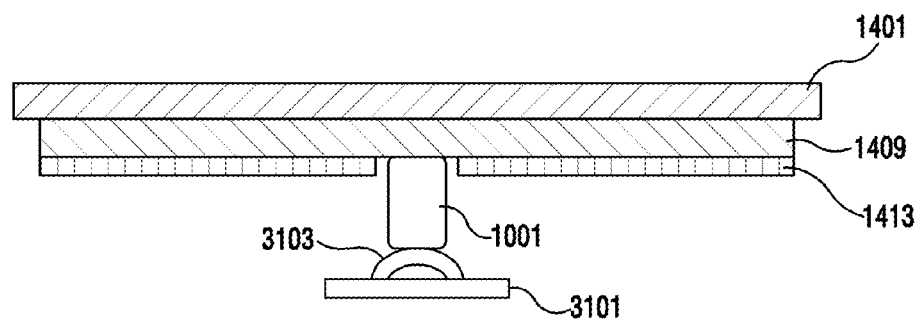
FIGS. 31B, 31C, 31D, 31E and 31F are diagrams illustrating sections taken along line III-III' of FIG. 31A.

As illustrated in FIG. 31B, the camera device 1001 can be arranged in a rear surface of the display 1409, and a dome key 3103 can be arranged in a rear surface of the camera device 1001. As the camera device 1001 is pressurized, the camera device 1001 can get in direct contact with the dome key 3103. That is, if the transparent plate 1401 is pressurized by the input means 3001, the pressure can be delivered to the camera device 1001 and thus the dome key 3103 can be pressed. As the dome key 3103 is pressed, a signal can be applied to a control circuit 3101. And, the processor 120 can process this signal.

Figure 31C:
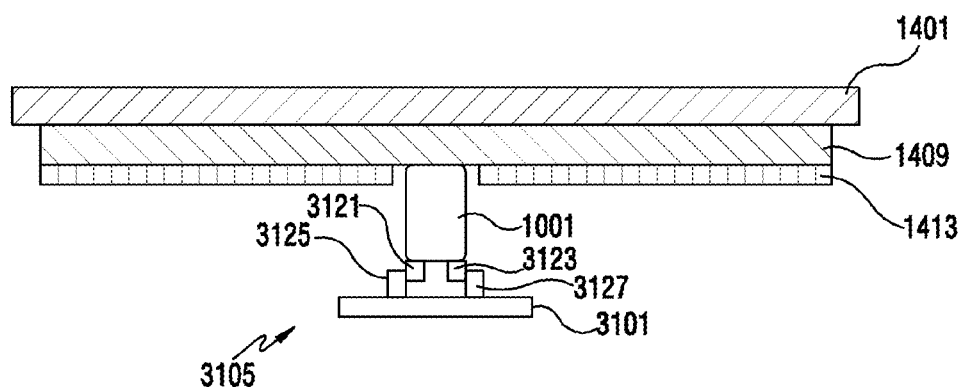

As illustrated in FIG. 31C, the camera device 1001 can be arranged in a rear surface of the display 1409, and a contact key 3105 can be arranged in a rear surface of the camera device 1001. As the camera device 1001 is pressurized, an area of contacting with the contact key 3105 can increase. The contact key 3105 can include a 1st key 3121, a 2nd key 3123, a 3rd key 3125 and a 4th key 3127. The camera device 1001 can get in contact with the 1st key 3121 and the 2nd key 3123. The 1st key 3121 and the 2nd key 3123 can get in contact with the 3rd key 3125 and the 4th key 3127, respectively. Accordingly, if the transparent plate 1401 is pressurized by the input means 3001, the pressure can be delivered to the camera device 1001 and thus, even the 1st key 3121 and the 2nd key 3123 can be pressurized. As the 1st key 3121 and the 2nd key 3123 are pressurized, contact areas with the 3rd key 3125 and the 4th key 3127 can increase. As the 1st key 3121 and the 2nd key 3123 increase the contact areas with the 3rd key 3125 and the 4th key 3127 respectively, a signal can be applied to the control circuit 3101. And, the processor 120 can process this signal.

Figure 31D:
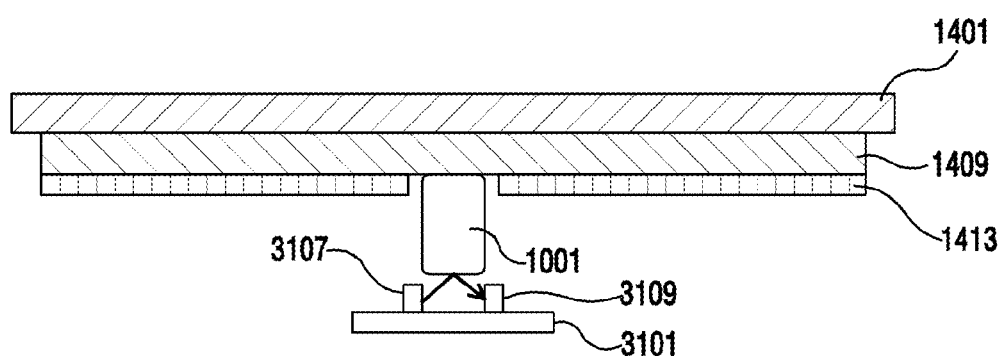

As illustrated in FIG. 31D, the camera device 1001 can be arranged in a rear surface of the display 1409, and a light emitting part 3107 and a light receiving part 3109 can be arranged in a rear surface of the camera device 1001. The light emitting part 3107 can emit light towards the camera device 1001. The light receiving part 3109 can receive light reflected from the camera device 1001. The processor 120 can determine the time taken until light emitted from the light emitting part 3107 to the camera device 1001 reaches the light receiving part 3109 after being reflected from the camera device 1001. Through this, the processor 120 can determine a quantity of pressure delivered to the camera device 1001. The more the quantity of pressure delivered to the camera device 1001 is, the less the time taken until the light emitted from the light emitting part 3107 reaches the light receiving part 3109 is. The more the quantity of pressure delivered to the camera device 1001 is, the closer a distance between the camera device 1001 and the light emitting part 3107 or the light receiving part 3109 is, so the light reaching time can be made short.

Figure 31E:
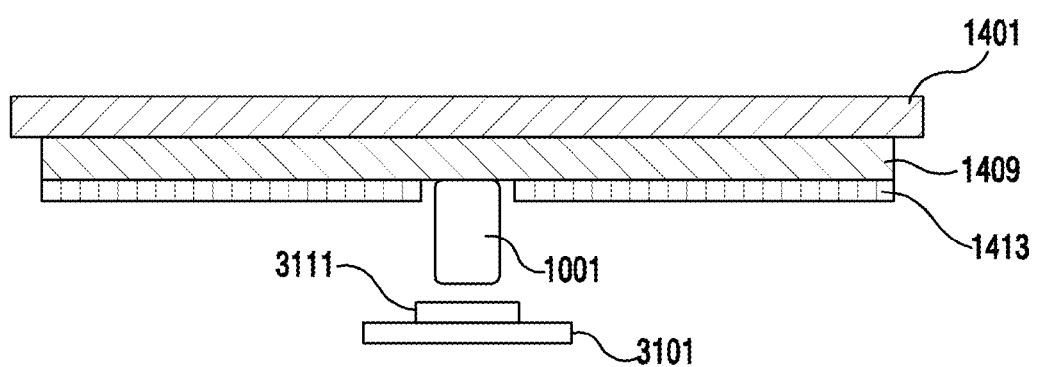

As illustrated in FIG. 31E, the camera device 1001 can be arranged in a rear surface of the display 1409, and a pressure sensor 3111 can be arranged in a rear surface of the camera device 1001. The pressure sensor 3111 can include piezoelectric materials. As the camera device 1001 is pressurized, the camera device 1001 can get in contact with the pressure sensor 3111. That is, if the transparent plate 1401 is pressurized by the input means 3001, the pressure can be delivered to the camera device 1001 and thus, the pressure sensor 3111 can sense this pressure. As the pressure is applied, the pressure sensor 3111 can generate a voltage. The control circuit 3101 electrically coupled with the pressure sensor 3111 can sense a degree of pressure.

Figure 31F:
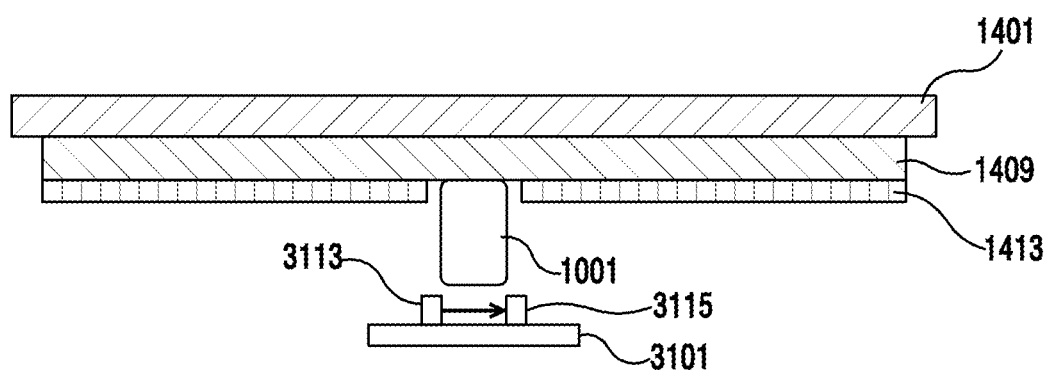

As illustrated in FIG. 31F, the camera device 1001 can be arranged in a rear surface of the display 1409, and a light emitting part 3113 and a light receiving part 3115 can be arranged in a rear surface of the camera device 1001. The light emitting part 3113 can emit light towards the light receiving part 3115. The light receiving part 3115 can receive light from the light emitting part 3113. As the camera device 1001 is pressurized, light may not reach the light receiving part 3115. That is, as the camera device 1001 is arranged between the light emitting part 3113 and the light receiving part 3115, the light receiving part 3115 can sense that light does not reach, and the processor 120 can process this.

Figure 32C:
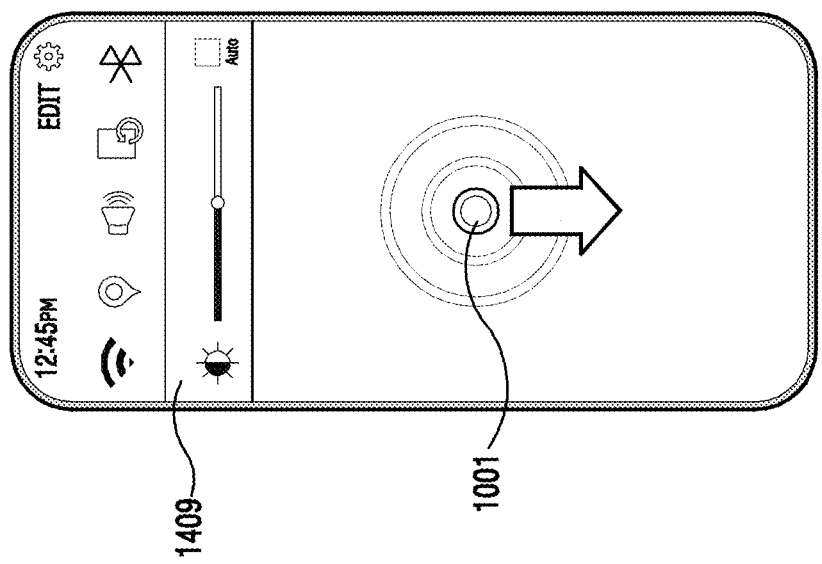
FIGS. 32A, 32B and 32C are diagrams illustrating an example of a screen of an electronic device according to various example embodiments.
Figure 32B:
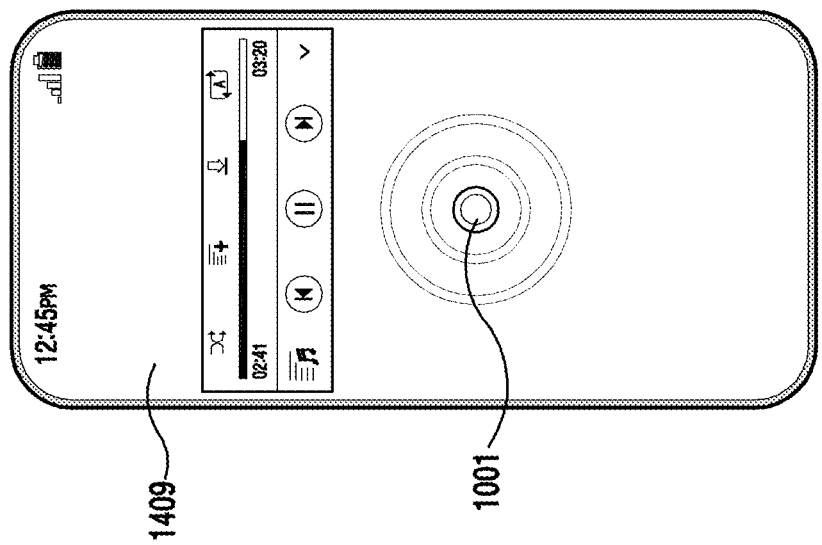
Figure 32A:
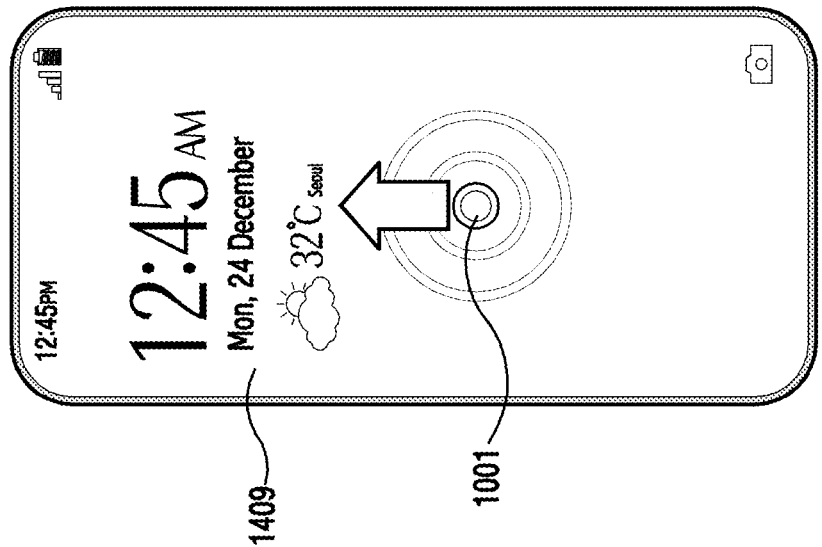
Figures 33A, 33B:
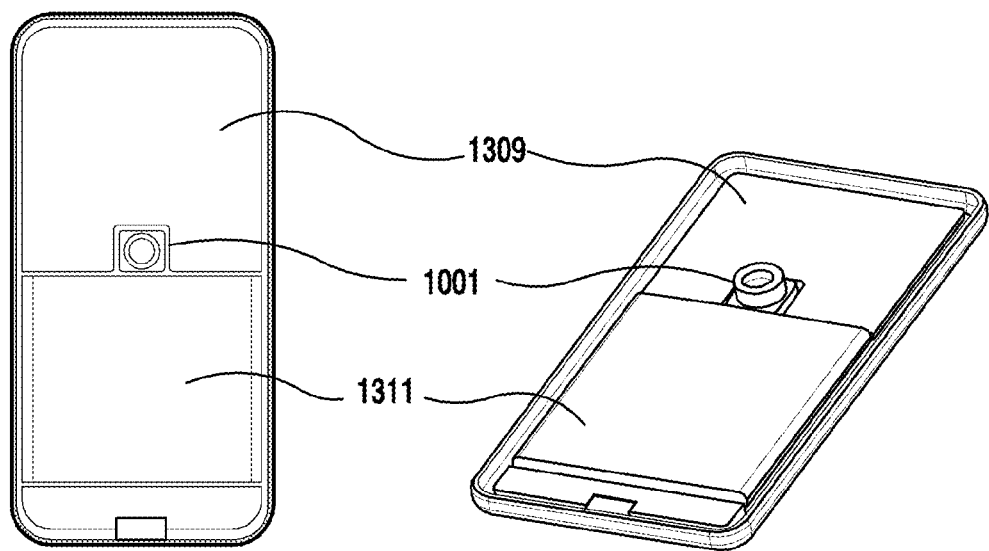
FIGS. 33A, 33B, 34A, 34B, 35A, 35B, 36A, 36B, 37A, 37B, 38A and 38B are diagrams illustrating example rear surfaces of an electronic device according to various example embodiments.
Figures 34A, 34B:
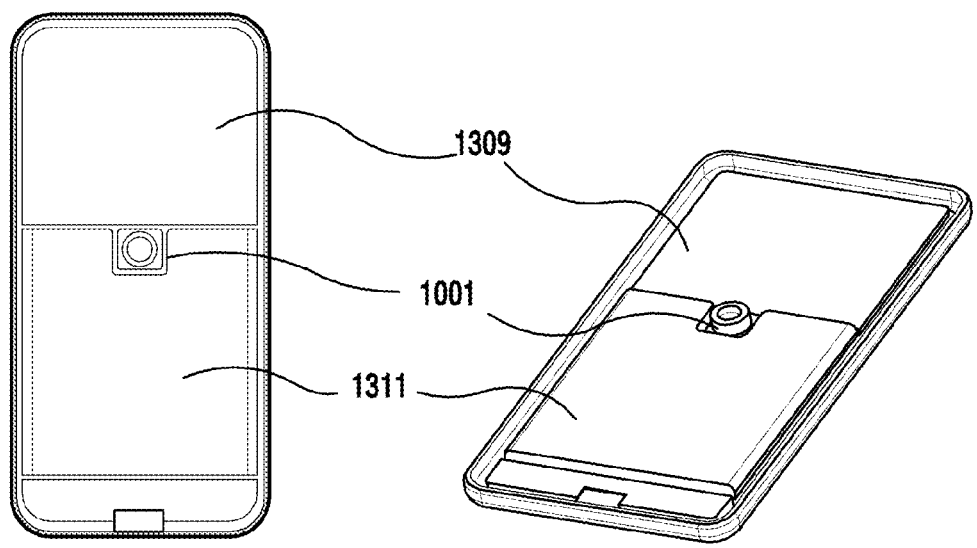
Figures 35A, 35B:
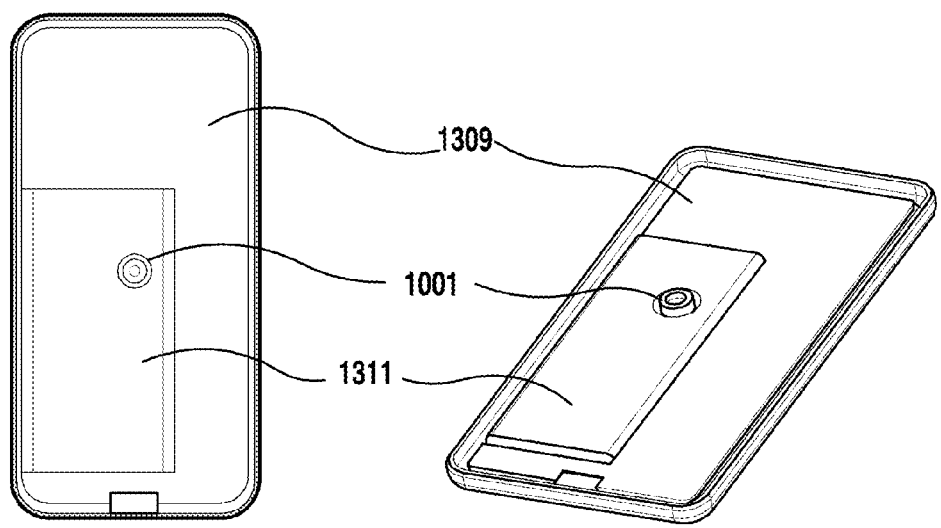
Figures 36A, 36B:
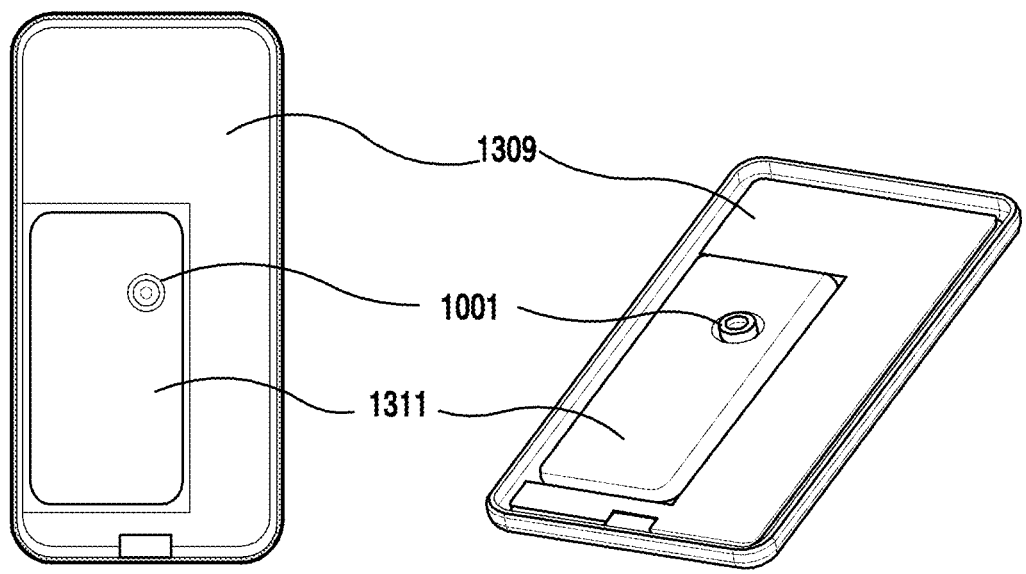
Figures 37A, 37B:
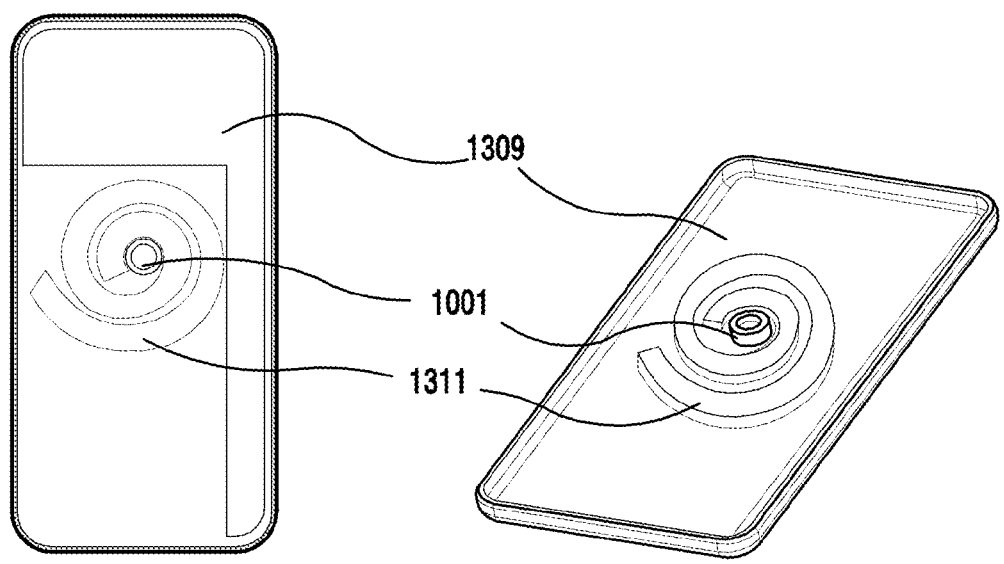
Figures 38A, 38B:
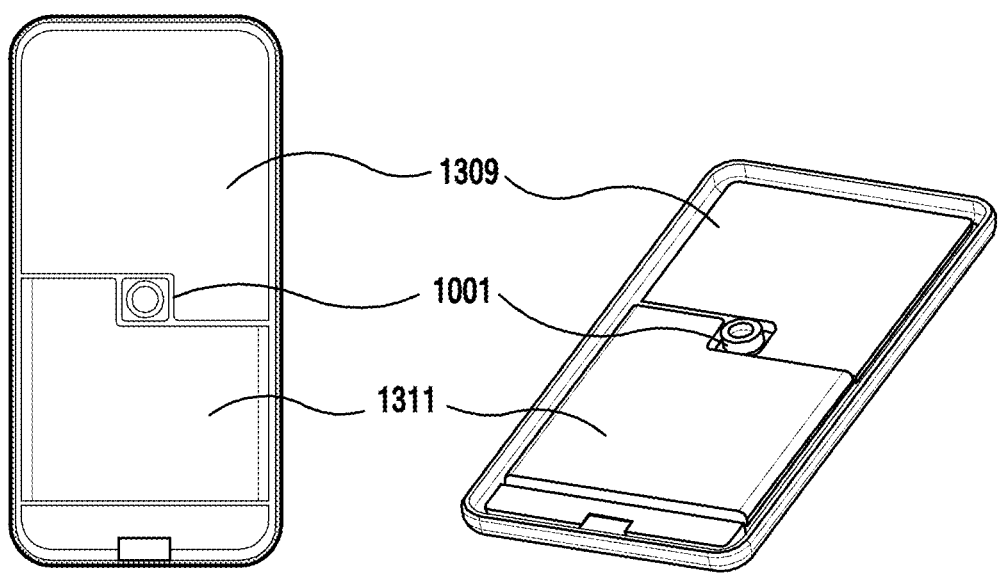

FIGS. 32A, 32B and 32C are example diagrams of a screen of an electronic device according to various example embodiments.

As illustrated in FIGS. 32A-32C, in various example embodiments, the electronic device 101 can sense a pressure applied to a central region where the camera device 1001 is arranged. By using this, the electronic device 101 can drive the screen. Accordingly, the electronic device 101 can replace a physical key or home key. For example, as illustrated in FIG. 32A, the electronic device 101 can drive the screen by sensing a touch input going towards an upper end of the display 1409 in an arrow direction together with a pressure applied to the central region. That is, in various example embodiments, the electronic device 101 can combine a pressure touch and a capacitive touch and drive the display 1409. The processor 120 can execute a specific application by using a pressure degree of the pressure touch and a touch direction of the capacitive touch, and can display the execution result on the display 1409.

Also, as illustrated in FIG. 32B, the electronic device 101 can sense only a pressure applied to the central region, and drive the screen. That is, in various example embodiments, the electronic device 101 can drive the display 1409 by using a pressure touch. The processor 120 can execute a specific application by using a pressure intensity of the pressure touch, and display the execution result on the display 1409.

Also, as illustrated in FIG. 32C, the electronic device 101 can drive the screen by sensing a touch input going towards a lower end of the display 1409 in an arrow direction, together with a pressure applied to the central region. That is, in various example embodiments, the electronic device 101 can combine a pressure touch and a capacitive touch and drive the display 1409. The processor 120 can execute a specific application by using a pressure intensity of the pressure touch and a touch direction of the capacitive touch, and can display the execution result on the display 1409.

FIGS. 33A, 33B, 34A, 34B, 35A, 35B, 36A, 36B, 37A, 37B, 38A and 38B illustrate rear surfaces of an electronic device according to various example embodiments.

In various example embodiments, the camera device 1001 is arranged at the center of the electronic device 101, whereby an arrangement structure or shape of the panel board assembly 1309 and the battery 1311 can become different. For example, as illustrated in FIG. 33, the panel board assembly 1309 can be arranged to detour around the camera device 1001. Or, as illustrated in FIG. 34, the battery 1311 can be arranged to detour around the camera device 1001. Or, as illustrated in FIG. 35, the battery 1311 can include an opening part for arrangement of the camera device 1001. Or, as illustrated in FIG. 36, the battery 1311 including a curved surface can include an opening part for arrangement of the camera device 1001. Or, as illustrated in FIG. 37, the battery 1311 can be a roll battery, and the battery 1311 can be arranged to surround the camera device 1001. Or, as illustrated in FIG. 38, the panel board assembly 1309 and the battery 1311 can be all arranged to detour around the camera device 1001.

Figure 39A:
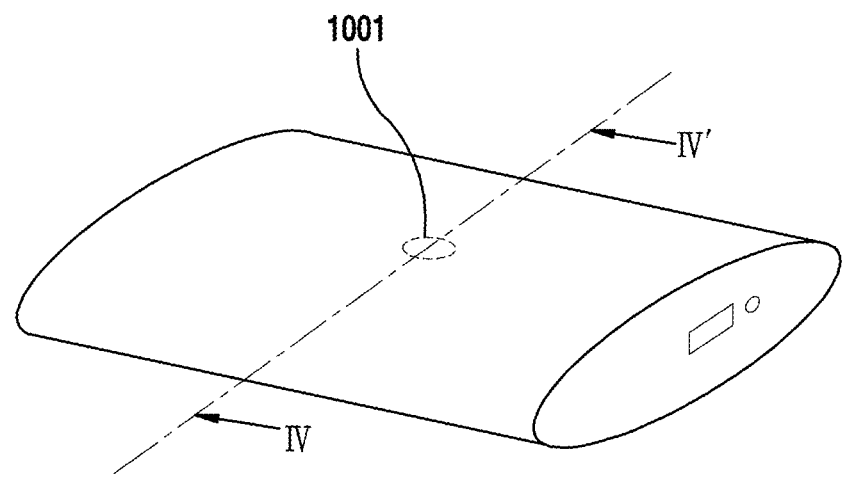
FIG. 39A is a perspective view of an electronic device according to various example embodiments.
Figure 39B:
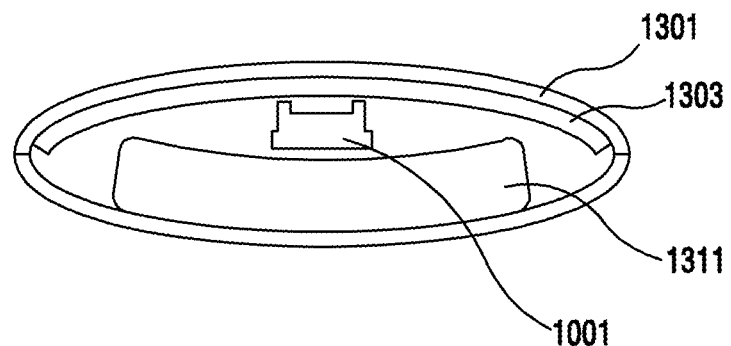
FIG. 39B is a section taken along line IV-IV' of FIG. 39A.
Figure 39C:
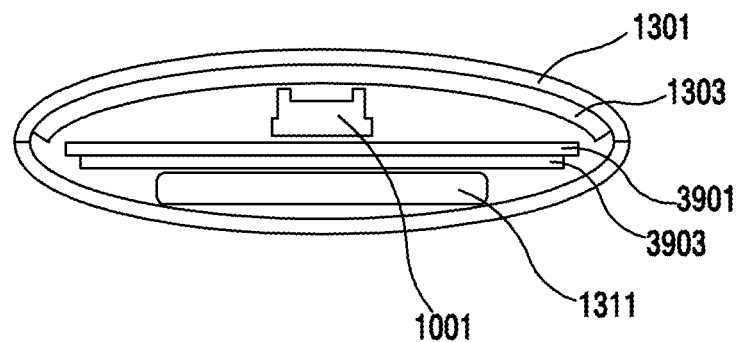
FIG. 39C is a section taken along line IV-IV' of FIG. 39A.

FIG. 39A illustrates a perspective view of an electronic device according to various example embodiments. FIG. 39B illustrates a section taken along line IV-IV' of FIG. 39(a). FIG. 39C illustrates a section taken along line IV-IV' of FIG. 39(a).

As illustrated in FIG. 39A, a front surface and rear surface of the electronic device 101 according to various example embodiments can have all curved shapes. As illustrated in FIG. 39B, the battery 1311 can be of a shape including a curved surface. That is, as the electronic device 101 has the curved shape, even the battery 1311 arranged therein can have a curved shape. On this curved-shape battery 1311, the camera device 1001 can be arranged. But, an example embodiment is not limited to this and, as illustrated in FIG. 39C, the battery 1311 not having the curved shape can be arranged within the electronic device 101 of the curved shape as well. On this battery 1311, various layers 3901 and 3903 can be arranged and, on these various layers 3901 and 3903, the camera device 1001 can be arranged as well.

Figure 40A:
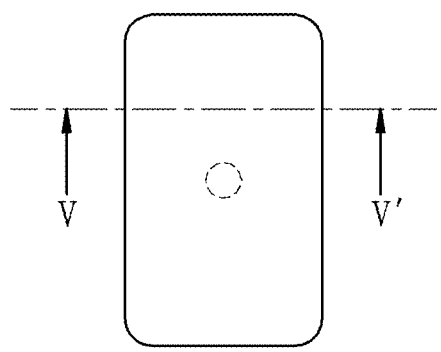
FIG. 40A is a front view illustrating an example electronic device according to various example embodiments.

FIG. 40A is a front view of an electronic device according to various example embodiments. FIG. 40B to FIG. 40I illustrate sections taken along line V-V' of FIG. 40A.

Figure 40B:
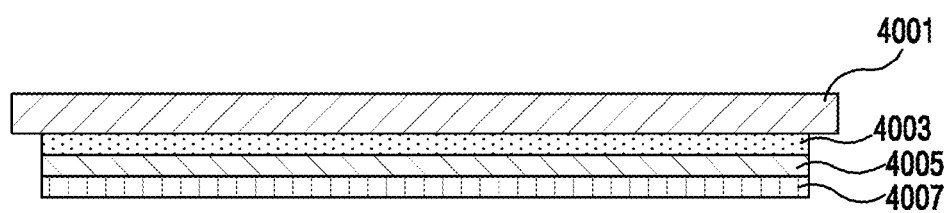
FIGS. 40B, 40C, 40D, 40E, 40F, 40G, 40H and 40I are sections taken along line V-V' of FIG. 40A.

As illustrated in FIG. 40B, the electronic device 101 can include a transparent plate 4001, a touch screen 4003, a display 4005, and a pressure sensor 4007. In various example embodiments, the pressure sensor 4007 can replace a physical key. That is, because the electronic device 101 arranges the display 4005 in front, the electronic device 101 can omit an existing physical key, and can replace the physical key with the pressure sensor 4007. The pressure sensor 4007 can be provided in various forms in shape, size, number, etc. The pressure sensor 4007 can be provided transparently such that the pressure sensor 4007 is not acknowledged from the external. Or, the pressure sensor 4007 can be opaque as well. At this time, the pressure sensor 4007 can be arranged in a rear surface of the display 4005.

Figure 40C:
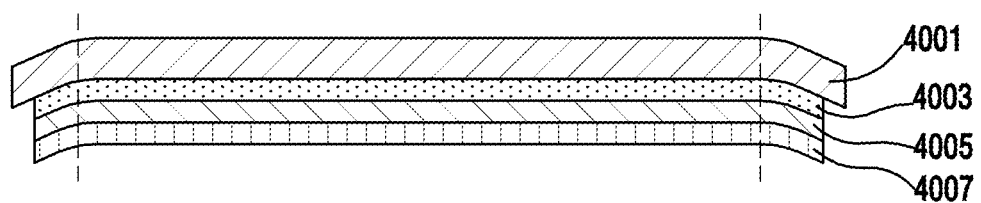

According to various example embodiments, as illustrated in FIG. 40C, at least one lateral surface of the transparent plate 4001, touch screen 4003, display 4005 and pressure sensor 4007 can be of a bent shape. The one lateral surface of the transparent plate 4001, touch screen 4003, display 4005 and pressure sensor 4007 can be bent from a front surface of the electronic device 101. The transparent plate 4001, the touch screen 4003, the display 4005 and the pressure sensor 4007 can include a curved surface. The at least one lateral surface of the transparent plate 4001, touch screen 4003, display 4005 and pressure sensor 4007 can include a curved surface.

Figure 40D:
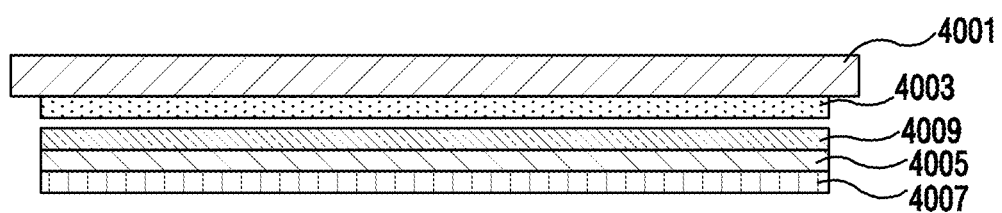

As illustrated in FIG. 40D, the touch screen 4003 can be integrally formed on the transparent plate 4001. That is, constructions of the touch screen 4003 can be formed on the transparent plate 4001. The display 4005 can be arranged beneath the transparent plate 4001 on which the touch screen 4003 is integrally formed. The transparent plate 4001 and the display 4005 can be adhered to each other by means of an adhesive part 4009. Beneath this display 4005, the pressure sensor 4007 can be arranged.

Figure 40E:
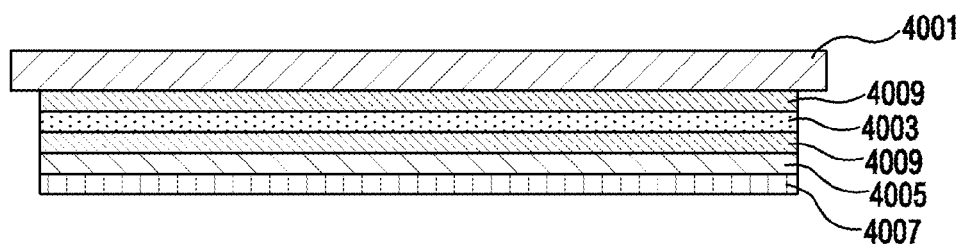

Or, as illustrated in FIG. 40E, the touch screen 4003 can be separately arranged under the transparent plate 4001, and the transparent plate 4001 and the touch screen 4003 can be adhered to each other by means of the adhesive part 4009. The display 4005 can be arranged under the touch screen 4003. The touch screen 4003 and the display 4005 can be adhered to each other by means of an adhesive part 4009. Beneath this display 4005, the pressure sensor 4007 can be arranged.

Figure 40F:
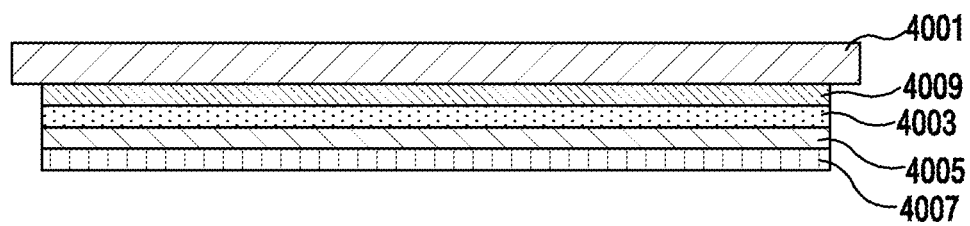

Or, as illustrated in FIG. 40F, the touch screen 4003 can be integrally formed on the display 4005. That is, constructions of the touch screen 4003 can be formed on the display 4005. The transparent plate 4001 and the touch screen 4003 integrated type display 405 can be adhered to each other by means of an adhesive part 4009. Beneath this display 4005, the pressure sensor 4007 can be arranged.

Figure 40G:
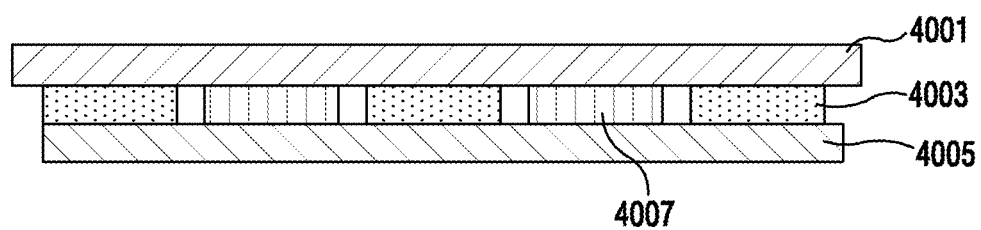

Or, as illustrated in FIG. 40G the pressure sensor 4007 and the touch screen 4003 can be arranged in the same layer. For example, constructions of the pressure sensor 4007 and touch screen 4003 can be formed on the display 4005. That is, the pressure sensor 4007 and touch screen 4003 can be integrally formed on the display 4005. The constructions of the pressure sensor 4007 and touch screen 4003 can be arranged alternately.

Figure 40H:
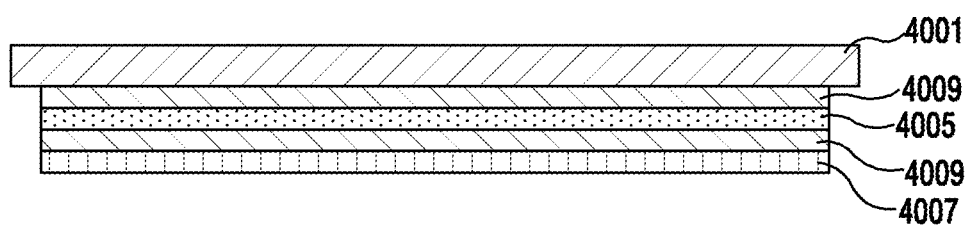

Or, as illustrated in FIG. 40H, a touch screen can be formed within the display 4005. That is, constructions of the touch screen can be embedded within the display 4005. The transparent plate 4001 and the touch screen integrated type display 4005 can be adhered to each other by means of an adhesive part 4009. Under this display 4005, the pressure sensor 4007 can be arranged. The display 4005 and the pressure sensor 4007 can be adhered to each other by means of an adhesive part 4009.

Figure 40I:
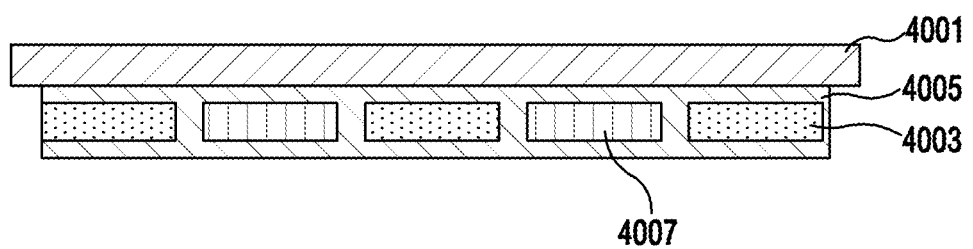

Or, as illustrated in FIG. 40I, the pressure sensor 4007 and the touch screen 4003 can be arranged within the display 4005. That is, constructions of the pressure sensor 4007 and touch screen 4003 can be embedded within the display 4005. Through this, a thickness of the electronic device 101 can be reduced.

Figure 41A:
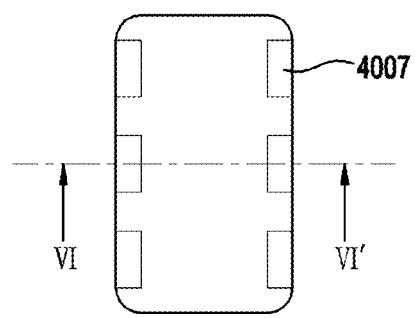
FIG. 41A is a front view illustrating an example electronic device according to various example embodiments.
Figure 41B:
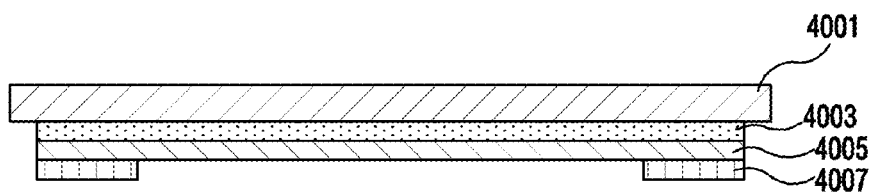
FIG. 41B and FIG. 41C are sections taken along line VI-VI' of FIG. 41A.
Figure 41C:
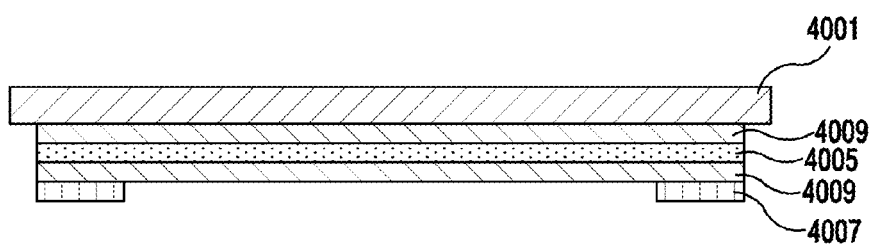

FIG. 41A is a front view of an electronic device according to various example embodiments. FIG. 41B and FIG. 41C illustrate sections taken along line VI-VI' of FIG. 41A.

As illustrated in FIG. 41A, the pressure sensor 4007 can be arranged only in a partial region of the electronic device 101. For example, the pressure sensor 4007 can be arranged in a lateral surface of the electronic device 101. As illustrated in FIG. 41B, the electronic device 101 can include the transparent plate 4001, the touch screen 4003, the display 4005, and the pressure sensor 4007. In various example embodiments, the electronic device 101 can replace a physical key with the pressure sensor 4007 at a lateral surface of the electronic device 101.

Or, as illustrated in FIG. 41C, a touch screen can be formed within the display 4005. That is, constructions of the touch screen can be embedded within the display 4005. The transparent plate 4001 and the touch screen integrated type display 4005 can be adhered to each other by means of an adhesive part 4009. Under this display 4005, the pressure sensor 4007 can be arranged. The display 4005 and the pressure sensor 4007 can be adhered to each other by means of an adhesive part 4009.

Figure 42A:
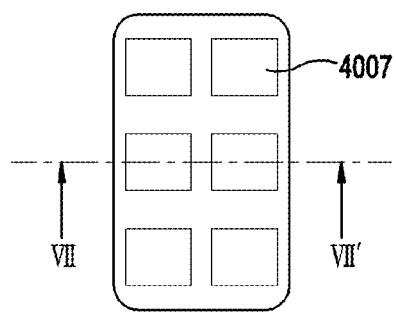
FIG. 42A is a front view illustrating an example electronic device according to various example embodiments.
Figure 42B:
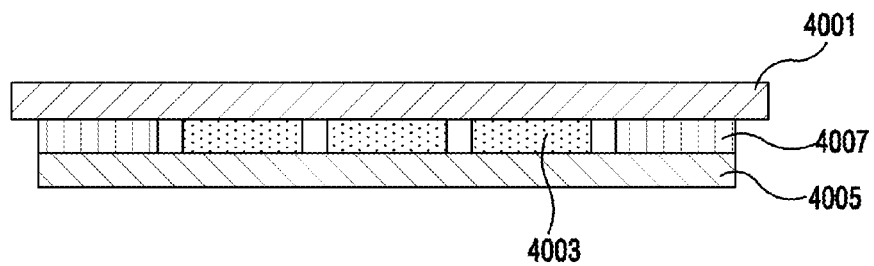
FIG. 42B and FIG. 42C are sections taken along line VII-VII' of FIG. 42A.
Figure 42C:
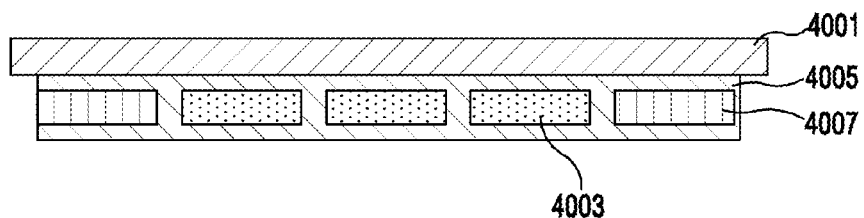

FIG. 42A is a front view of an electronic device according to various example embodiments. FIG. 42B and FIG. 42C illustrate sections taken along line VII-VII' of FIG. 42A.

As illustrated in FIG. 42A, the pressure sensor 4007 can be arranged in a partial region of the electronic device 101. Or, as illustrated in FIG. 42B, the pressure sensor 4007 and the touch screen 4003 can be arranged in the same layer. For example, constructions of the pressure sensor 4007 and touch screen 4003 can be formed on the display 4005. That is, the pressure sensor 4007 and touch screen 4003 can be integrally formed on the display 4005.

Or, as illustrated in FIG. 42C, the pressure sensor 4007 and the touch screen 4003 can be arranged within the display 4005. That is, constructions of the pressure sensor 4007 and touch screen 4003 can be embedded within the display 4005.

Figure 43A:
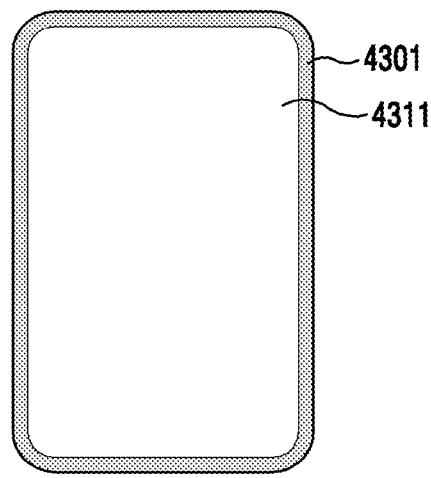
FIGS. 43A, 43B and 43C are front views of an electronic device according to various example embodiments.
Figure 43B:
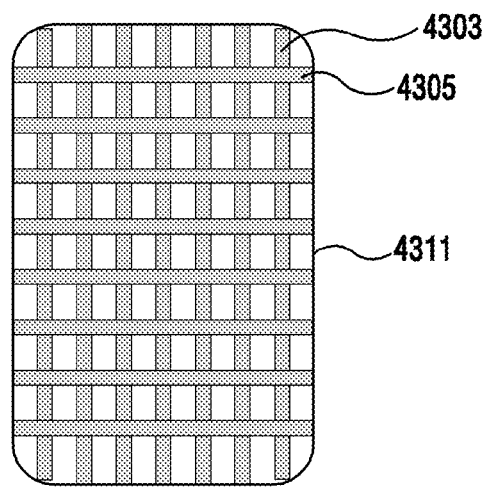
Figure 43C:
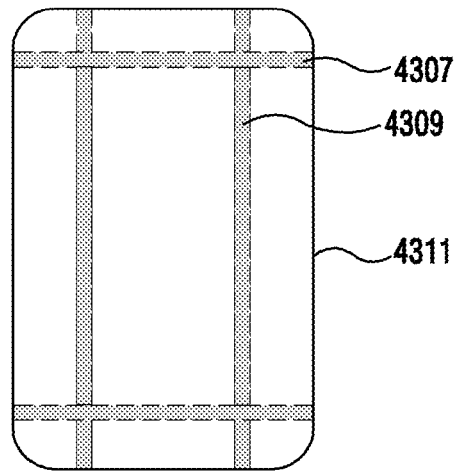

FIGS. 43A, 43B and 43C illustrate front views of an electronic device according to various example embodiments. FIG. 43 illustrates an antenna arranged on a display.

As illustrated in FIG. 43A, the antenna 4301 can be arranged on the display 4311. The antenna 4301 can be arranged along the outside of the display 4311. The antenna 4301 can include transparent conductive materials. For example, the antenna 4301 can include Indium Tin Oxide (ITO), Indium Zinc Oxide (IZO), an argentums (Ag) nanowire, a metal mesh, a carbon nano tube, graphene, etc. Or, the antenna 4301 can include opaque conductive materials. For example, the antenna 4301 can include various metals such as copper (Cu), molybdenum (Mo), titanium (Ti), aluminum (Al), etc. The antenna 4301 can be arranged in a bezel that is an inactive region of the display 4311.

As illustrated in FIG. 43B, the antenna can include a 1st antenna 4303 and a 2nd antenna 4305. The 1st antenna 4303 and the 2nd antenna 4305 can be arranged in a lattice form on the display 4311. Or, the 1st antenna 4303 and the 2nd antenna 4305 can be arranged in a matrix form on the display 4311. The 1st antenna 4303 and the 2nd antenna 4305 can be arranged in an active region of the display 4311. The 1st antenna 4303 and 2nd antenna 4305 can be arranged not to overlap with a gate wiring and data wiring of the display 4311. Also, the 1st antenna 4303 and 2nd antenna 4305 can be arranged not to overlap with a touch electrode pattern of a touch screen. The 1st antenna 4303 and the 2nd antenna 4305 can include transparent conductive materials. For example, the 1st antenna 4303 and 2nd antenna 4305 can include ITO, IZO, an argentums (Ag) nanowire, a metal mesh, a carbon nano tube, graphene, etc.

As illustrated in FIG. 43C, the antenna can include a 1st antenna 4307 and a 2nd antenna 4309. The 1st antenna 4303 and the 2nd antenna 4307 can be arranged in a lattice form on the display 4311. Or, the 1st antenna 4307 and the 2nd antenna 4309 can be arranged in a matrix form on the display 4311. The 1st antenna 4307 and the 2nd antenna 4309 can be arranged in a partial region of the display 4311. The 1st antenna 4303 and the 2nd antenna 4305 can include transparent conductive materials. For example, the 1st antenna 4303 and 2nd antenna 4305 can include ITO, IZO, an argentums (Ag) nanowire, a metal mesh, a carbon nano tube, graphene, etc.

Figure 44A:
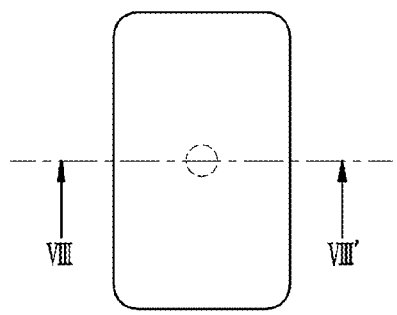
FIG. 44A is a front view of an electronic device according to various example embodiments.
Figure 44B:
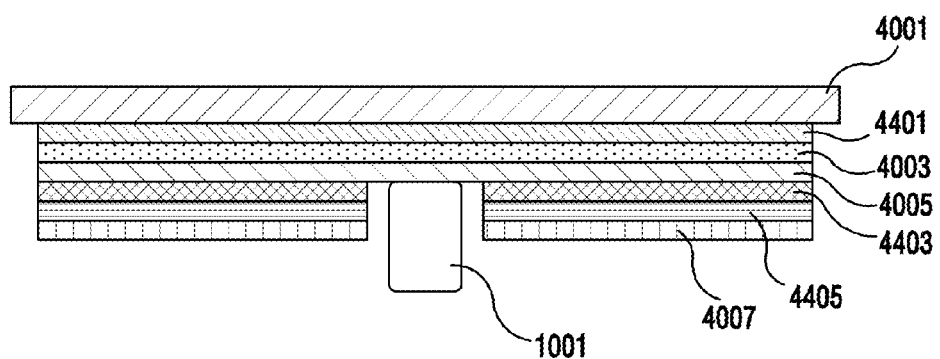
FIG. 44B is a section taken along line VIII-VIII' of FIG. 44A.

FIG. 44A is a front view of an electronic device according to various example embodiments. FIG. 44B illustrates a section taken along line VIII-VIII' of FIG. 44A.

As illustrated in FIG. 44A and FIG. 44B, the electronic device 101 can include the transparent plate 4001, an antenna 4401, the touch screen 4003, the display 4005, a 1st protection part 4403, a 2nd protection part 4405, the pressure sensor 4007, and the camera device 1001. The antenna 4401 can be arranged between the transparent plate 4001 and the touch screen 4003.

Figure 45A:
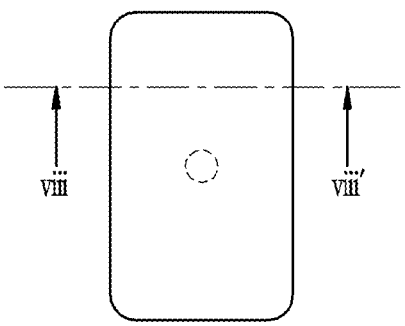
FIG. 45A is a front view illustrating an example electronic device according to various example embodiments.

FIG. 45A is a front view of an electronic device according to various example embodiments. FIGS. 45B, 45C, 45D, 45E, 45F and 45G illustrate sections taken along line viii-viii' of FIG. 45A.

Figure 45B:
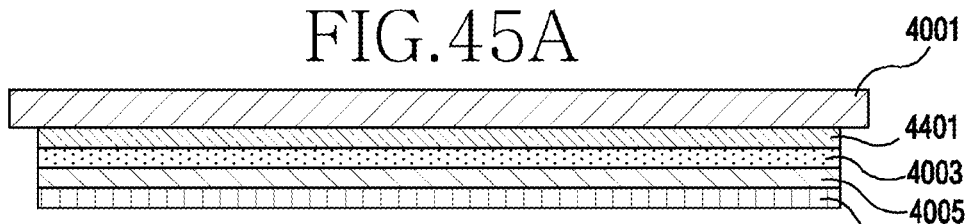
FIGS. 45B, 45C, 45D, 45E, 45F and 45G are sections taken along line viii-viii' of FIG. 45A.
Figure 45C:
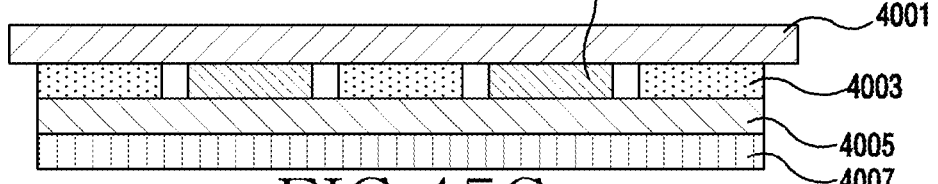

As illustrated in FIG. 45B, the antenna 4401 can be arranged between the transparent plate 4001 and the touch screen 4003. Or, as illustrated in FIG. 45C, the antenna 4401 and the touch screen 4003 can be arranged in the same layer. For example, constructions of the antenna 4401 and touch screen 4403 can be formed on the display 4005. That is, the antenna 4401 and the touch screen 4003 can be integrally formed on the display 4005. The constructions of the antenna 4401 and touch screen 4003 can be arranged alternately.

Figure 45D:
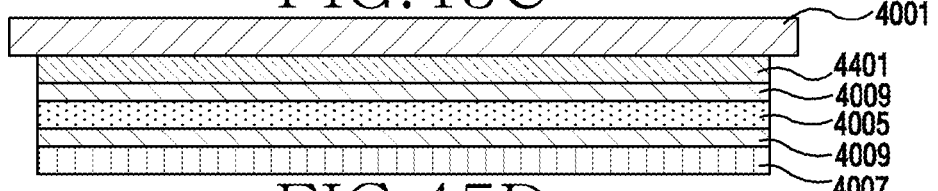

Or, as illustrated in FIG. 45D, a touch screen can be formed within the display 4005. That is, constructions of the touch screen can be embedded within the display 4005. The antenna 4401 can be arranged beneath the transparent plate 4001. The transparent plate 4001 and the touch screen integrated type display 4005 can be adhered to each other by means of an adhesive part 4009. Under this display 4005, the pressure sensor 4007 can be arranged. The display 4005 and the pressure sensor 4007 can be adhered to each other by means of an adhesive part 4009.

Figure 45E:
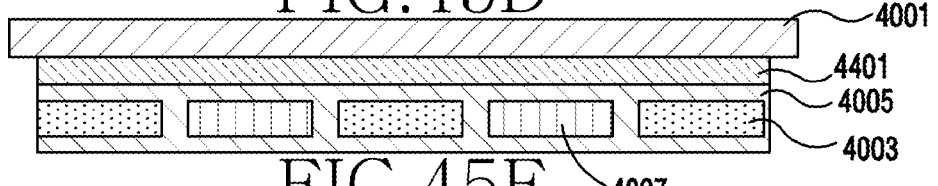

Or, as illustrated in FIG. 45E, the pressure sensor 4007 and the touch screen 4003 can be arranged within the display 4005. That is, constructions of the pressure sensor 4007 and touch screen 4003 can be embedded within the display 4005. Through this, a thickness of the electronic device 101 can be reduced.

Figure 45F:
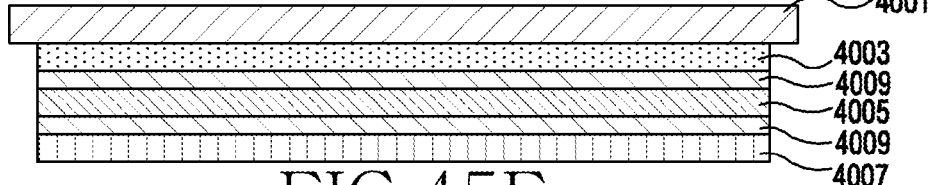

Or, as illustrated in FIG. 45F, the touch screen 4003 can be integrally formed on the transparent plate 4001. That is, constructions of the touch screen 4003 can be formed on the transparent plate 4001. The display 4005 can be arranged under the transparent plate 4001 on which the touch screen 4003 is integrally formed. The antenna can be formed within the display 4005. That is, constructions of the antenna can be embedded within the display 4005. The transparent plate 4001 and the antenna integrated type display 4005 can be adhered to each other by means of an adhesive part 4009. Under this display 4005, the pressure sensor 4007 can be arranged. The display 4005 and the pressure sensor 4007 can be adhered to each other by means of an adhesive part 4009.

Figure 45G:
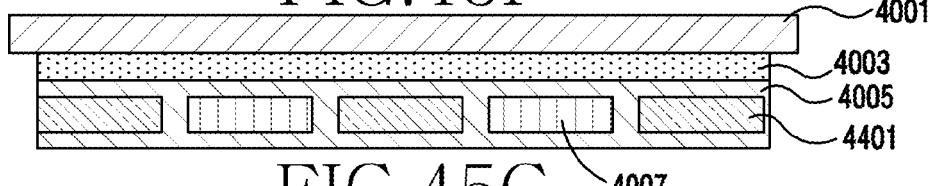

Or, as illustrated in FIG. 45G, the touch screen 4003 can be integrally formed on the transparent plate 4001. That is, constructions of the touch screen 4003 can be formed on the transparent plate 4001. The display 4005 can be arranged under the transparent plate 4001 on which the touch screen 4003 is integrally formed. The pressure sensor 4007 and the antenna 4401 can be arranged within the display 4005. That is, constructions of the pressure sensor 4007 and antenna 4401 can be embedded within the display 4005.

Figure 46A:
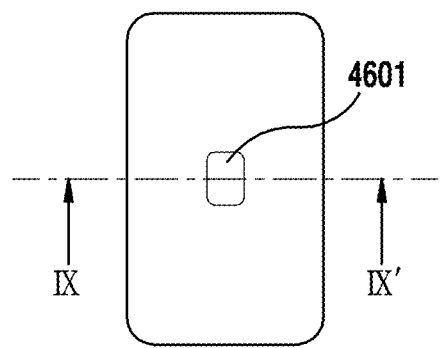
FIG. 46A is a front view of an electronic device according to various example embodiments.

FIG. 46A is a front view of an electronic device according to various example embodiments. FIGS. 46B, 46C, 46D, 46E, 46F, 46G, 46H, 46I and 46J illustrate sections taken along line IX-IX' of FIG. 46A.

Figure 46B:
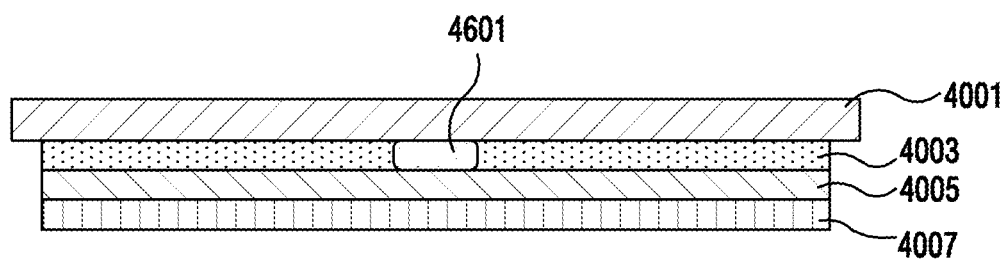
FIGS. 46B, 46C, 46D, 46E, 46F, 46G, 46H, 46I and 46J are sections taken along line IX-IX' of FIG. 46A.

As illustrated in FIG. 46A and FIG. 46B, the electronic device 101 can further include a finger scan sensor 4601. The finger scan sensor 4601 can be arranged on a central region of the display 4005. The finger scan sensor 4601 can be provided transparently such that the finger scan sensor 4601 is not acknowledged from the external. The finger scan sensor 4601 can be arranged beneath the transparent plate 4001. The finger scan sensor 4601 can be arranged within the touch screen 4003.

Figure 46C:
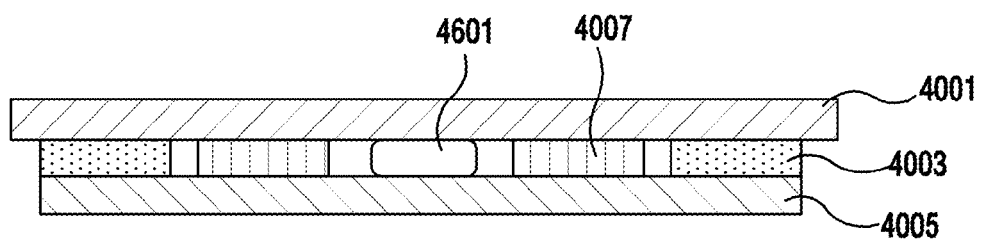

As illustrated in FIG. 46C, the finger scan sensor 4601, the pressure sensor 4007 and the touch screen 4003 can be arranged in the same layer. For example, constructions of the finger scan sensor 4601, pressure sensor 4007 and touch screen 4003 can be formed on the display 4005. That is, the finger scan sensor 4601, the pressure sensor 4007 and the touch screen 4003 can be integrally formed on the display 4005. The constructions of the pressure sensor 4007 and touch screen 4003 can be arranged alternately.

Figure 46D:
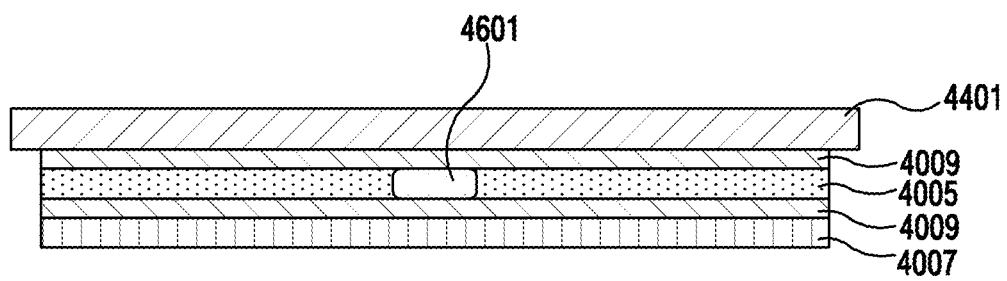

As illustrated in FIG. 46D, a touch screen can be formed within the display 4005. That is, constructions of the touch screen can be embedded within the display 4005. The finger scan sensor 4601 can be arranged within the touch screen integrated type display 4005. The finger scan sensor 4601 can be embedded within the touch screen integrated type display 4005. The transparent plate 4001 and the touch screen integrated type display 4005 can be adhered to each other by means of an adhesive part 4009. Under this display 4005, the pressure sensor 4007 can be arranged. The display 4005 and the pressure sensor 4007 can be adhered to each other by means of an adhesive part 4009.

Figure 46E:
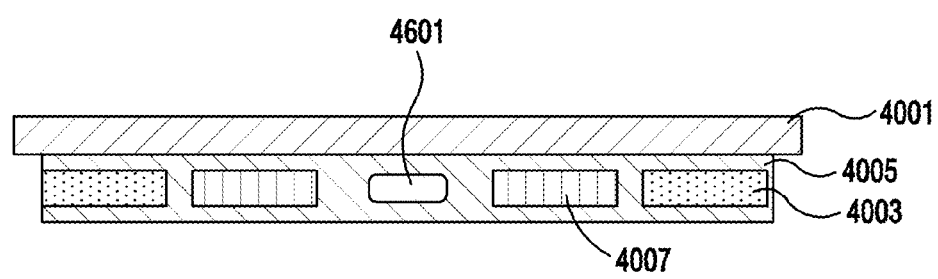

As illustrated in FIG. 46E, the finger scan sensor 4601, the pressure sensor 4007 and the touch screen 4003 can be arranged within the display 4005. That is, constructions of the finger scan sensor 4601, pressure sensor 4007 and touch screen 4003 can be embedded within the display 4005. Through this, a thickness of the electronic device 101 can be reduced.

Figure 46F:
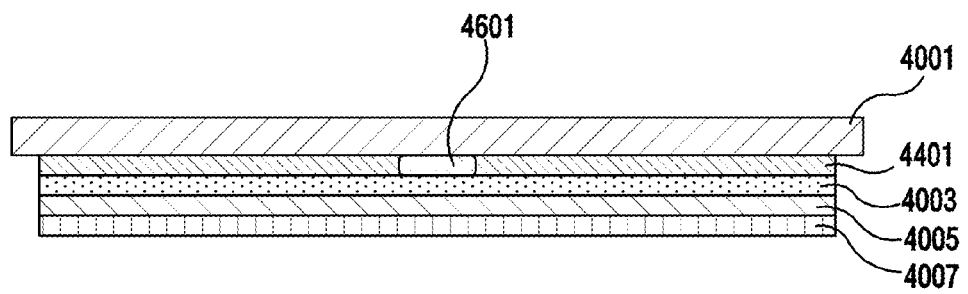

As illustrated in FIG. 46F, the finger scan sensor 4601 can be arranged within the antenna 4401. That is, constructions of the finger scan sensor 4601 can be embedded within the antenna 4401. The touch screen 4003, the display 4005 and the pressure sensor 4007 can be arranged beneath the antenna 4401.

Figure 46G:
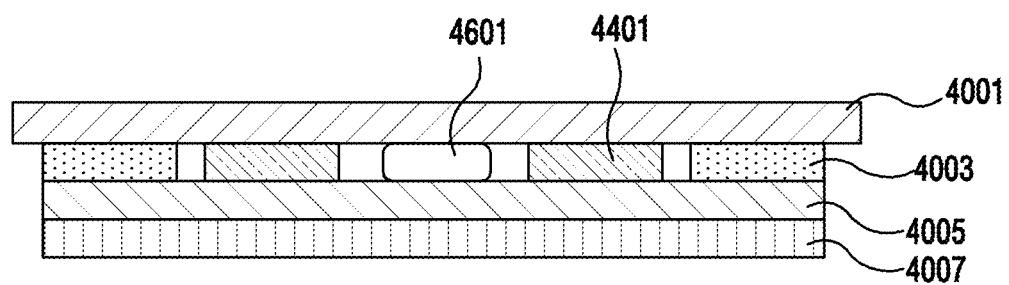

As illustrated in FIG. 46G the finger scan sensor 4601 and the antenna 4401 can be arranged in the same layer as the touch screen 4003. For example, constructions of the finger scan sensor 4601, antenna 4401 and touch screen 4003 can be formed on the display 4005. That is, the finger scan sensor 4601, the antenna 4401 and the touch screen 4003 can be integrally formed on the display 4005. The constructions of the antenna 4401 and touch screen 4003 can be arranged alternately.

Figure 46H:
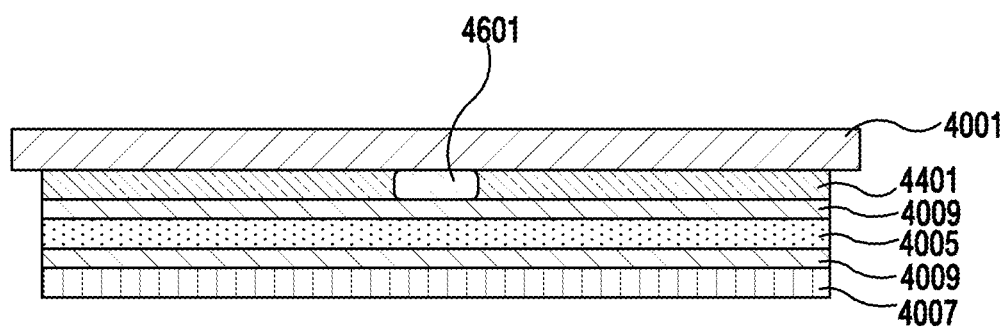

As illustrated in FIG. 46H, the finger scan sensor 4601 can be arranged within the antenna 4401. That is, constructions of the finger scan sensor 4601 can be embedded within the antenna 4401. A touch screen can be formed within the display 4005. That is, constructions of the touch screen can be embedded within the display 4005. The antenna 4401 and the touch screen integrated type display 4005 can be adhered to each other by means of an adhesive part 4009. Under this display 4005, the pressure sensor 4007 can be arranged. The display 4005 and the pressure sensor 4007 can be adhered to each other by means of an adhesive part 4009.

Figure 46I:
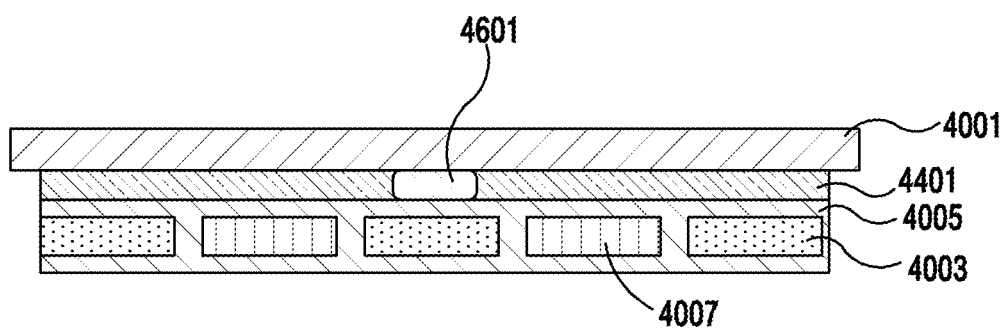

As illustrated in FIG. 46I, the finger scan sensor 4601 can be arranged within the antenna 4401. That is, constructions of the finger scan sensor 4601 can be embedded within the antenna 4401. The pressure sensor 4007 and the antenna 4003 can be arranged within the display 4005. That is, constructions of the pressure sensor 4007 and touch screen 4003 can be embedded within the display 4005.

Figure 46J:
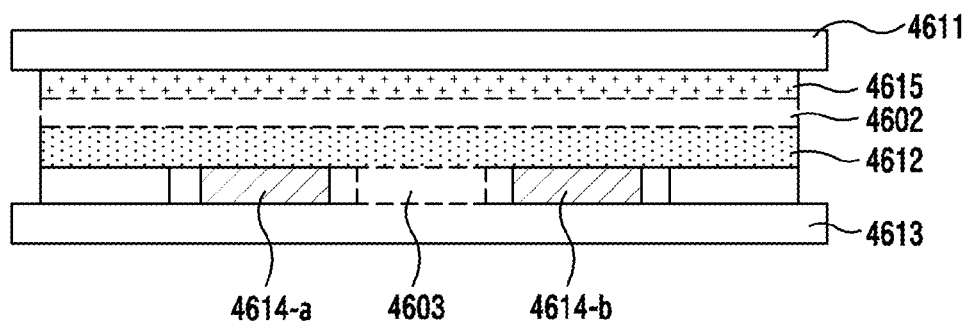

As illustrated in FIG. 46J, the electronic device can include a transparent plate 4611, a 1st finger scan sensor 4602, a display 4612, and a PCB 4613. According to one example embodiment, the 1st finger scan sensor 4602 can be interposed between the transparent plate 4611 and the display 4612. According to one example embodiment, the 1st finger scan sensor 4602 can be adhered to the transparent plate 4611 by means of an adhesive member 4615. But, an example embodiment is not limited to this, and the 1st finger scan sensor 4602 can be arranged the way the 1st finger scan sensor 4602 is adhered to a surface of the display 4612 as well. According to one example embodiment, the 1st finger scan sensor 4602 can be constructed transparently such that the 1st finger scan sensor 4602 is not acknowledged from the external.

According to various example embodiments, the electronic device can further include a 2nd finger scan sensor 4603. The 2nd finger scan sensor 4603 can be arranged beneath the display 4612. According to one example embodiment, the 2nd finger scan sensor 4603 can be adhered onto a rear surface of the display 4612 through an adhesive member (not shown). But, an example embodiment is not limited to this, and the 2nd finger scan sensor 4603 can be interposed between the display 4612 and at least one electronic component (e.g., PCB 4613) laminated under the display 4612. Or, the 2nd finger scan sensor 4603 can be adhered to an outer surface of the electronic component as well. According to one example embodiment, in case where the 2nd finger scan sensor 4603 is arranged beneath the display 4612, the 2nd finger scan sensor 4603 can be constructed transparently, or be constructed opaquely as well. According to one example embodiment, the electronic device can further include structures 4614-a and 4614-b arranged between the display 4612 and the PCB 4613, so as to secure a space for mounting the 2nd finger scan sensor 4603. According to one example embodiment, the structures 4614-a and 4614-b are formed integrally, or be arranged as at least two structures. According to one example embodiment, the structures 4614-a and 4614-b can be replaced with a part of a sealing member for protecting the 2nd finger scan sensor 4603. According to one example embodiment, an operation of sensing a fingerprint through the 1st finger scan sensor 4601 and/or the 2nd finger scan sensor 4603 can be divided with a criterion of a constant time and performed. According to one example embodiment, the 1st finger scan sensor 4601 and/or the 2nd finger scan sensor 4603 can be arranged in a front surface of the electronic device and be used for user authentication. But, an example embodiment is not limited to this, and at least one finger scan sensor among the 1st finger scan sensor 4602 and the 2nd finger scan sensor 4603 can perform a corresponding function of an application that is run in the electronic device.

According to various example embodiments, one finger scan sensor among the 1st finger scan sensor 4602 or the 2nd finger scan sensor 4603 can be arranged individually within the electronic device, or the 1st finger scan sensor 4602 and the 2nd finger scan sensor 4603 can be arranged together within the electronic device.

Figure 47A:
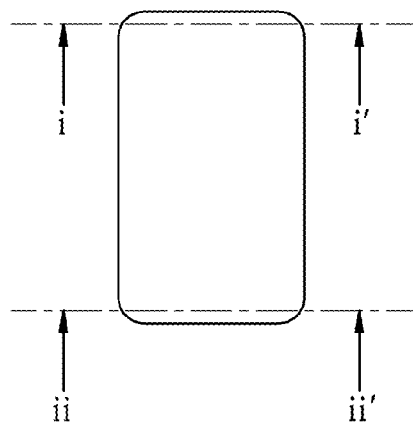
FIG. 47A is a front view of an electronic device according to various example embodiments.
Figure 47B:
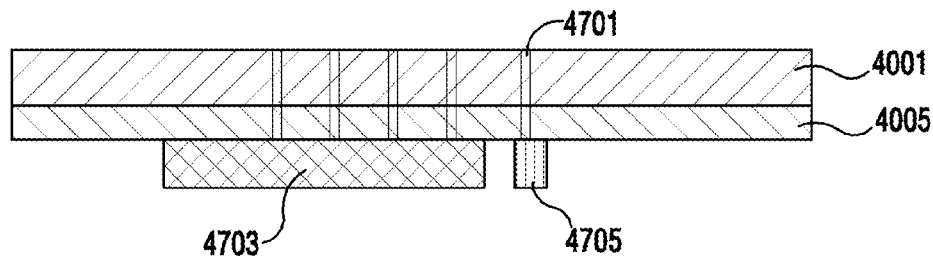
FIG. 47B is a section taken along line i-i' of FIG. 47A.
Figure 47C:
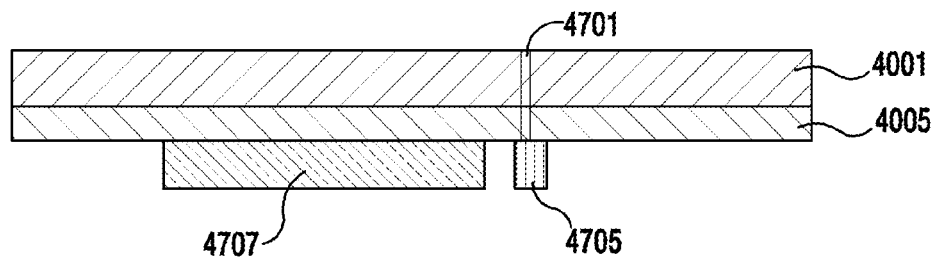
FIG. 47C is a section taken along line ii-ii' of FIG. 47A.

FIG. 47A is a front view of an electronic device according to various example embodiments. FIG. 47B illustrates a section taken along line i-i' of FIG. 47A. FIG. 47C illustrates a section taken along line ii-ii' of FIG. 47A.

As illustrated in FIG. 47A and FIG. 47B, a receiver 4703 and a microphone 4705 can be arranged in an inactive region of the display 4005. Meantime, although not illustrated in the drawing, a speaker can be arranged in a position where the receiver 4703 is arranged as well. The receiver 4703 and the microphone 4705 can be arranged beneath the transparent plate 4001 and the display 4005. The transparent plate 4001 and the display 4005 can include at least one hole 4701. The holes 4701 can be provided in positions equivalent to the receiver 4703 and the microphone 4705 in the transparent plate 4001 and the display 4005. The hole 4701 can be a micro hole having a diameter of about 1/10 mm or less.

As illustrated in FIG. 47A and FIG. 47C, a receiver 4707 can include piezoelectric materials. At this time, the hole 4701 can be provided in a position equivalent to the microphone 4705 in the transparent plate 4001 and the display 4005. That is, the hole 4701 may not be provided in a position equivalent to the receiver 4707 in the transparent plate 4001 and the display 4005. In other words, because the receiver 4707 can include the piezoelectric materials and thus vibrate the display 4005, a separate hole may not be provided. That is, the receiver 4707 can vibrate a part of the electronic device 101 through a piezoelectric element, and convert a vibration motion into a transmitted/received voice signal by using the electronic device 101 in the form of a transducer. The piezoelectric element converts an electrical signal into a vibration signal, and vibrates air by using an object coming in touch with the piezoelectric element as the transducer, and converts a vibration motion into a voice signal. In various example embodiments, the receiver 4707 can be positioned in a rear surface of the display 4005, or can be positioned in a lateral surface of the display 4005 as well. Also, besides when the piezoelectric element comes in direct touch with the transducer, the piezoelectric element can forward a vibration indirectly.

Figure 48A:
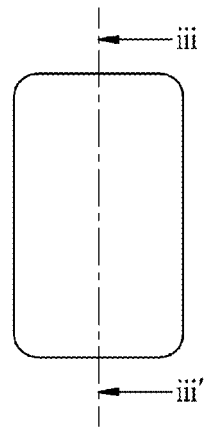
FIG. 48A is a front view of an electronic device according to various example embodiments.
Figure 48B:
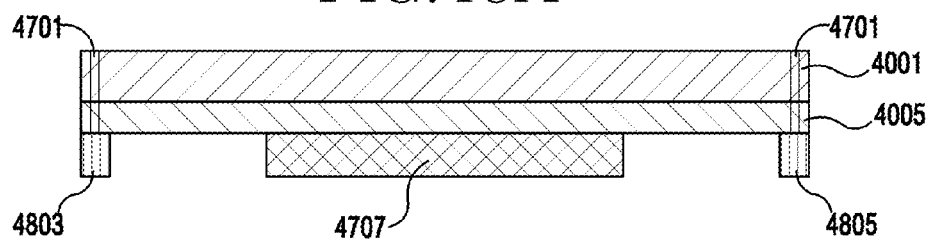
FIGS. 48B, 48C and 48D are sections taken along line iii-iii' of FIG. 48A.
Figure 48C:
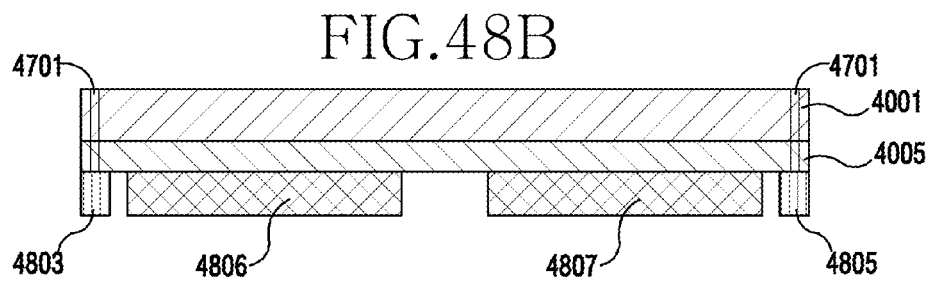
Figure 48D:
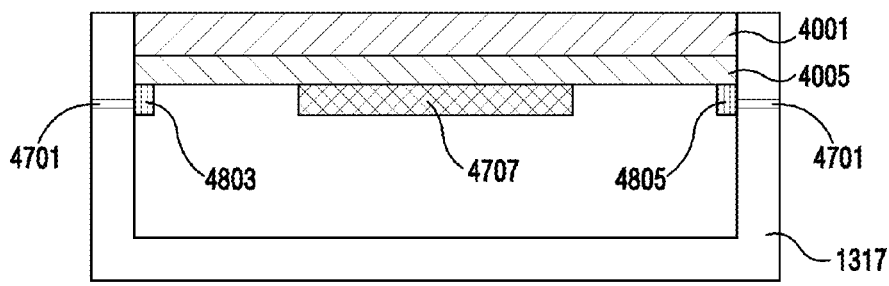

FIG. 48A is a front view of an electronic device according to various example embodiments. FIGS. 48B, 48C and 48D illustrate sections taken along line iii-iii' of FIG. 48A.

As illustrated in FIG. 48A and FIG. 48B, a 1st microphone 4803 and a 2nd microphone 4805 can be arranged in an inactive region of the display 4005. The receiver 4707 can be arranged in an active region of the display 4005. The receiver 4707 can include piezoelectric materials. Holes 4701 can be provided in positions equivalent to the 1st microphone 4803 and the 2nd microphone 4805 in the transparent plate 4001 and the display 4005. The hole 4701 may not be provided in a position equivalent to the receiver 4707 in the transparent plate 4001 and the display 4005. In other words, because the receiver 4707 can includes the piezoelectric materials and thus vibrate the display 4005, a separate hole may not be provided.

As illustrated in FIG. 48C, the 1st microphone 4803 and the 2nd microphone 4805 can be arranged in the inactive region of the display 4005. A 1st receiver 4806 and a 2nd receiver 4807 can be arranged in the active region of the display 4005. The 1st receiver 4806 and the 2nd receiver 4807 can include piezoelectric materials. The holes 4701 can be provided in positions equivalent to the 1st microphone 4803 and the 2nd microphone 4805 in the transparent plate 4001 and the display 4005. That is, the holes 4701 may not be provided in positions equivalent to the 1st receiver 4806 and the 2nd receiver 4807 in the transparent plate 4001 and the display 4005.

As illustrated in FIG. 48D, the 1st microphone 4803 and the 2nd microphone 4805 can be arranged in the inactive region of the display 4005. The receiver 4707 can be arranged in the active region of the display 4005. The receiver 4707 can include piezoelectric materials. The holes 4701 can be provided in the housing 1317. The holes 4701 can be provided in positions equivalent to the 1st microphone 4803 and the 2nd microphone 4805 in the housing 1317.

Figures 49A, 49B:
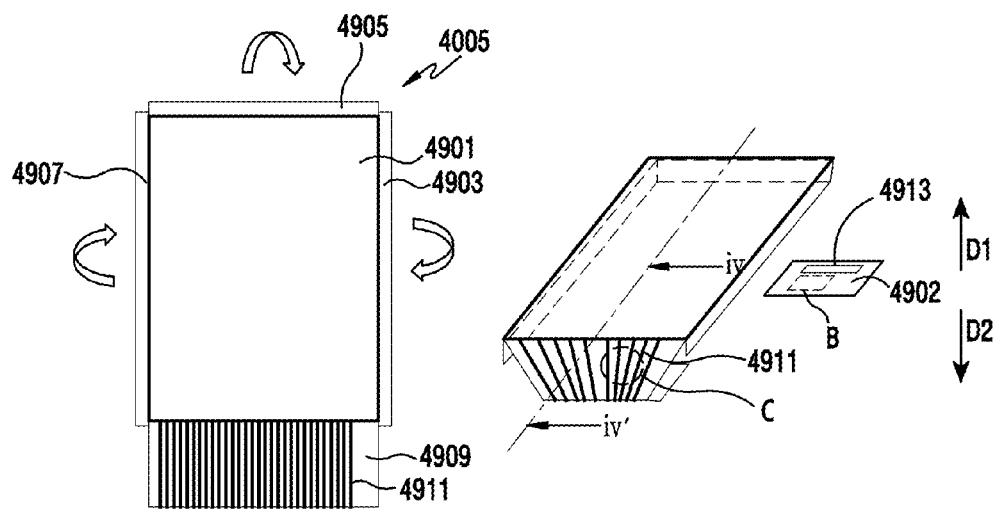
FIG. 49A is a front view of an electronic device according to various example embodiments.
FIG. 49B is a perspective view of the electronic device according to various example embodiments.

FIG. 49A is a front view of an electronic device according to various example embodiments. FIG. 49B is a perspective view of the electronic device according to various example embodiments.

As illustrated in FIG. 49A, the display 4005 can include an active region 4901 including an organic light emitting diode, and inactive regions 4903, 4905, 4907 and 4909 not including the organic light emitting diode. The inactive regions 4903, 4905, 4907 and 4909 can be arranged to surround the active region 4901. The inactive regions 4903, 4905, 4907 and 4909 can be arranged at the edge of the active region 4901.

At least some of the inactive regions 4903, 4905, 4907 and 4909 can be folded in a 2nd direction (D2). The inactive regions 4903, 4905, 4907 and 4909 can be bezel regions where wirings 4911 are arranged. As illustrated in FIG. 49B, all the inactive regions 4903, 4905, 4907 and 4909 can be folded in the 2nd direction (D2). Even the wirings 4911 arranged in the inactive regions 4903, 4905, 4907 and 4909 can be folded. The wirings 4911 can be folded and electrically coupled with a flexible printed circuit board 4902 arranged under the display 4005. A driving chip 4913 capable of driving the display 4005 can be arranged on the flexible printed circuit board 4902. The driving chip 4913 can be electrically coupled with the flexible printed circuit board 4902. The wirings 4911 can be electrically coupled with the driving chip 4913.

Figure 50A:
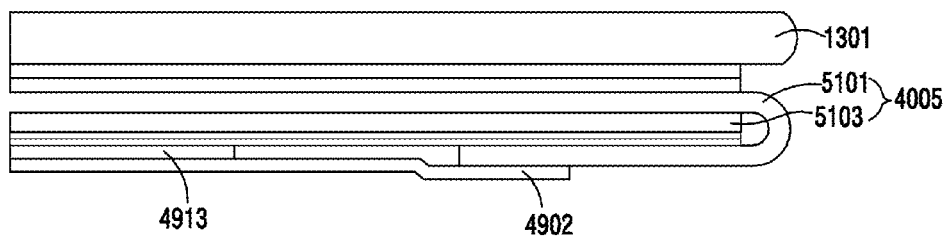
FIG. 50A is a section of an electronic device according to various example embodiments.
Figure 50B:
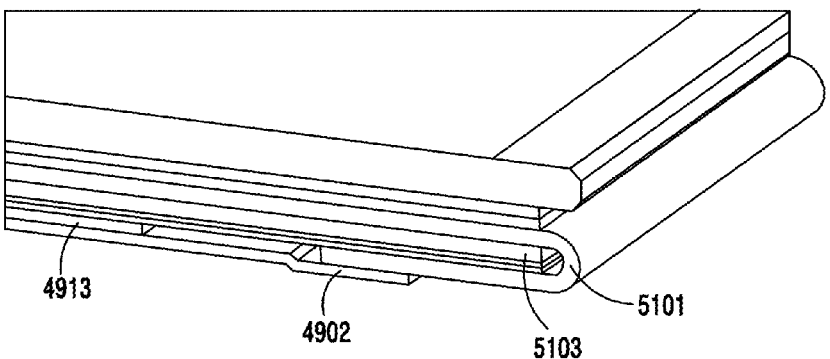
FIG. 50B is a perspective view of the electronic device according to various example embodiments.
Figure 50C:
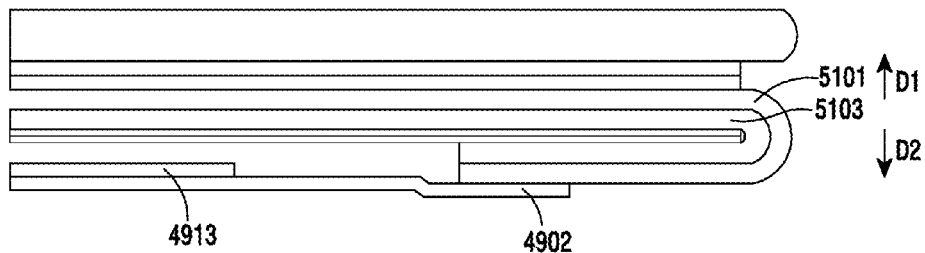
FIG. 50C is a section of the electronic device according to various example embodiments.

FIG. 50A illustrates one section of an electronic device according to various example embodiments. FIG. 50B illustrates one perspective view of the electronic device according to various example embodiments. FIG. 50C illustrates one section of the electronic device according to various example embodiments.

As illustrated in FIG. 50A and FIG. 50B, the display 4005 can include a 1st polymer layer 5101 and a 2nd polymer layer 5103. The flexible printed circuit board 4902 mounting the driving chip 4913 capable of driving the display 4005 can be arranged under the display 4005. The 1st polymer layer 5101 can, for example, include an encapsulation layer (not shown) for blocking moisture and air introduced into the display 4005. The encapsulation layer can be formed as one layer or can be formed in a form in which organic materials and inorganic materials are repeatedly laminated. The 1st substrate 5101 can, for example, be a color filter substrate (or color filter glass). The 1st polymer layer 5101 can include a black matrix, a color filter, etc. The 1st polymer layer 5101 can provide internal light traveling through a liquid crystal, in a constant color. This 1st polymer layer 5101 can include a majority of RGB pixels for showing internal light in a constant color. In case where the display 4005 includes an active light-emitting element (e.g., organic light emitting diode, quantum dot, etc.), the 1st polymer layer 5101 may not include a black matrix or a color filter. The 1st polymer layer 5101 can be folded and get in contact with the flexible printed circuit board 4902. Wirings arranged in the 1st polymer layer 5101 can be folded and electrically coupled with the driving chip 4913.

The 2nd polymer layer 5103 can, for example, be a TFT substrate (or TFT glass). A thin film transistor, and a pixel electrode, a common electrode, etc. coupled to the thin film transistor can be formed in the 2nd polymer layer 5103. The 2nd polymer layer 5103 can be, for example, formed in a form in which a plurality of polymer layers are laminated. For example, the 2nd polymer layer 5103 can include a dual layer having a polyimide layer and a polyethylene terephthalate layer. A liquid crystal can be interposed between the 1st polymer layer 5101 and the 2nd polymer layer 5103. The type of the display 4005 can be determined depending on the type of the liquid crystal. To change a light transmittance of internal light transmitted in a light guide plate, the 2nd polymer layer 5103 can vary an array of the liquid crystal. The 2nd polymer layer 5103 can deliver internal light in a desired shape through the liquid crystal. Or, the display 4005 can include the active light-emitting element (e.g., organic light emitting diode, quantum dot, etc.) between the 1st polymer layer 5101 and the 2nd polymer layer 5103. For example, a quantity of emitted light can be adjusted according to a quantity of electric current applied to the active light emitting element through the thin film transistor.

As illustrated in FIG. 50C, the 1st polymer layer 5101 and/or the 2nd polymer layer 5103 can be folded in the 2nd direction (D2). The 1st polymer layer 5101 and/or the 2nd polymer layer 5103 can be folded and get in contact with the flexible printed circuit board 4902. Wirings arranged in the 1st polymer layer 5101 and/or the 2nd polymer layer 5103 can be folded and electrically coupled with the driving chip 4913. For example, the wirings arranged in the 1st polymer layer 5101 and/or the 2nd polymer layer 5103 can be formed of at least one of titanium (Ti), copper (Cu), aluminum (Al), molybdenum (Mo), or grapheme. In case where the 2nd polymer layer 5103 is formed in a form in which a plurality of polymer layers are laminated, the 2nd polymer layer 5103 can be formed in a form in which at least a partial layer is at least partially cut out in the folded region.

Figure 51A:
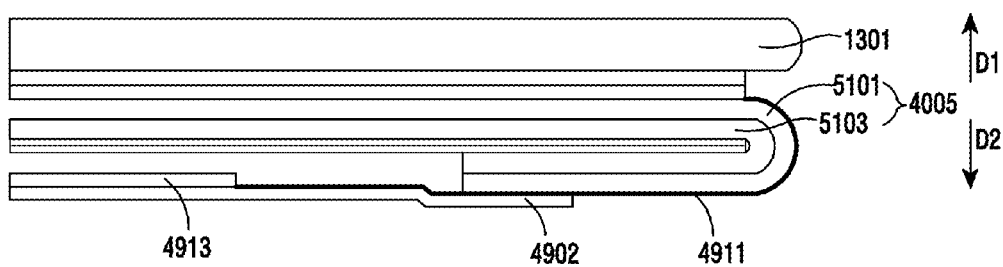
FIG. 51A and FIG. 51B are sections of an electronic device according to various example embodiments.

FIG. 51A and FIG. 51V illustrate sections of an electronic device according to various example embodiments.

As illustrated in FIG. 51A, the 1st polymer layer 5101 and/or the 2nd polymer layer 5103 can be folded in the 2nd direction (D2). The wiring 4911 electrically connected to the display 4005 can be folded along the folded 1st polymer layer 5101 and/or 2nd polymer layer 5103, together. The wiring 4911 can be folded and electrically coupled with the driving chip 4913.

Figure 51B:
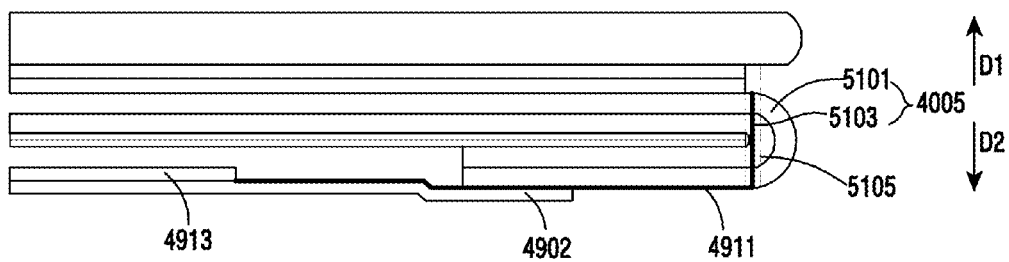

As illustrated in FIG. 51B, the 1st polymer layer 5101 and/or the 2nd polymer layer 5103 can be folded in the 2nd direction (D2). The wiring 4911 electrically connected to the display 4005 can be withdrawn through a region 5105 that is cut out from the folded 1st polymer layer 5101 and/or 2nd polymer layer 5103. That is, the 1st polymer layer 5101 and/or the 2nd polymer layer 5103 can include the region 5105 that is cut out from at least a part of the folded 1st polymer layer 5101 and/or 2nd polymer layer 5103. And, the cut-out region 5105 can be a hole. The wiring 4911 can be withdrawn along the cut-out region 5105 and be electrically coupled with the driving chip 4913.

Figure 52A:
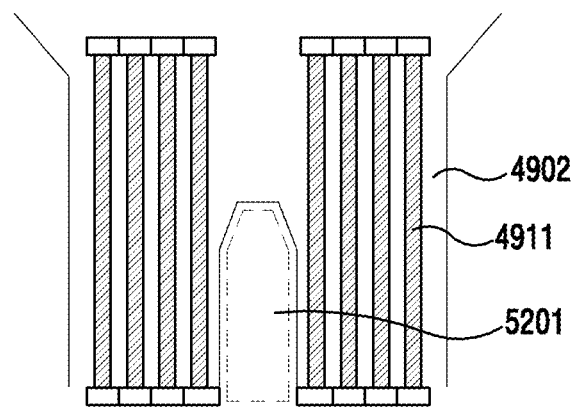
FIGS. 52A, 52B and 52C are extended views of a portion 'B' of FIG. 49B.
Figure 52B:
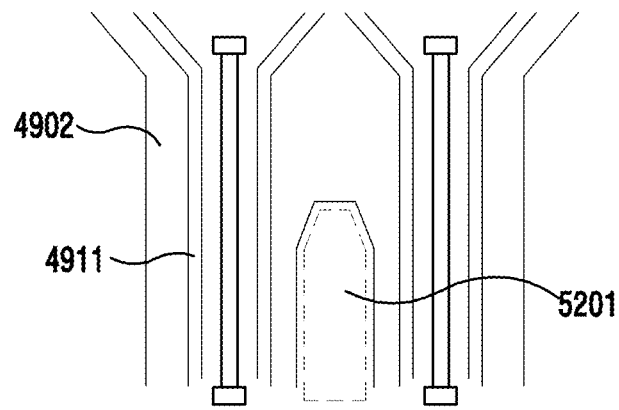
Figure 52C:
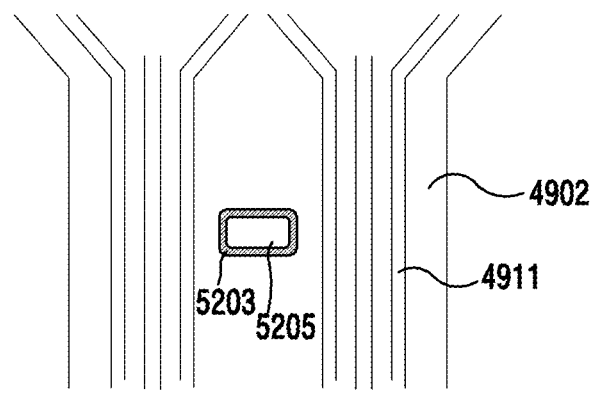

FIGS. 52A, 52B and 52C illustrate extended views of a portion 'B' of FIG. 49B.

As illustrated in FIG. 52A and FIG. 52B, the wirings 4911 can be withdrawn from the display 4005 and be arranged on the flexible printed circuit board 4902. The wirings 4911 can be arranged to detour around various interfaces 5201. That is, the wirings 4911 can be arranged not to overlap with the various interfaces 5201.

As illustrated in FIG. 52C, the wirings 4911 can be withdrawn from the display 4005 and be arranged on the flexible printed circuit board 4902. The flexible printed circuit board 4902 can include a shield part 5203 and an opening part 5205. Various interfaces can be arranged within the opening part 5205. The shield part 5203 can prevent the interfaces arranged within the opening part 5205 and the wiring 4911 from getting in contact with each other. That is, the shield part 5203 can prevent electrical interference between the interfaces and the wirings 4911.

FIGS. 53A, 53B, 53C and 53D illustrate extended views of a portion 'C' of FIG. 49B.

Figures 53A, 53B:
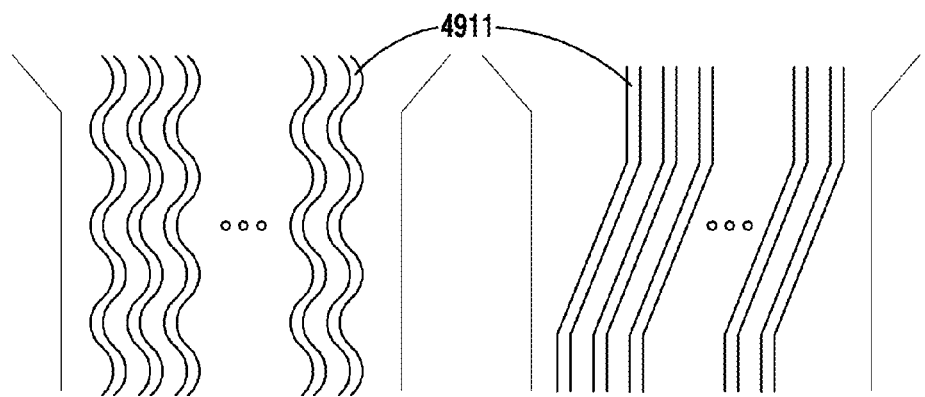
FIGS. 53A, 53B, 53C and 53D are extended views of a portion 'C' of FIG. 49B.

As illustrated in FIG. 49B and FIG. 53A to FIG. 53D, the wirings 4911 arranged in the inactive regions 4903, 4905, 4907 and 4909 can have various shapes in a construction in which the inactive regions 4903, 4905, 4907 and 4909 of the display 4005 are folded. For example, as illustrated in FIG. 53A, the wirings 4911 can include a curved shape. Or, as illustrated in FIG. 53B, the wirings 4911 are of a straight line shape, but can include a portion withdrawn in mutually different directions.

Figures 53C, 53D:
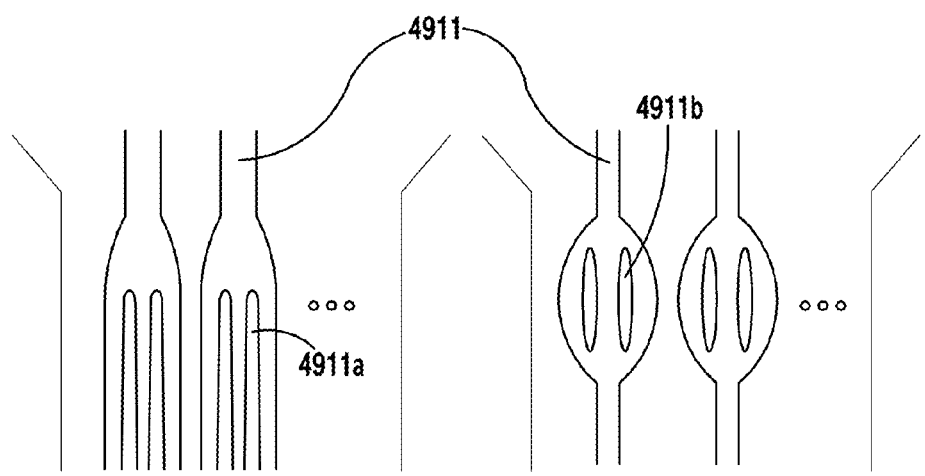

Or, as illustrated in FIG. 53C and FIG. 53D, the wirings 4911 can include opening parts 4911a and 4911b therein. This can prevent a crack of the wiring 4911 from being generated in the folded part. Accordingly, this can prevent electrical short within the wiring 4911.

According to various example embodiments, an electronic device 101 can include a housing 1317 including a 1st surface 1343 going in a 1st direction (D1), and a 2nd surface 1345 going in a 2nd direction (D2) that is opposite to the 1st direction (D1), the housing 1317 including a transparent plate 1301 forming at least a part of the 1st surface 1343 of the housing 1317, a display 1303 arranged between the transparent plate 1301 and the 2nd surface 1345 of the housing 1317, and including a 1st surface 1333 going in the 1st direction (D1) and a 2nd surface 1335 going in the 2nd direction (D2), at least one sensor 1001 arranged between the 2nd surface 1335 of the display 1303 and the 2nd surface 1345 of the housing 1317, the sensor 1001 being exposed to light passing through the display 1303, a processor 120 electrically coupled with the display 1303 and the at least one sensor 1001, and a memory 130 electrically coupled with the processor 120. The memory 130 can store instructions for, at execution, instructing the processor 120 to enable the display 1303 during 1st time periods (T1), and disable at least a part of the display 1303 during at least a part of 2nd time periods (T2) that do not at least partially overlap with the 1st time periods (T1) and alternate with the 1st time periods (T1), and enable the at least one sensor 1001.

According to various example embodiments, the electronic device 101 can be characterized in that the 1st time periods (T1) have a 1st period (P1), and the 2nd time periods (T2) have a 2nd period (P2).

According to various example embodiments, in the electronic device 101, the 1st period (P1) and the 2nd period (P2) can be the same as each other.

According to various example embodiments, in the electronic device 101, the 1st time periods (T1) can be less than the 2nd time periods (T2), and the 1st period (P1) can be greater than the 2nd period (P2).

According to various example embodiments, in the electronic device 101, the 1st time periods (T1) can be ⅛ to ⅔ times less than the 2nd time periods (T2), and the 1st period (P1) can be 1.5 times to 8 times greater than the 2nd period (P2).

According to various example embodiments, in the electronic device 101, the 1st time periods (T1) and the 2nd time periods (T2) can be at least partially overlapped with each other.

According to various example embodiments, in the electronic device 101, one of the 1st time periods (T1) and/or one of the 2nd time periods (T2) immediately following the one can be spaced 3rd time periods (T3) apart from each other. The instructions can instruct the processor not to enable all the display 1303 and the at least one sensor 1001 during the 3rd time periods (T3).

According to various example embodiments, in the electronic device 101, the instructions can instruct the processor 120 to receive a user input to the display 1303, disable the at least one sensor 1001 in response to the user input, and enable the display 1303 during the 3rd time periods (T3) greater than the 1st time periods (T1).

According to various example embodiments, in the electronic device 101, the at least one sensor 1001 can include at least one of a camera, a proximity sensor, an illuminance sensor, a finger scan sensor, or a medical sensor.

According to various example embodiments, in the electronic device 101, the display 1303 can include a 1st region 1303a at least partially not overlapping with the at least one sensor 1001, when viewed from the top of the transparent plate 1301, and a 2nd region 1303b at least partially overlapping with the at least one sensor 1001, when viewed from the top of the transparent plate 1301.

According to various example embodiments, in the electronic device 101, the instructions can instruct the processor 120 to display, in the 2nd region 1303b of the display 1303, a color and/or pattern different from a color and/or pattern displayed in the 1st region 1303a.

According to various example embodiments, in the electronic device 101, the 1st region 1303a of the display 1303 can include a 1st picture cell (pixel) 2933 having a 1st structure, and the 2nd region 1303b of the display 1303 can include a 2nd pixel 2931 having a 2nd structure different from the 1st structure.

According to various example embodiments, in the electronic device 101, pixels per inch (ppi) of the 2nd region 1303b of the display 1303 can be less than pixels per inch of the 1st region 1303a of the display 1303.

According to various example embodiments, in the electronic device 101, the display 1303 can include a gate wiring 2910 configured to forward a 1st signal to at least one of the 1st pixel 2922 or the 2nd pixel 2931, and a data wiring 2920 configured to forward a 2nd signal to at least one of the 1st pixel 2933 or the 2nd pixel 2931. At least one of the form of a 1st gate wiring 2901 crossing the 1st region 1303a of the display 1303 or the form of a 1st data wiring 2905 can be different from at least one of the form of a 2nd gate wiring 2903 crossing the 2nd region 1303b of the display 1303 or the form of a 2nd data wiring 2907.

According to various example embodiments, the electronic device 101 can further include a touch screen 3010 arranged between the transparent plate 1301 and the display 1303 or arranged within the display 1303. The touch screen 3010 can include a 1st touch electrode pattern 3003 arranged between the transparent plate 1301 and the 1st region 1303a of the display 1303, and a 2nd touch electrode pattern 3001 arranged between the transparent plate 1301 and the 2nd region 1303b of the display 1303, and different from the 1st touch electrode pattern 3003.

According to various example embodiments, in the electronic device 101, the display 1303 can include an active region 4901 including an organic light emitting diode, and inactive regions 4903, 4905, 4907, and 4909 not including the organic light emitting diode. At least a part of the inactive regions 4903, 4905, 4907, and 4909 of the display 1303 can be folded in the 2nd direction (D2).

According to various example embodiments, in the electronic device 101, the display 1303 can include a 1st polymer layer 5101, and a 2nd polymer layer 5103 attached to a surface of the 1st polymer layer 5101 going in the 2nd direction (D2). The 2nd polymer layer can be formed in a form in which at least a part of the 2nd polymer layer folded in the 2nd direction (D2) is at least partially cut out (5105).

According to various example embodiments, the electronic device 101 can further include a pressure sensor 4007 arranged between the 2nd surface 1335 of the display 1303 and the 2nd surface 1345 of the housing 1317, and another control circuit electrically coupled with the pressure sensor 4007. The another control circuit can be configured to sense a degree of pressure of the 2nd direction (D2), using the pressure sensor 4007.

According to various example embodiments, the electronic device 101 can further include a structure 1701 arranged between the display 1303 and the at least one sensor 1001. The structure can be configured to selectively block or pass light external to the transparent plate 1301.

According to various example embodiments, an electronic device 101 can include a housing 1317 including a 1st surface 1343 going in a 1st direction (D1), and a 2nd surface 1345 going in a 2nd direction (D2) that is opposite to the 1st direction (D1), the housing 1317 including a transparent plate 1301 forming at least a part of the 1st surface 1343 of the housing 1317, a display 1303 arranged between the transparent plate 1301 and the 2nd surface 1345 of the housing 1317, and including a 1st surface 1333 going in the 1st direction (D1) and a 2nd surface 1335 going in the 2nd direction (D2), a camera device 1001 arranged between the 2nd surface 1335 of the display 1303 and the 2nd surface 1345 of the housing 1317, the camera device 1001 being exposed to light passing through the display 1303, a processor electrically coupled with the display 1303 and the at least one sensor 1001, and a memory 130 electrically coupled with the processor 120. The memory 130 can store instructions for, at execution, instructing the processor 120 to enable the display 1303 during 1st time periods (T1), enable the camera device 1001 during 2nd time periods (T2) immediately following the 1st time periods (T1), and acquire an image, using information received through the camera device 1001 during the 2nd time periods (T2) at least partially not overlapping with the 1st time periods (T1).

In various example embodiments, by mounting a sensor such as a camera device, etc. in a rear surface of a display, an electronic device can implement a full front display in which the display is extended throughout the entire surface of the electronic device. Because the sensor such as the camera device, etc. is mounted in the rear surface of the display, the sensor may not be acknowledged from the external. Also, because the existing hole for mounting the sensor such as the camera device, etc. can be omitted, a holeless electronic device can be implemented.

Example embodiments of the present disclosure disclosed in the present description and drawings merely describe various examples so as to easily explain the technological content of the present disclosure and aid in the understanding of the present disclosure, and do not intend to limit the spirit and scope of the present disclosure. That is, it will be apparent to those skilled in the art that other modifications based on the technological spirit of the present disclosure can be made.

What is claimed is:

1. An electronic device comprising:
    a housing comprising a first surface that faces in a first direction, and a second surface that faces in a second direction opposite to the first direction, the housing comprising a transparent plate forming at least a part of the first surface of the housing;
    a display disposed between the transparent plate and the second surface of the housing, and comprising a first surface that faces in the first direction and a second surface that faces in the second direction;
    at least one sensor disposed between the second surface of the display and the second surface of the housing, the sensor configured to be exposed to light passing through the display;
    a processor electrically coupled with the display and the at least one sensor; and
    a memory electrically coupled with the processor,
    wherein the memory stores instructions and the processor is configured to execute the instructions to:
    receive a user input for capturing an image facing the first direction;
    in response to receiving the user input, activate the at least one sensor during a first time period to receive the light being passed through the transparent plate;
    during the first time period, deactivate the display except for a first region in which the at least one sensor is disposed, and display a graphical object on the first region for applying a filter effect to the image;
    in response to detecting that the first time period has elapsed from the time for receiving the user input, deactivate the at least one sensor during a second time period; and
    during the second time period, activate the display including the first region for displaying the image to which the filter effect is applied;
    wherein the first time period and the second time period are repeatedly alternating, and
    wherein the filter effect is based on a shape of the graphical object.

2. The electronic device of claim 1, wherein the first time periods have a first period, and the second time periods have a second period.

3. The electronic device of claim 2, wherein the first period and the second period are the same as each other.

4. The electronic device of claim 2, wherein the first time periods are less than the second time periods, and
    the first period is greater than the second period.

5. The electronic device of claim 4, wherein the first time periods are ⅛ to ⅔ times less than the second time periods, and
    the first period is 1.5 times to 8 times greater than the second period.

6. The electronic device of claim 1, wherein the first time periods and the second time periods at least partially overlap with each other.

7. The electronic device of claim 1, wherein one of the first time periods and/or one of the second time periods immediately following the one of the first time periods and/or one of the second time periods are spaced third time periods apart from each other, and the instructions further comprise instructions the processor is configured to execute to not enable all the display and the at least one sensor during the third time periods.

8. The electronic device of claim 1, wherein the instructions instruct further comprise instructions the processor is configured to execute to:
receive an input to the display,
disable the at least one sensor in response to the input, and
enable the display during the third time periods greater than the first time periods.

9. The electronic device of claim 1, wherein the at least one sensor comprises at least one of: a camera, a proximity sensor, an illuminance sensor, a finger scan sensor, or a medical sensor.

10. The electronic device of claim 1, wherein the display comprises:
a first region at least partially not overlapping with the at least one sensor, when viewed from the top of the transparent plate; and
a second region at least partially overlapping with the at least one sensor, when viewed from the top of the transparent plate.

11. The electronic device of claim 10, wherein the instructions further comprise instructions the processor is configured to execute to display, in the second region of the display, a color and/or pattern different from a color and/or pattern displayed in the first region.

12. The electronic device of claim 10, wherein the first region of the display comprises a first picture cell having a first structure, and
the second region of the display comprises a second pixel having a second structure different from the first structure.

13. The electronic device of claim 10, wherein pixels per inch of the second region of the display are less than pixels per inch of the first region of the display.

14. The electronic device of claim 10, wherein the display comprises a gate wiring configured to provide a first signal to at least one of the first pixel and/or the second pixel, and a data wiring configured to provide a second signal to at least one of the first pixel and/or the second pixel, and
at least one of a first gate wiring crossing the first region of the display and/or a first data wiring is different from at least one of a second gate wiring crossing the second region of the display and/or a second data wiring.

15. The electronic device of claim 10, further comprising a touch screen disposed between the transparent plate and the display or arranged within the display,
wherein the touch screen comprises:
a first touch electrode pattern disposed between the transparent plate and the first region of the display; and
a second touch electrode pattern disposed between the transparent plate and the second region of the display, the second touch electrode pattern being different from the first touch electrode pattern.

16. The electronic device of claim 1, wherein the display comprises an active region comprising an organic light emitting diode, and an inactive region, the inactive region not comprising the organic light emitting diode, and
at least a part of the inactive region of the display being folded in the second direction.

17. The electronic device of claim 16, wherein the display comprises a first polymer layer, and a second polymer layer attached to a surface of the first polymer layer that faces in the second direction, and
wherein at least a part of the second polymer layer folded in the second direction is at least partially cut out.

18. The electronic device of claim 1, further comprising a pressure sensor disposed between the second surface of the display and the second surface of the housing, and a control circuit electrically coupled with the pressure sensor, and
the control circuit being configured to determine a degree of pressure in the second direction, using the pressure sensor.

19. The electronic device of claim 1, further comprising a structure disposed between the display and the at least one sensor,
wherein the structure is configured to selectively block or pass light external to the transparent plate.

20. An electronic device comprising:
a housing comprising a first surface that faces in a first direction, and a second surface that faces in a second direction opposite to the first direction, the housing comprising a transparent plate forming at least a part of the first surface of the housing;
a display disposed between the transparent plate and the second surface of the housing, and comprising a first surface that faces in the first direction and a second surface that faces in the second direction;
a camera disposed between the second surface of the display and the second surface of the housing, the camera configured to be exposed to light passing through the display;
a processor electrically coupled with the display and the at least one sensor; and
a memory electrically coupled with the processor,
wherein the memory stores instructions, and the processor is configured to execute the instructions to:
receive a user input for capturing an image facing the first direction;
in response to receiving the user input, activate the at least one sensor during a first time period to receive the light being passed through the transparent plate;
during the first time period, deactivate the display except for a first region in which the at least one sensor is disposed, and display a graphical object on the first region for applying a filter effect to the image;
in response to detecting that the first time period has elapsed from the time for receiving the user input, deactivate the at least one sensor during a second time period; and
during the second time period, activate the display including the first region for displaying the image to which the filter effect is applied,
wherein the first time period and the second time period repeatedly alternate, and
wherein the filter effect is based on a shape of the graphical object.

* * * * *